United States Patent
Ueda

(10) Patent No.: US 10,745,081 B2
(45) Date of Patent: Aug. 18, 2020

(54) BICYCLE REAR DERAILLEUR AND BICYCLE SHIFTING CONTROL APPARATUS

(71) Applicant: SHIMANO INC., Sakai (JP)

(72) Inventor: Takeshi Ueda, Sakai (JP)

(73) Assignee: SHIMANO INC., Sakai (JP)

( * ) Notice: Subject to any disclaimer, the term of this patent is extended or adjusted under 35 U.S.C. 154(b) by 170 days.

(21) Appl. No.: 15/662,297

(22) Filed: Jul. 28, 2017

(65) Prior Publication Data

US 2019/0031287 A1 Jan. 31, 2019

(51) Int. Cl.
*B62M 9/122* (2010.01)
*B62M 9/123* (2010.01)
*B62M 9/132* (2010.01)

(52) U.S. Cl.
CPC ............ *B62M 9/122* (2013.01); *B62M 9/132* (2013.01)

(58) Field of Classification Search
CPC .............................. B62M 9/122; B62M 9/132
See application file for complete search history.

(56) References Cited

U.S. PATENT DOCUMENTS

| | | | | |
|---|---|---|---|---|
| 4,530,677 A | * | 7/1985 | Nagano | B62M 9/126 474/80 |
| 4,617,006 A | * | 10/1986 | Nagano | B62M 9/1342 474/78 |
| 5,171,187 A | * | 12/1992 | Nagano | B62M 9/136 474/82 |
| 5,865,454 A | | 2/1999 | Campagnolo | |
| 6,682,087 B1 | | 1/2004 | Takeda | |
| 6,740,003 B2 | | 5/2004 | Fukuda | |
| 7,285,064 B2 | | 10/2007 | Ichida et al. | |
| 9,278,728 B1 | * | 3/2016 | Sato | B62M 9/122 |
| 2003/0207732 A1 | | 11/2003 | Fukuda | |
| 2004/0176896 A1 | | 9/2004 | Takeda et al. | |

(Continued)

FOREIGN PATENT DOCUMENTS

| | | |
|---|---|---|
| CN | 1454819 | 11/2003 |
| CN | 1524764 | 9/2004 |

(Continued)

OTHER PUBLICATIONS

Office Action with Form PTO-892 Notice of References Cited issued by the U.S. Patent and Trademark Office for U.S. Appl. No. 16/869,599, dated Jun. 26, 2020.

*Primary Examiner* — Tisha D Lewis
(74) *Attorney, Agent, or Firm* — Mori & Ward, LLP

(57) ABSTRACT

A bicycle rear derailleur comprises a base member, a chain guide, an actuator, and a controller. The chain guide is movably coupled to the base member. The actuator is operatively coupled to the chain guide to move the chain guide relative to the base member. The controller is electrically connected to the actuator to move the chain guide relative to the base member from a current stop position to a target-stop position which is adjacent to the current stop position without another stop position between the current stop position and the target-stop position. The controller is configured to change, based on a front shift position of a front derailleur, at least one of the target-stop position and a temporary position in which the chain guide temporarily is in a shifting operation in which the chain guide moves from the current stop position to the target-stop position.

20 Claims, 60 Drawing Sheets

(56) References Cited

U.S. PATENT DOCUMENTS

| | | |
|---|---|---|
| 2005/0223840 A1 | 10/2005 | Takamoto |
| 2005/0227798 A1 | 10/2005 | Ichida et al. |
| 2006/0189423 A1 | 8/2006 | Ichida et al. |
| 2012/0322591 A1 | 12/2012 | Kitamura et al. |
| 2014/0088846 A1 | 3/2014 | Lee |
| 2014/0303857 A1 | 10/2014 | Takamoto et al. |
| 2017/0158285 A1* | 6/2017 | Tachibana .............. B62M 9/123 |

FOREIGN PATENT DOCUMENTS

| | | |
|---|---|---|
| DE | 202016001269 U1 | 5/2016 |
| DE | 102015017088 | 6/2016 |

* cited by examiner

|  |  | AVAILABLE FRONT SHIFT POSITION ||
|---|---|---|---|
|  |  | FP1 | FP2 |
|  |  | AVAILABLE TARGET-STOP POSITION ||
| AVAILABLE REAR SHIFT POSITION | RP1 | TSP1N | TSP1C |
| | RP2 | TSP2N | TSP2C |
| | RP3 | TSP3N | TSP3C |
| | RP4 | TSP4N | TSP4N |
| | RP5 | TSP5N | TSP5N |
| | RP6 | TSP6N | TSP6N |
| | RP7 | TSP7N | TSP7N |
| | RP8 | TSP8N | TSP8N |
| | RP9 | TSP9C | TSP9N |
| | RP10 | TSP10C | TSP10N |
| | RP11 | TSP11C | TSP11N |

FIG. 17

| TB1 | | | AVAILABLE FRONT SHIFT POSITION | |
|---|---|---|---|---|
| | | | FP1 (LOW) | FP2 (TOP) |
| | | | AVAILABLE TARGET-STOP POSITION(TSP) | |
| AVAILABLE REAR SHIFT POSITION | RP1 | OS12(DOWN) | – | – |
| | | OS11(UP) | TSP2N | TSP2C |
| | RP2 | OS12(DOWN) | TSP1N | TSP1C |
| | | OS11(UP) | TSP3N | TSP3C |
| | RP3 | OS12(DOWN) | TSP2N | TSP2C |
| | | OS11(UP) | TSP4N | TSP4N |
| | RP4 | OS12(DOWN) | TSP3N | TSP3C |
| | | OS11(UP) | TSP5N | TSP5N |
| | RP5 | OS12(DOWN) | TSP4N | TSP4N |
| | | OS11(UP) | TSP6N | TSP6N |
| | RP6 | OS12(DOWN) | TSP5N | TSP5N |
| | | OS11(UP) | TSP7N | TSP7N |
| | RP7 | OS12(DOWN) | TSP6N | TSP6N |
| | | OS11(UP) | TSP8N | TSP8N |
| | RP8 | OS12(DOWN) | TSP7N | TSP7N |
| | | OS11(UP) | TSP9C | TSP9N |
| | RP9 | OS12(DOWN) | TSP8N | TSP8N |
| | | OS11(UP) | TSP10C | TSP10N |
| | RP10 | OS12(DOWN) | TSP9C | TSP9N |
| | | OS11(UP) | TSP11C | TSP11N |
| | RP11 | OS12(DOWN) | TSP10C | TSP10N |
| | | OS11(UP) | – | – |

*FIG. 18*

| | | AVAILABLE FRONT SHIFT POSITION ||
| | | FP1 | FP2 |
| | | AVAILABLE TEMPORARY POSITION (AVAILABLE INTERMEDIATE POSITION) ||
|---|---|---|---|
| AVAILABLE REAR SHIFT POSITION | RP1 | IMP1N | IMP1C |
| | RP2 | IMP2N | IMP2C |
| | RP3 | IMP3N | IMP3C |
| | RP4 | IMP4N | IMP4N |
| | RP5 | IMP5N | IMP5N |
| | RP6 | IMP6N | IMP6N |
| | RP7 | IMP7N | IMP7N |
| | RP8 | IMP8N | IMP8N |
| | RP9 | IMP9C | IMP9N |
| | RP10 | IMP10C | IMP10N |
| | RP11 | IMP11C | IMP11N |

*FIG. 26*

| TB2 | | | AVAILABLE FRONT SHIFT POSITION | |
|---|---|---|---|---|
| | | | FP1 (LOW) | FP2 (TOP) |
| | | | AVAILABLE TEMPORARY POSITION (AVAILABLE INTERMEDIATE POSITION) | |
| AVAILABLE REAR SHIFT POSITION | RP1 | OS12(DOWN) | – | – |
| | | OS11(UP) | IMP2N | IMP2C |
| | RP2 | OS12(DOWN) | IMP1N | IMP1C |
| | | OS11(UP) | IMP3N | IMP3C |
| | RP3 | OS12(DOWN) | IMP2N | IMP2C |
| | | OS11(UP) | IMP4N | IMP4N |
| | RP4 | OS12(DOWN) | IMP3N | IMP3C |
| | | OS11(UP) | IMP5N | IMP5N |
| | RP5 | OS12(DOWN) | IMP4N | IMP4N |
| | | OS11(UP) | IMP6N | IMP6N |
| | RP6 | OS12(DOWN) | IMP5N | IMP5N |
| | | OS11(UP) | IMP7N | IMP7N |
| | RP7 | OS12(DOWN) | IMP6N | IMP6N |
| | | OS11(UP) | IMP8N | IMP8N |
| | RP8 | OS12(DOWN) | IMP7N | IMP7N |
| | | OS11(UP) | IMP9C | IMP9N |
| | RP9 | OS12(DOWN) | IMP8N | IMP8N |
| | | OS11(UP) | IMP10C | IMP10N |
| | RP10 | OS12(DOWN) | IMP9C | IMP9N |
| | | OS11(UP) | IMP11C | IMP11N |
| | RP11 | OS12(DOWN) | IMP10C | IMP10N |
| | | OS11(UP) | – | – |

*FIG. 27*

|  |  | AVAILABLE FRONT SHIFT POSITION | |
|---|---|---|---|
|  |  | FP1 | FP2 |
|  |  | AVAILABLE TEMPORARY POSITION (AVAILABLE OVERSTROKE POSITION) | |
| AVAILABLE REAR SHIFT POSITION | RP1 | OSP1N | OSP1C |
| | RP2 | OSP2N | OSP2C |
| | RP3 | OSP3N | OSP3C |
| | RP4 | OSP4N | OSP4N |
| | RP5 | OSP5N | OSP5N |
| | RP6 | OSP6N | OSP6N |
| | RP7 | OSP7N | OSP7N |
| | RP8 | OSP8N | OSP8N |
| | RP9 | OSP9C | OSP9N |
| | RP10 | OSP10C | OSP10N |
| | RP11 | OSP11C | OSP11N |

*FIG. 35*

| TB3 | | | AVAILABLE FRONT SHIFT POSITION | |
|---|---|---|---|---|
| | | | FP1 (LOW) | FP2 (TOP) |
| | | | AVAILABLE TEMPORARY POSITION (AVAILABLE OVERSTROKE POSITION) | |
| AVAILABLE REAR SHIFT POSITION | RP1 | OS12(DOWN) | – | – |
| | | OS11(UP) | OSP2N | OSP2C |
| | RP2 | OS12(DOWN) | OSP1N | OSP1C |
| | | OS11(UP) | OSP3N | OSP3C |
| | RP3 | OS12(DOWN) | OSP2N | OSP2C |
| | | OS11(UP) | OSP4N | OSP4N |
| | RP4 | OS12(DOWN) | OSP3N | OSP3C |
| | | OS11(UP) | OSP5N | OSP5N |
| | RP5 | OS12(DOWN) | OSP4N | OSP4N |
| | | OS11(UP) | OSP6N | OSP6N |
| | RP6 | OS12(DOWN) | OSP5N | OSP5N |
| | | OS11(UP) | OSP7N | OSP7N |
| | RP7 | OS12(DOWN) | OSP6N | OSP6N |
| | | OS11(UP) | OSP8N | OSP8N |
| | RP8 | OS12(DOWN) | OSP7N | OSP7N |
| | | OS11(UP) | OSP9C | OSP9N |
| | RP9 | OS12(DOWN) | OSP8N | OSP8N |
| | | OS11(UP) | OSP10C | OSP10N |
| | RP10 | OS12(DOWN) | OSP9C | OSP9N |
| | | OS11(UP) | OSP11C | OSP11N |
| | RP11 | OS12(DOWN) | OSP10C | OSP10N |
| | | OS11(UP) | – | – |

FIG. 36

| TB4 | | | DISTANCE | |
|---|---|---|---|---|
| | | | DT < DT0 | DT ≥ DT0 |
| | | | AVAILABLE TARGET-STOP POSITION | |
| AVAILABLE REAR SHIFT POSITION | RP1 | OS12(DOWN) | – | – |
| | | OS11(UP) | TSP2N | TSP2C |
| | RP2 | OS12(DOWN) | TSP1N | TSP1C |
| | | OS11(UP) | TSP3N | TSP3C |
| | RP3 | OS12(DOWN) | TSP2N | TSP2C |
| | | OS11(UP) | TSP4N | TSP4N |
| | RP4 | OS12(DOWN) | TSP3N | TSP3C |
| | | OS11(UP) | TSP5N | TSP5N |
| | RP5 | OS12(DOWN) | TSP4N | TSP4N |
| | | OS11(UP) | TSP6N | TSP6N |
| | RP6 | OS12(DOWN) | TSP5N | TSP5N |
| | | OS11(UP) | TSP7N | TSP7N |
| | RP7 | OS12(DOWN) | TSP6N | TSP6N |
| | | OS11(UP) | TSP8N | TSP8N |
| | RP8 | OS12(DOWN) | TSP7N | TSP7N |
| | | OS11(UP) | TSP9N | TSP9C |
| | RP9 | OS12(DOWN) | TSP8N | TSP8N |
| | | OS11(UP) | TSP10N | TSP10C |
| | RP10 | OS12(DOWN) | TSP9N | TSP9C |
| | | OS11(UP) | TSP11N | TSP11C |
| | RP11 | OS12(DOWN) | TSP10N | TSP10C |
| | | OS11(UP) | – | – |

FIG. 40

| TB5 | | | DISTANCE | |
|---|---|---|---|---|
| | | | DT < DT0 | DT ≧ DT0 |
| | | | AVAILABLE OVERSTROKE POSITION | |
| AVAILABLE REAR SHIFT POSITION | RP1 | OS12(DOWN) | – | – |
| | | OS11(UP) | OSP2N | OSP2C |
| | RP2 | OS12(DOWN) | OSP1N | OSP1C |
| | | OS11(UP) | OSP3N | OSP3C |
| | RP3 | OS12(DOWN) | OSP2N | OSP2C |
| | | OS11(UP) | OSP4N | OSP4N |
| | RP4 | OS12(DOWN) | OSP3N | OSP3C |
| | | OS11(UP) | OSP5N | OSP5N |
| | RP5 | OS12(DOWN) | OSP4N | OSP4N |
| | | OS11(UP) | OSP6N | OSP6N |
| | RP6 | OS12(DOWN) | OSP5N | OSP5N |
| | | OS11(UP) | OSP7N | OSP7N |
| | RP7 | OS12(DOWN) | OSP6N | OSP6N |
| | | OS11(UP) | OSP8N | OSP8N |
| | RP8 | OS12(DOWN) | OSP7N | OSP7N |
| | | OS11(UP) | OSP9N | OSP9C |
| | RP9 | OS12(DOWN) | OSP8N | OSP8N |
| | | OS11(UP) | OSP10N | OSP10C |
| | RP10 | OS12(DOWN) | OSP9N | OSP9C |
| | | OS11(UP) | OSP11N | OSP11C |
| | RP11 | OS12(DOWN) | OSP10N | OSP10C |
| | | OS11(UP) | – | – |

*FIG. 46*

| TB6 | AVAILABLE FRONT SHIFT POSITION | |
|---|---|---|
| | FP1 | FP2 |
| | AVAILABLE TARGET-STOP POSITION | |
| RP1 | RP1N | RP1C |
| RP2 | RP2N | RP2C |
| RP3 | RP3N | RP3C |
| RP4 | RP4N | RP4N |
| RP5 | RP5N | RP5N |
| RP6 | RP6N | RP6N |
| RP7 | RP7N | RP7N |
| RP8 | RP8N | RP8N |
| RP9 | RP9C | RP9N |
| RP10 | RP10C | RP10N |
| RP11 | RP11C | RP11N |

(Left axis label: AVAILABLE REAR SHIFT POSITION)

FIG. 50

| TB7 | DISTANCE | |
|---|---|---|
| | DT < DT0 | DT ≧ DT0 |
| | AVAILABLE TARGET-STOP POSITION | |
| AVAILABLE REAR SHIFT POSITION — RP1 | RP1N | RP1C |
| RP2 | RP2N | RP2C |
| RP3 | RP3N | RP3C |
| RP4 | RP4N | RP4N |
| RP5 | RP5N | RP5N |
| RP6 | RP6N | RP6N |
| RP7 | RP7N | RP7N |
| RP8 | RP8N | RP8N |
| RP9 | RP9N | RP9C |
| RP10 | RP10N | RP10C |
| RP11 | RP11N | RP11C |

*FIG. 56*

BICYCLE REAR DERAILLEUR AND BICYCLE SHIFTING CONTROL APPARATUS

BACKGROUND OF THE INVENTION

Field of the Invention

The present invention relates to a bicycle rear derailleur and a bicycle shifting control apparatus.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a shifting control apparatus.

SUMMARY OF THE INVENTION

In accordance with a first aspect of the present invention, a bicycle rear derailleur comprises a base member, a chain guide, an actuator, and a controller. The chain guide is movably coupled to the base member. The actuator is operatively coupled to the chain guide to move the chain guide relative to the base member. The controller is electrically connected to the actuator to move the chain guide relative to the base member from a current stop position to a target-stop position which is adjacent to the current stop position without another stop position between the current stop position and the target-stop position. The controller is configured to change, based on a front shift position of a front derailleur, at least one of the target-stop position and a temporary position in which the chain guide temporarily is in a shifting operation in which the chain guide moves from the current stop position to the target-stop position.

With the bicycle rear derailleur according to the first aspect, since the target-stop position and/or the temporary position is changed based on the front shift position, it is possible to improve shifting performance of the bicycle rear derailleur even if the bicycle chain is inclined between the front sprocket and the rear sprocket.

In accordance with a second aspect of the present invention, the bicycle rear derailleur according to the first aspect is configured so that the temporary position includes an intermediate position provided between the current stop position and the target-stop position.

With the bicycle rear derailleur according to the second aspect, since the intermediate position is changed based on the front shift position, it is possible to further improve shifting performance of the bicycle rear derailleur even if the bicycle chain is inclined between the front sprocket and the rear sprocket.

In accordance with a third aspect of the present invention, the bicycle rear derailleur according to the first aspect is configured so that the temporary position includes an overstroke position. The target-stop position is provided between the current stop position and the overstroke position.

With the bicycle rear derailleur according to the third aspect, it is possible to improve shifting performance of the bicycle rear derailleur while the overstroke position certainly completes the shifting operation.

In accordance with a fourth aspect of the present invention, the bicycle rear derailleur according to any one of the first to third aspects is configured so that the controller includes a memory configured to store a plurality of available front shift positions of the front derailleur. The controller is configured to compare the front shift position with the plurality of available front shift positions before changing the at least one of the target-stop position and the temporary position.

With the bicycle rear derailleur according to the fourth aspect, it is possible to further improve shifting performance of the bicycle rear derailleur even if the bicycle chain is inclined between the front sprocket and the rear sprocket.

In accordance with a fifth aspect of the present invention, the bicycle rear derailleur according to the fourth aspect is configured so that the memory is configured to store a plurality of available target-stop positions of the chain guide.

With the bicycle rear derailleur according to the fifth aspect, it is possible to further improve shifting performance of the bicycle rear derailleur even if the bicycle chain is inclined between the front sprocket and the rear sprocket.

In accordance with a sixth aspect of the present invention, the bicycle rear derailleur according to the fifth aspect is configured so that the controller is configured to select, as the target-stop position, one position of the plurality of available target-stop positions which corresponds to one position of the plurality of available front shift positions in a case where the controller concludes that the front shift position is the one position of the plurality of available front shift positions.

With the bicycle rear derailleur according to the sixth aspect, it is possible to further improve shifting performance of the bicycle rear derailleur even if the bicycle chain is inclined between the front sprocket and the rear sprocket.

In accordance with a seventh aspect of the present invention, the bicycle rear derailleur according to the fourth aspect is configured so that the memory is configured to store a plurality of available temporary positions of the chain guide.

With the bicycle rear derailleur according to the seventh aspect, it is possible to further improve shifting performance of the bicycle rear derailleur even if the bicycle chain is inclined between the front sprocket and the rear sprocket.

In accordance with an eighth aspect of the present invention, the bicycle rear derailleur according to the seventh aspect is configured so that the controller is configured to select, as the temporary position, one position of the plurality of available temporary positions which corresponds to one position of the plurality of available front shift positions in a case where the controller concludes that the front shift position is the one position of the plurality of available front shift positions.

With the bicycle rear derailleur according to the eighth aspect, it is possible to further improve shifting performance of the bicycle rear derailleur even if the bicycle chain is inclined between the front sprocket and the rear sprocket.

In accordance with a ninth aspect of the present invention, the bicycle rear derailleur according to the first aspect is configured so that the controller is configured to change the at least one of the target-stop position and the temporary position based on the front shift position and a current rear shift position corresponding to the current stop position.

With the bicycle rear derailleur according to the ninth aspect, it is possible to further improve shifting performance of the bicycle rear derailleur even if the bicycle chain is inclined between the front sprocket and the rear sprocket.

In accordance with a tenth aspect of the present invention, the bicycle rear derailleur according to the ninth aspect is configured so that the controller includes a memory configured to store a plurality of available front shift positions of the front derailleur and a plurality of available rear shift positions of the bicycle rear derailleur. The controller is configured to compare the front shift position with the plurality of available front shift positions and compare the current rear shift position with the plurality of available rear shift positions before changing the at least one of the target-stop position and the temporary position.

With the bicycle rear derailleur according to the tenth aspect, it is possible to further improve shifting performance of the bicycle rear derailleur even if the bicycle chain is inclined between the front sprocket and the rear sprocket.

In accordance with an eleventh aspect of the present invention, the bicycle rear derailleur according to the tenth aspect is configured so that the memory is configured to store a plurality of available target-stop positions of the chain guide.

With the bicycle rear derailleur according to the eleventh aspect, it is possible to further improve shifting performance of the bicycle rear derailleur even if the bicycle chain is inclined between the front sprocket and the rear sprocket.

In accordance with a twelfth aspect of the present invention, the bicycle rear derailleur according to the eleventh aspect is configured so that the controller is configured to select, as the target-stop position, one position of the plurality of available target-stop positions which corresponds to one position of the plurality of available front shift positions and one position of the plurality of available rear shift positions in a case where the controller concludes that the front shift position is the one position of the plurality of available front shift positions and that the current rear shift position is the one position of the plurality of available rear shift positions.

With the bicycle rear derailleur according to the twelfth aspect, it is possible to further improve shifting performance of the bicycle rear derailleur even if the bicycle chain is inclined between the front sprocket and the rear sprocket.

In accordance with a thirteenth aspect of the present invention, the bicycle rear derailleur according to the tenth aspect is configured so that the memory is configured to store a plurality of available temporary positions of the chain guide.

With the bicycle rear derailleur according to the thirteenth aspect, it is possible to further improve shifting performance of the bicycle rear derailleur even if the bicycle chain is inclined between the front sprocket and the rear sprocket.

In accordance with a fourteenth aspect of the present invention, the bicycle rear derailleur according to the thirteenth aspect is configured so that the controller is configured to select, as the temporary position, one position of the plurality of available temporary positions which corresponds to one position of the plurality of available front shift positions and one position of the plurality of available rear shift positions in a case where the controller concludes that the front shift position is the one position of the plurality of available front shift positions and that the current rear shift position is the one position of the plurality of available rear shift positions.

With the bicycle rear derailleur according to the fourteenth aspect, it is possible to further improve shifting performance of the bicycle rear derailleur even if the bicycle chain is inclined between the front sprocket and the rear sprocket.

In accordance with a fifteenth aspect of the present invention, the bicycle rear derailleur according to the first aspect is configured so that the chain guide includes a guide plate, a guide pulley, and a link structure. The guide pulley is rotatably coupled to the guide plate about a rotational axis. The link structure movably couples the guide plate to the base member. The guide plate is pivotally coupled to the link structure about a pivot axis. The rotational axis of the guide pulley is offset from the pivot axis of the guide plate.

With the bicycle rear derailleur according to the fifteenth aspect, it is possible to further improve shifting performance of the bicycle rear derailleur even if the bicycle chain is inclined between the front sprocket and the rear sprocket.

In accordance with a sixteenth aspect of the present invention, a bicycle rear derailleur comprises a base member, a chain guide, an actuator, and a controller. The chain guide is movably coupled to the base member. The actuator is operatively coupled to the chain guide to move the chain guide relative to the base member. The controller is electrically connected to the actuator to move the chain guide relative to the base member from a current stop position to a target-stop position. The controller is configured to change a current rear shift position corresponding to the current stop position based on a front shift position of a front derailleur.

With the bicycle rear derailleur according to the sixteenth aspect, it is possible to improve shifting performance of the bicycle rear derailleur even if the bicycle chain is inclined between the front sprocket and the rear sprocket.

In accordance with a seventeenth aspect of the present invention, a bicycle rear derailleur comprises a base member, a chain guide, an actuator, and a controller. The chain guide is movably coupled to the base member. The actuator is operatively coupled to the chain guide to move the chain guide relative to the base member. The controller is electrically connected to the actuator to move the chain guide relative to the base member from a current stop position to a target-stop position. The controller is configured to change the target-stop position based on at least one of a current rear shift position corresponding to the current stop position, and a distance provided between the chain guide and a rear sprocket corresponding to the current rear shift position.

With the bicycle rear derailleur according to the seventeenth aspect, it is possible to improve shifting performance of the bicycle rear derailleur even if the bicycle chain is inclined between the front sprocket and the rear sprocket.

In accordance with an eighteenth aspect of the present invention, the bicycle rear derailleur according to the seventeenth aspect is configured so that the controller is further configured to change an overstroke position. The target-stop position is disposed between the current stop position and the overstroke position. The controller is configured to change the overstroke position based on at least one of the current rear shift position, the distance provided between the chain guide and the rear sprocket corresponding to the current rear shift position, and the target-stop position.

With the bicycle rear derailleur according to the eighteenth aspect, it is possible to further improve shifting performance of the bicycle rear derailleur even if the bicycle chain is inclined between the front sprocket and the rear sprocket.

In accordance with a ninetieth aspect of the present invention, a bicycle rear derailleur comprises a base member, a chain guide, an actuator, and a controller. The chain guide is movably coupled to the base member. The actuator is operatively coupled to the chain guide to move the chain guide relative to the base member. The controller is electrically connected to the actuator to move the chain guide relative to the base member from a current stop position to a target-stop position. The controller is configured to change a current rear shift position corresponding to the current stop position based on a distance provided between the chain guide and a rear sprocket corresponding to the current rear shift position.

With the bicycle rear derailleur according to the ninetieth aspect, it is possible to improve shifting performance of the bicycle rear derailleur even if the bicycle chain is inclined between the front sprocket and the rear sprocket.

In accordance with a twentieth aspect of the present invention, a bicycle shifting control apparatus is for a bicycle rear derailleur including a base member, a chain guide movably coupled to the base member, and an actuator operatively coupled to the chain guide to move the chain guide relative to the base member. The bicycle shifting control apparatus comprises a controller electrically connected to the actuator to move the chain guide relative to the base member from a current stop position to a target-stop position. The controller includes a memory configured to store the target-stop position and a temporary position in which the chain guide temporarily is in a shifting operation in which the chain guide moves from the current stop position to the target-stop position. The controller is configured to change at least one of the target-stop position and the temporary position based on a front shift position of a front derailleur.

With the bicycle shifting control apparatus according to the twentieth aspect, it is possible to further improve shifting performance of the bicycle rear derailleur even if the bicycle chain is inclined between the front sprocket and the rear sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 17 and 18 are tables stored in a memory of the bicycle shifting control apparatus illustrated in FIG. 1.

FIGS. 26 and 27 are tables stored in a memory of the bicycle shifting control apparatus illustrated in FIG. 21.

FIGS. 35 and 36 are tables stored in a memory of the bicycle shifting control apparatus illustrated in FIG. 30.

FIG. 40 is a table stored in a memory of the bicycle shifting control apparatus illustrated in FIG. 39.

FIG. 46 is a table stored in a memory of the bicycle shifting control apparatus illustrated in FIG. 45.

FIG. 50 is a table stored in a memory of the bicycle shifting control apparatus illustrated in FIG. 49.

FIG. 56 is a table stored in a memory of the bicycle shifting control apparatus illustrated in FIG. 55.

DESCRIPTION OF THE EMBODIMENTS

Figure 1:
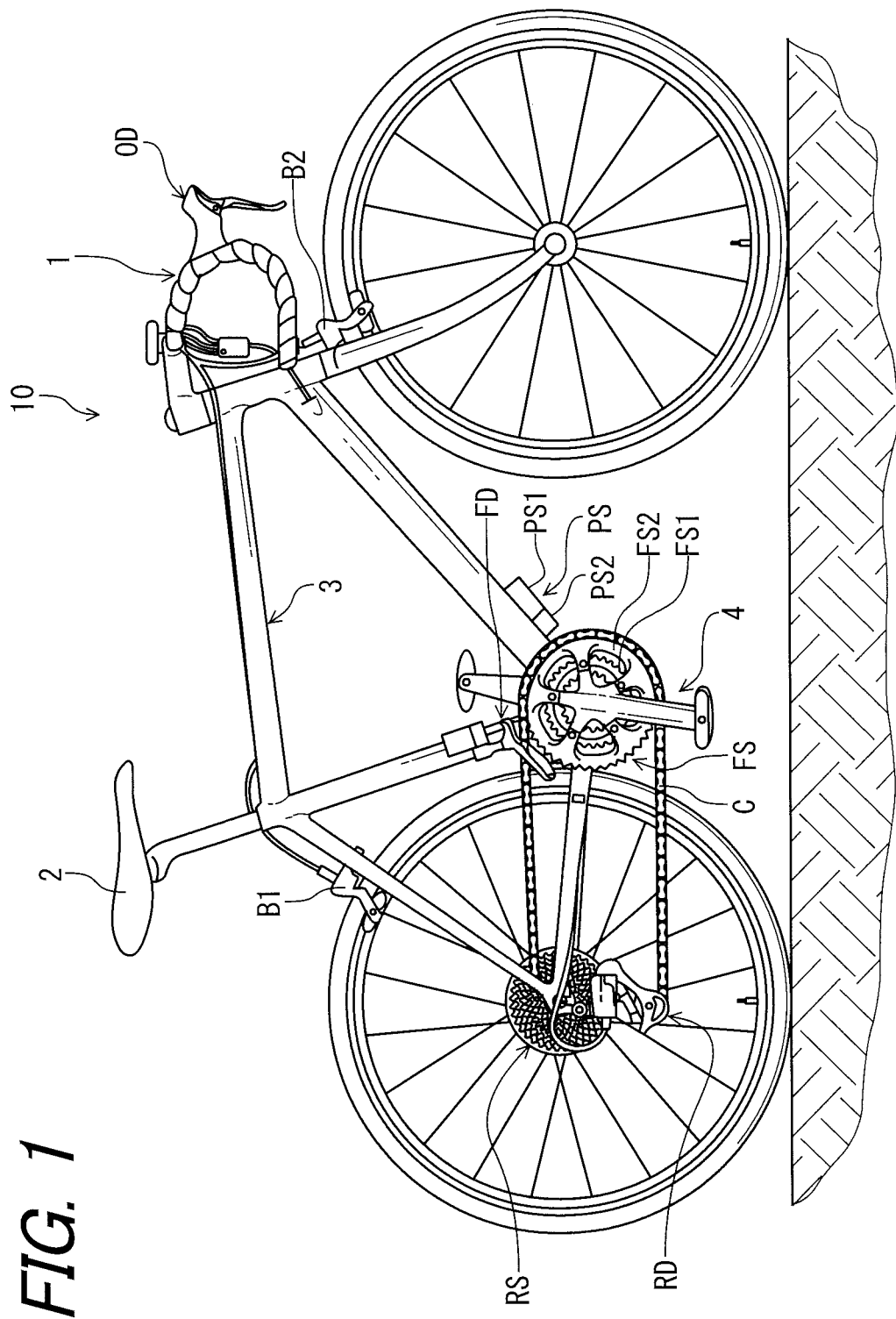
FIG. 1 is a side elevational view of a bicycle provided with a bicycle shifting control apparatus in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle shifting control apparatus 12 for a bicycle rear derailleur RD in accordance with a first embodiment. While the bicycle 10 is illustrated as a road bike, the bicycle shifting control apparatus 12 can be applied to mountain bikes or any type of bicycle.

As seen in FIG. 1, the bicycle 10 includes a handlebar 1, a saddle 2, a bicycle frame 3, a crank assembly 4, a rear sprocket assembly RS, a bicycle operating device OD, the bicycle rear derailleur RD, and a front derailleur FD. The bicycle operating device OD is mounted to the handlebar 1. The crank assembly 4 includes a front sprocket assembly FS. The front sprocket assembly FS includes a first front sprocket FS1 and a second front sprocket FS2. A bicycle chain C is engaged with the rear sprocket assembly RS and the front sprocket assembly FS. The front derailleur FD is configured to shift the bicycle chain C between a plurality of front shift positions in response to operation of the bicycle operating device OD. The bicycle rear derailleur RD is configured to shift the bicycle chain C between a plurality of rear shift positions in response to operation of the bicycle operating device OD. The bicycle operating device OD includes a rear brake operating device via which a user operates a rear braking device B1 and a front brake operating device via which a user operates a front braking device B2.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle 2 of the bicycle 10 with facing the handlebar 1. Accordingly, these terms, as utilized to describe bicycle components, should be interpreted relative to the bicycle 10 equipped with the bicycle components as used in an upright riding position on a horizontal surface.

Figure 2:
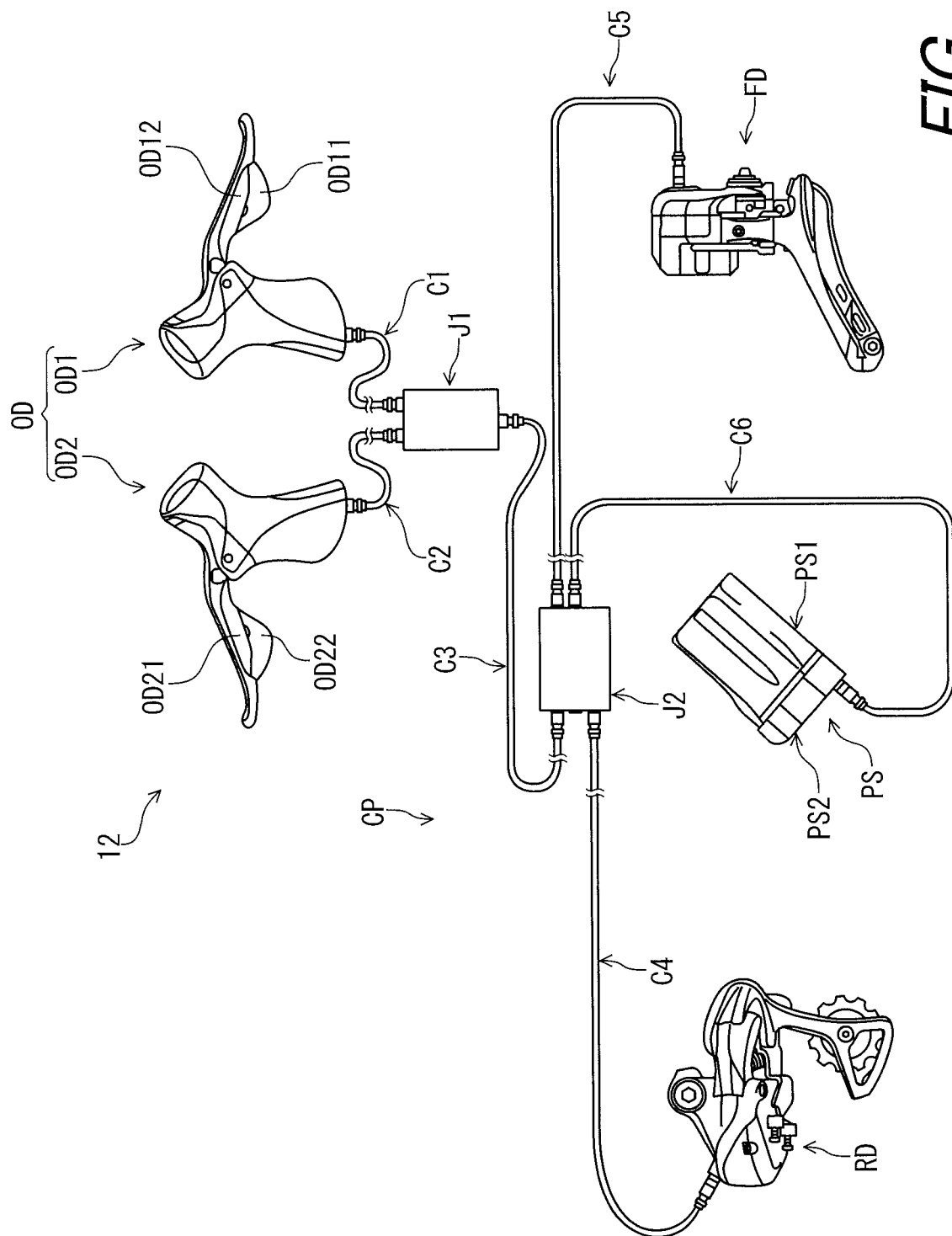
FIG. 2 is a schematic diagram of the bicycle shifting control apparatus illustrated in FIG. 1.

As seen in FIG. 2, the bicycle 10 includes a power supply PS. The power supply PS is electrically connected to the bicycle operating device OD, the bicycle rear derailleur RD, and the front derailleur FD to supply electricity to the bicycle operating device OD, the bicycle rear derailleur RD, and the front derailleur FD. Examples of the battery PS1 include a primary battery such as a lithium manganese dioxide battery, and a secondary battery such as a lithium-ion secondary battery. In this embodiment, the battery PS1 is the secondary battery. The battery PS1 is detachably attached to the battery holder PS2 to supply electricity to the bicycle rear derailleur RD, the front derailleur FD, and other electric components.

The battery holder PS2 is mounted to the bicycle frame 3 (FIG. 1) and is electrically connected to the bicycle operating device OD, the bicycle rear derailleur RD, and the front derailleur FD to supply electricity from the battery PS1 to the bicycle operating device OD, the bicycle rear derailleur RD, and the front derailleur FD.

As seen in FIG. 2, the bicycle shifting control apparatus 12 comprises an electric communication path CP. The electric communication path CP operatively connects electric components to each other. For example, the electric communication path CP includes electric cables C1 to C6 and electric junctions J1 and J2. However, the electric communication path CP can at least partly include a wireless communication path.

The bicycle operating device OD includes a first operating device OD1 and a second operating device OD2. The first operating device OD1 is connected to the electric junction J1 with the electric cable C1. The second operating device OD2 is connected to the electric junction J1 with the electric cable C2. The electric junction J1 is connected to the electric junction J2 with the electric cable C3. The bicycle rear derailleur RD is connected to the electric junction J2 with the electric cable C4. The front derailleur FD is connected to the electric junction J2 with the electric cable C5. The battery holder PS2 is connected to the electric junction J2 with the electric cable C6. Thus, the power supply PS is electrically connected to the bicycle operating device OD, the bicycle rear derailleur RD, and the front derailleur FD with the electric cables C1 to C6 and the electric junctions J1 and J2.

Figure 3:
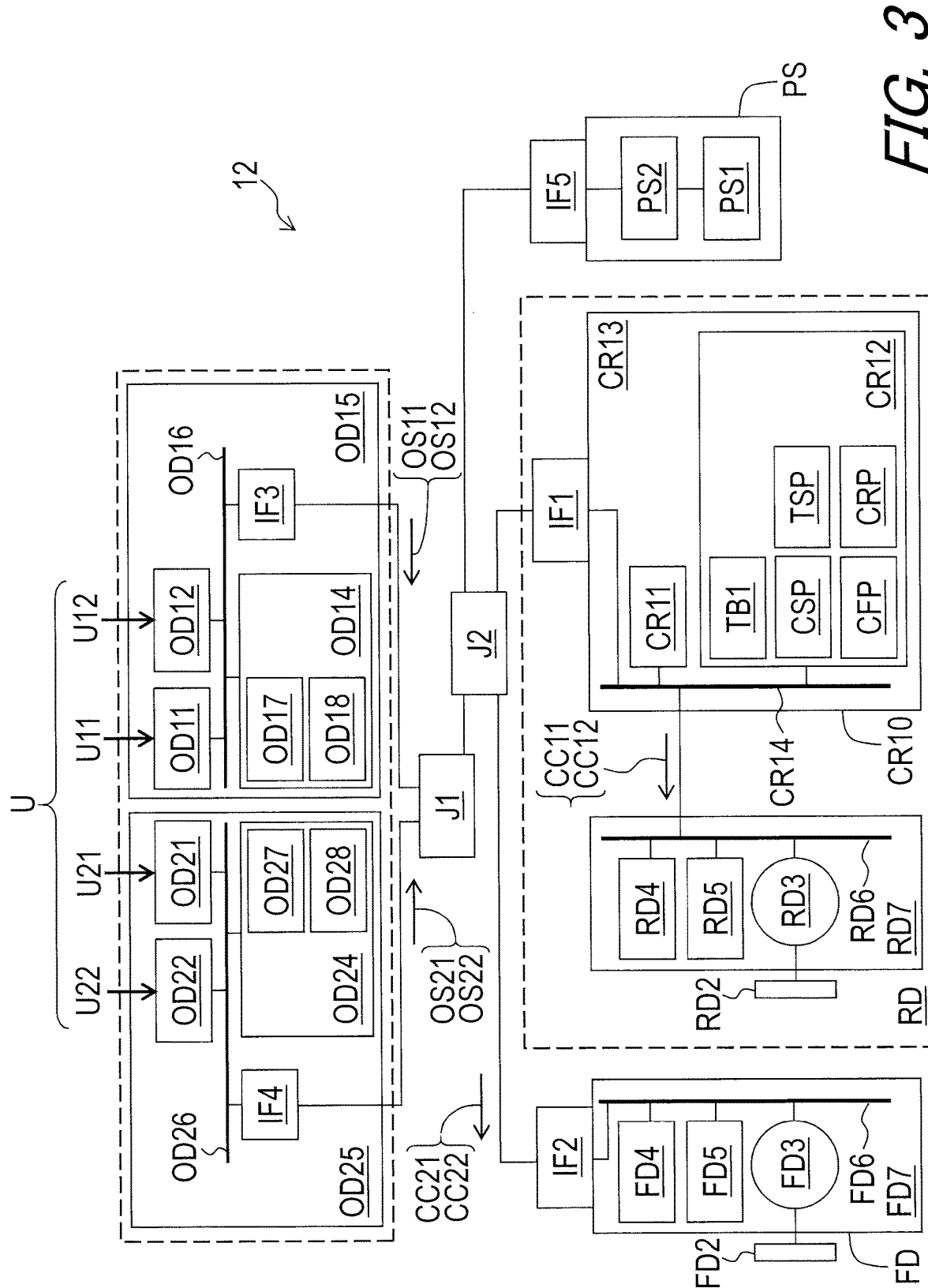
FIG. 3 is a schematic block diagram of the bicycle shifting control apparatus illustrated in FIG. 1.

As seen in FIG. 3, the bicycle operating device OD is configured to receive a user input U to operate the front derailleur FD and the bicycle rear derailleur RD. However, the bicycle operating device OD can be configured to receive another user input to operate another bicycle component.

The user input U includes a shift-changing user input. In this embodiment, the user input U includes a rear upshift user input U11, a rear downshift user input U12, a front upshift user input U21, and a front downshift user input U22.

In this embodiment, the first operating device OD1 includes a rear upshift switch OD11, a rear downshift switch OD12, a first operation controller OD14, and a first circuit board OD15. The rear upshift switch OD11, the rear downshift switch OD12, and the first operation controller OD14 are electrically mounted on the first circuit board OD15 and are electrically connected to each other with a bus OD16. The rear upshift switch OD11 is configured to receive the rear upshift user input U11 from the user. The rear upshift switch OD11 is configured to generate a rear upshift signal OS11 in response to the rear upshift user input U11. The rear downshift switch OD12 is configured to receive the rear downshift user input U12 from the user. The rear downshift switch OD12 is configured to generate a rear downshift signal OS12 in response to the rear downshift user input U12. For example, each of the rear upshift switch OD11 and the rear downshift switch OD12 includes a push-button switch.

The first operation controller OD14 is electrically connected to the rear upshift switch OD11 to generate the rear upshift signal OS11 in response to the rear upshift user input U11 received by the rear upshift switch OD11. The first operation controller OD14 is electrically connected to the rear downshift switch OD12 to generate the rear downshift signal OS12 in response to the rear downshift user input U12 received by the rear downshift switch OD12.

In this embodiment, the first operation controller OD14 includes a processor OD17 and a memory OD18. The processor OD17 and the memory OD18 are electrically mounted on the first circuit board OD15. The processor OD17 includes a central processing unit (CPU) and a memory controller. The memory OD18 is electrically connected to the processor OD17. The memory OD18 includes a read only memory (ROM) and a random-access memory (RAM). The ROM includes a non-transitory computer-readable storage medium. The RAM includes a transitory computer-readable storage medium. The memory OD18 includes storage areas each having an address in the ROM and the RAM. The processor OD17 controls the memory OD18 to store data in the storage areas of the memory OD18 and reads data from the storage areas of the memory OD18. The memory OD18 (e.g., the ROM) stores a program. The program is read into the processor OD17, and thereby functions of the first operation controller OD14 is performed.

The second operating device OD2 includes a front upshift switch OD21, a front downshift switch OD22, a second operation controller OD24, and a second circuit board OD25. The front upshift switch OD21, the front downshift switch OD22, and the second operation controller OD24 are electrically mounted on the second circuit board OD25 and are electrically connected to each other with a bus OD26. The front upshift switch OD21 is configured to receive the front upshift user input U21 from the user. The front upshift switch OD21 is configured to generate a front upshift signal OS21 in response to the front upshift user input U21. The front downshift switch OD22 is configured to receive the front downshift user input U22 from the user. The front downshift switch OD22 is configured to generate a front downshift signal OS22 in response to the front downshift user input U22. For example, each of the front upshift switch OD21 and the front downshift switch OD22 includes a push-button switch.

The second operation controller OD24 is electrically connected to the front upshift switch OD21 to generate the front upshift signal OS21 in response to the front upshift user input U21 received by the front upshift switch OD21. The second operation controller OD24 is electrically connected to the front downshift switch OD22 to generate the front downshift signal OS22 in response to the front downshift user input U22 received by the front downshift switch OD22.

In this embodiment, the second operation controller OD24 includes a processor OD27 and a memory OD28. The processor OD27 and the memory OD28 are electrically mounted on the second circuit board OD25. The processor OD27 includes a CPU and a memory controller. The memory OD28 is electrically connected to the processor OD27. The memory OD28 includes a ROM and a RAM. The ROM includes a non-transitory computer-readable storage medium. The RAM includes a transitory computer-readable storage medium. The memory OD28 includes storage areas each having an address in the ROM and the RAM. The processor OD27 controls the memory OD28 to store data in the storage areas of the memory OD28 and reads data from the storage areas of the memory OD28. The memory OD28 (e.g., the ROM) stores a program. The program is read into the processor OD27, and thereby functions of the second operation controller OD24 is performed.

As seen in FIG. 3, the bicycle shifting control apparatus 12 comprises a controller CR10. In this embodiment, the bicycle rear derailleur RD comprises the controller CR10. However, the controller CR10 can be mounted to another device other than the bicycle rear derailleur RD. For example, the controller CR10 can be mounted in at least one of the bicycle operating device OD, the battery holder PS2, and the front derailleur FD instead of or in addition to the bicycle rear derailleur RD.

The controller CR10 is configured to receive the rear upshift signal OS11 from the rear upshift switch OD11. The controller CR10 is configured to receive the rear downshift signal OS12 from the rear downshift switch OD12. The controller CR10 is configured to receive the front upshift signal OS21 from the front upshift switch OD21. The controller CR10 is configured to receive the front downshift signal OS22 from the front downshift switch OD22.

The controller CR10 is configured to generate a rear upshift control command CC11 in response to the rear upshift signal OS11. The controller CR10 is configured to generate a rear downshift control command CC12 in response to the rear downshift signal OS12. The controller CR10 is configured to generate a front upshift control command CC21 in response to the front upshift signal OS21.

The controller CR10 is configured to generate a front downshift control command CC22 in response to the front downshift signal OS22.

Figure 4:
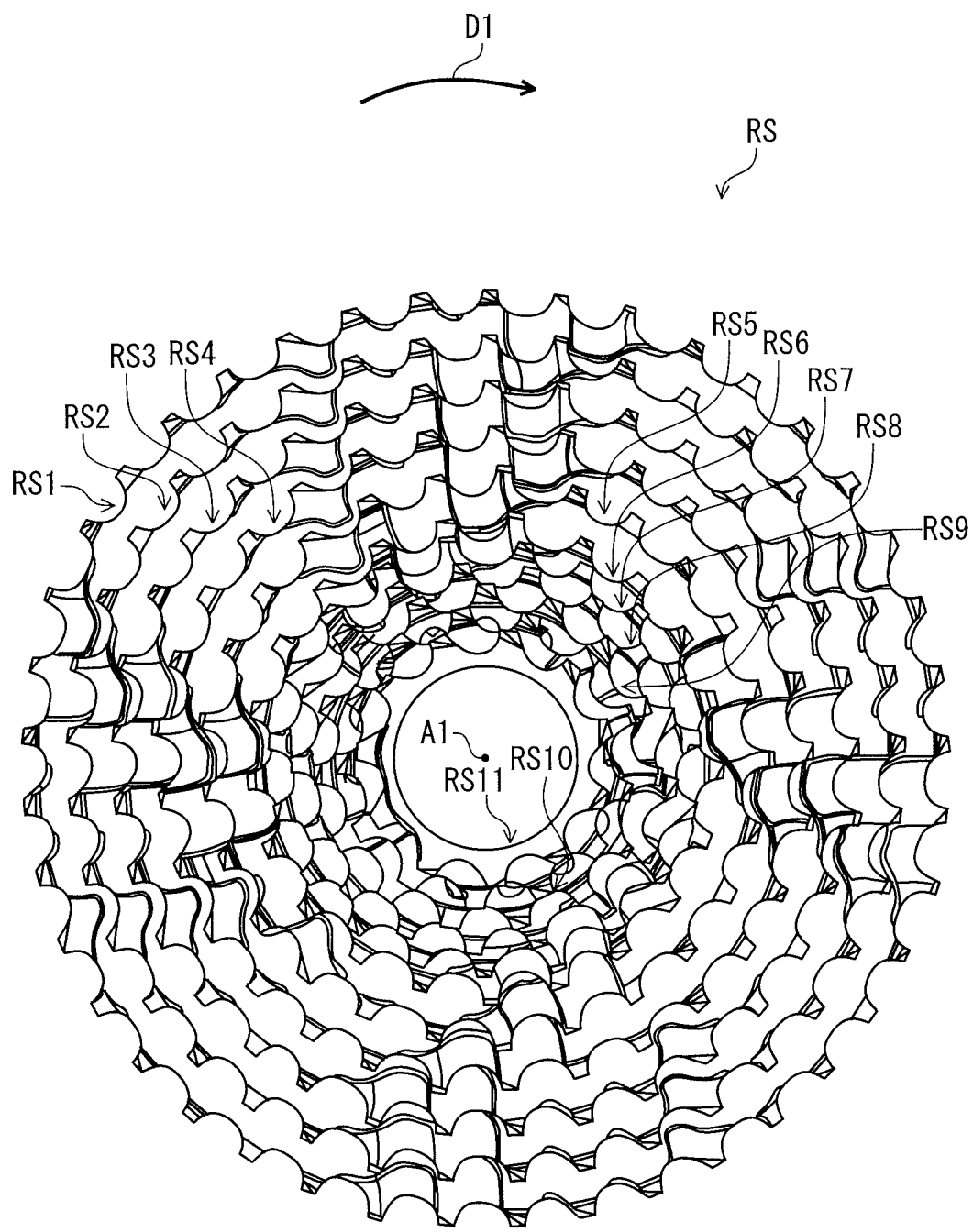
FIG. 4 is a side elevational view of a rear sprocket assembly of the bicycle illustrated in FIG. 1.

As seen in FIG. 4, the rear sprocket assembly RS has a rotational center axis A1 and is rotatable about the rotational center axis A1 in a rotational driving direction D1. The rear sprocket assembly RS includes a plurality of sprockets. In this embodiment, the rear sprocket assembly RS includes first to eleventh rear sprockets RS1 to RS11. However, a total number of the rear sprockets is not limited to this embodiment. The first rear sprocket RS1 has the largest pitch-circle diameter in the rear sprocket assembly RS and corresponds to low gear. The eleventh rear sprocket RS11 has the smallest pitch-circle diameter in the rear sprocket assembly RS and corresponds to top gear.

Figure 5:
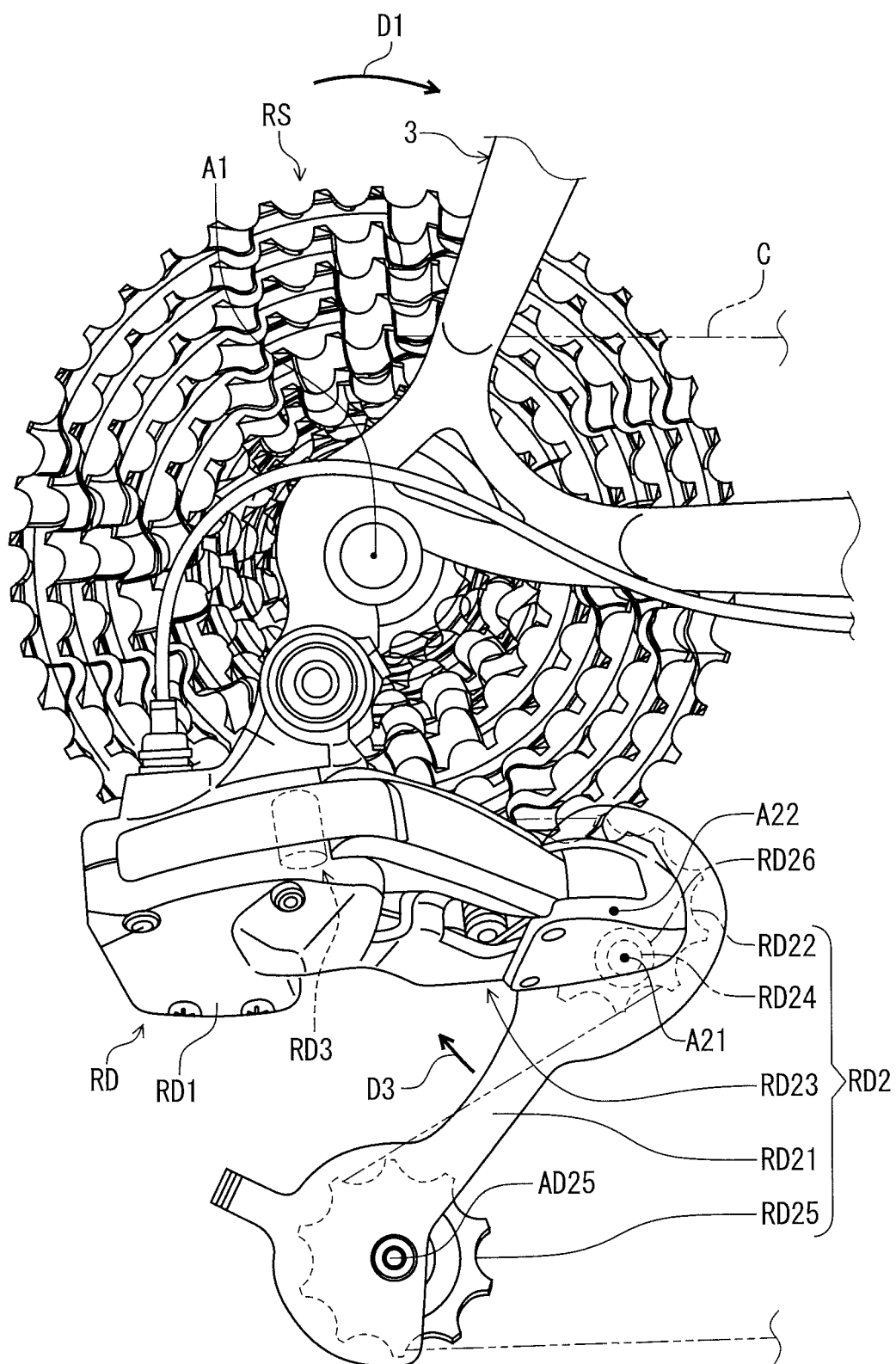
FIG. 5 is a side elevational view of the rear sprocket assembly and a bicycle rear derailleur of the bicycle illustrated in FIG. 1.

As seen in FIG. 5, the bicycle rear derailleur RD comprises a base member RD1, a chain guide RD2, and an actuator RD3. The base member RD1 is mounted to the bicycle frame 3. The chain guide RD2 is movably coupled to the base member RD1. The actuator RD3 is operatively coupled to the chain guide RD2 to move the chain guide RD2 relative to the base member RD1.

The chain guide RD2 includes a guide plate RD21, a guide pulley RD22, and a link structure RD23. The guide pulley RD22 is rotatably coupled to the guide plate RD21 about a rotational axis A22. The link structure RD23 movably couples the guide plate RD21 to the base member RD1. The guide plate RD21 is pivotally coupled to the link structure RD23 about a pivot axis A21 with a pivot shaft RD24. The rotational axis A22 of the guide pulley RD22 is offset from the pivot axis A21 of the guide plate RD21 when viewed along the rotational axis A22. The actuator RD3 is coupled to the link structure RD23 to move the guide plate RD21 relative to the base member RD1.

The chain guide RD2 includes an additional guide pulley RD25. The additional guide pulley RD25 is rotatably coupled to the guide plate RD21 about an additional rotational axis A25. The additional rotational axis A25 of the additional guide pulley RD25 is offset from the rotational axis A22 of the guide pulley RD22 and the pivot axis A21 of the guide plate RD21 when viewed along the rotational axis A22.

The chain guide RD2 includes a tension biasing member RD26 to bias the guide plate RD21 in a tension direction D3. A pivotal orientation of the guide plate RD21 changes about the pivot axis A21 relative to the base member RD1 in response to tension of the bicycle chain C. Namely, the pivotal orientation of the guide plate RD21 changes about the pivot axis A21 relative to the base member RD1 based on a current shift position of the bicycle rear derailleur RD and a current shift position of the front derailleur FD.

Figure 6:
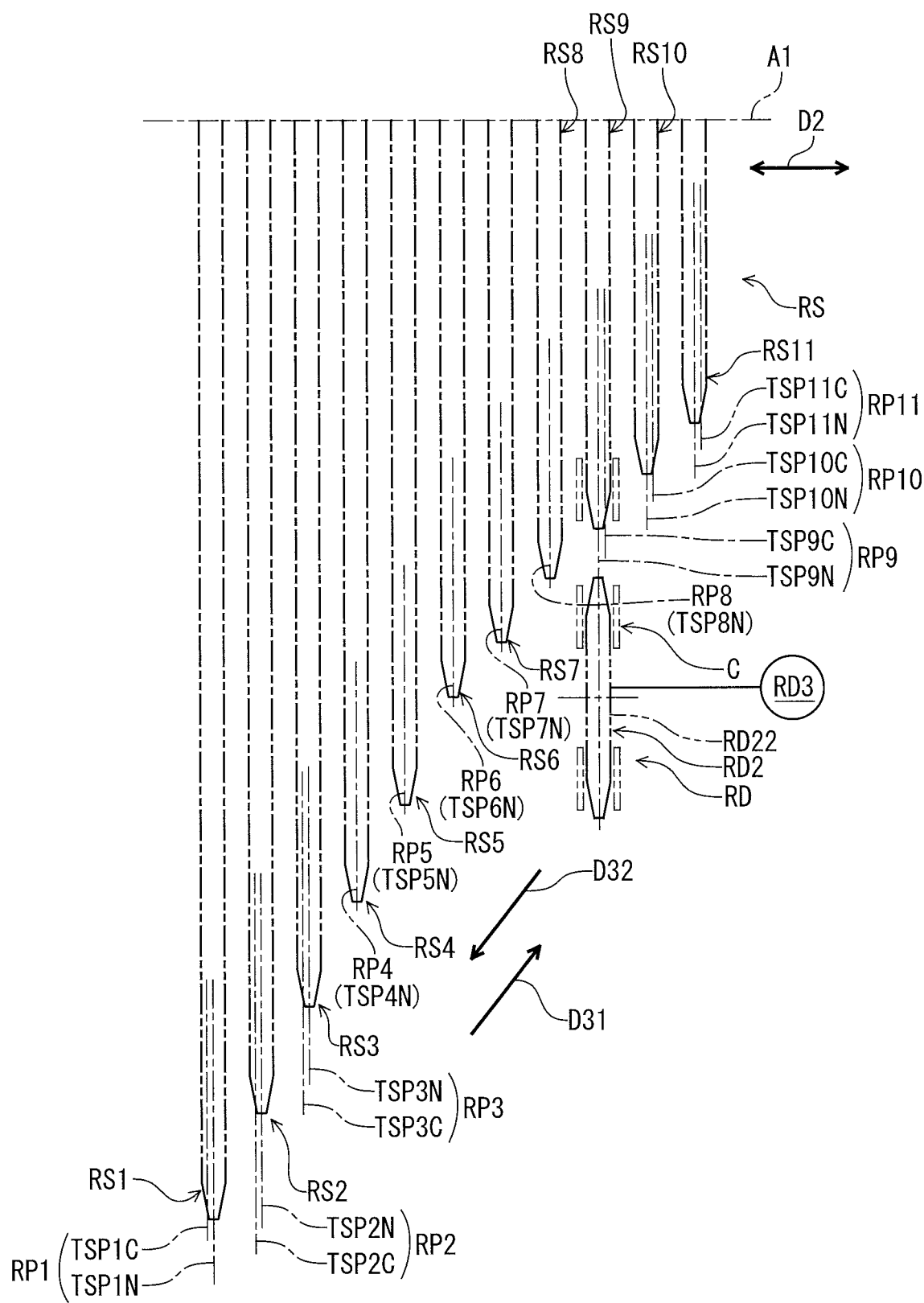
FIG. 6 is a partial rear schematic view of the rear sprocket assembly and the bicycle rear derailleur of the bicycle illustrated in FIG. 1.

As seen in FIG. 6, the first to eleven rear sprockets RS1 to RS11 are arranged in an axial direction D2 parallel to the rotational center axis A1. The first to eleventh rear sprockets RS1 to RS11 are spaced apart from each other in the axial direction D2. In the illustrated embodiment, upshifting occurs when the bicycle rear derailleur RD shifts the bicycle chain C from a larger sprocket to a neighboring smaller sprocket in an upshifting direction D31. Downshifting occurs when the bicycle rear derailleur RD shifts the bicycle chain C from a smaller sprocket to a neighboring larger sprocket in a downshifting direction D32.

The chain guide RD2 is movable relative to the rear sprocket assembly RS in the upshifting direction D31 and the downshifting direction D32. The actuator RD3 is configured to move the chain guide RD2 to shift the bicycle chain C in the upshifting direction D31 and the downshifting direction D32.

In this embodiment, as seen in FIG. 6, the bicycle rear derailleur RD has a plurality of available rear shift positions RP1 to RP11. The available rear shift position RP1 corresponds to low gear, and the available rear shift position RP11 corresponds to top gear. The actuator RD3 is operatively coupled to the chain guide RD2 to move the chain guide RD2 relative to the base member RD1 among the plurality of available rear shift positions RP1 to RP11 and to stop the chain guide RD2 relative to the base member RD1 in any one position of the plurality of available rear shift positions RP1 to RP11. A total number of the rear shift positions is not limited to this embodiment.

In the present application, the term "rear shift position" can encompass a position of the chain guide RD2 and/or a total number of teeth of a rear sprocket engaged with the bicycle chain C.

Figure 7:
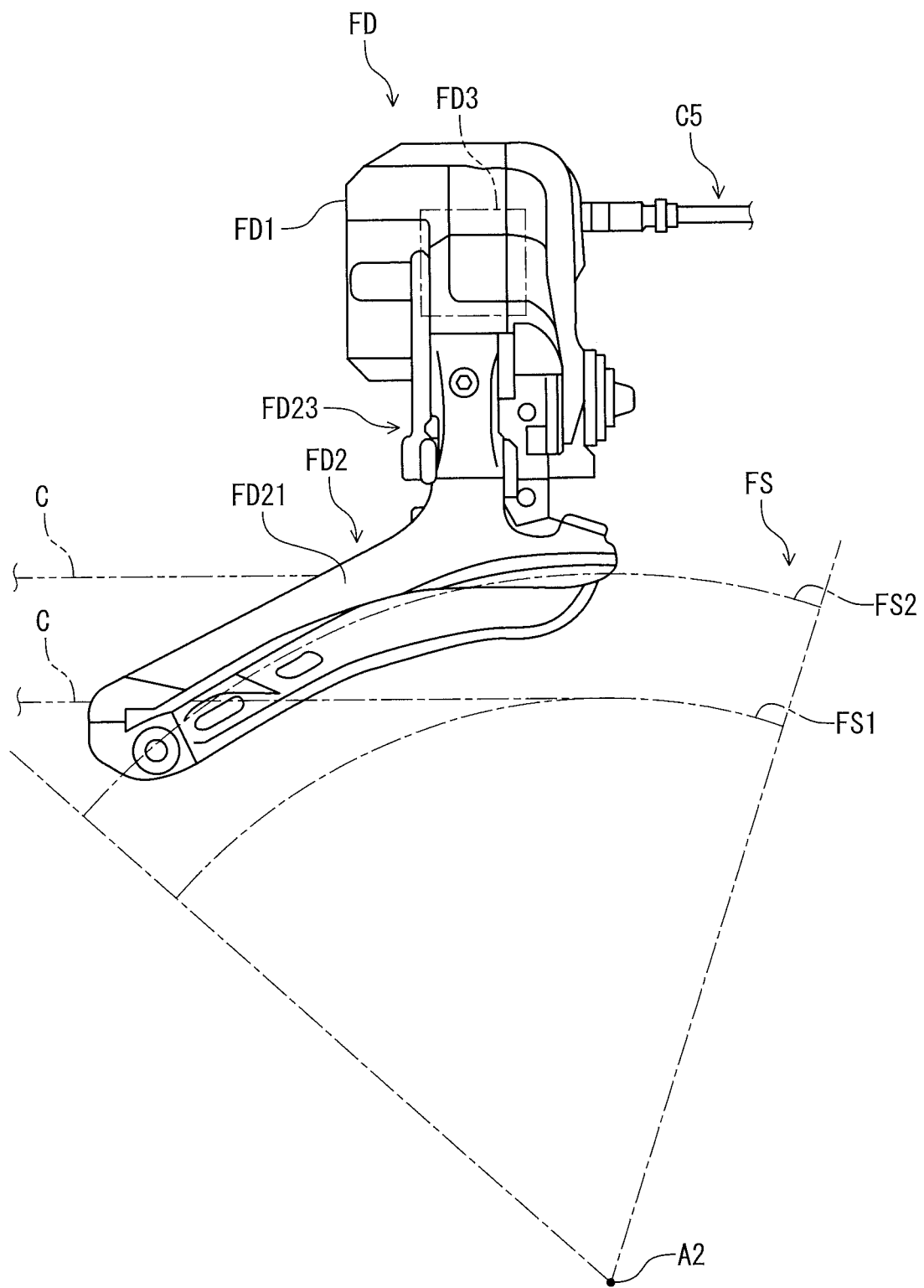
FIG. 7 is a side elevational view of a front sprocket assembly and a front derailleur of the bicycle illustrated in FIG. 1.

As seen in FIG. 7, the front derailleur FD comprises a base member FD1, a chain guide FD2, and an actuator FD3. The base member FD1 is secured to the bicycle frame 3 (FIG. 1). The chain guide FD2 is movably coupled to the base member FD1. The actuator FD3 is operatively coupled to the chain guide FD2 to move the chain guide FD2 relative to the base member FD1.

The chain guide FD2 includes a guide plate FD21 and a link structure FD23. The link structure FD23 movably couples the guide plate FD21 to the base member FD1. The actuator FD3 is coupled to the link structure FD23 to move the guide plate FD21 relative to the base member FD1.

Figure 8:
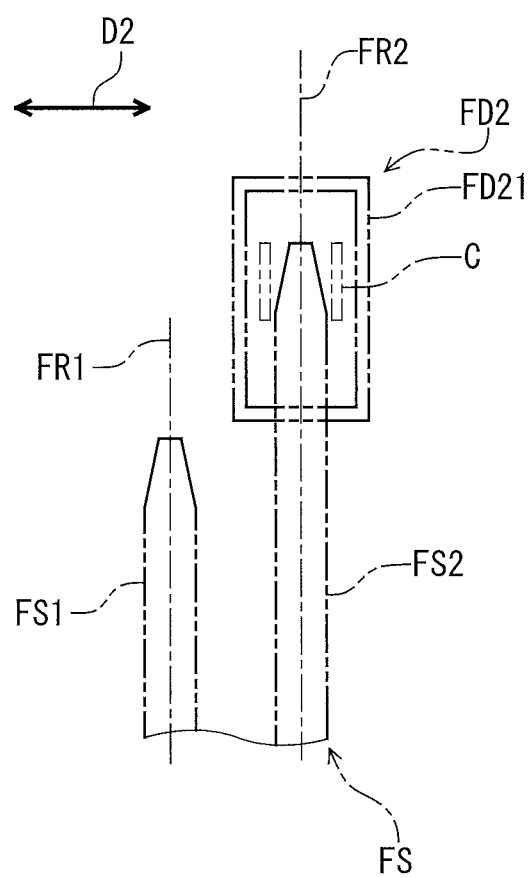
FIG. 8 is a partial rear schematic view of the front sprocket assembly and the front derailleur of the bicycle illustrated in FIG. 1.

In this embodiment, as seen in FIG. 8, the front derailleur FD has a plurality of available front shift positions FP1 and FP2. The available front shift position FP1 corresponds to low gear, and the available front shift position FP2 corresponds to top gear. The actuator FD3 is operatively coupled to the chain guide FD2 to move the chain guide FD2 relative to the base member FD1 among the plurality of available front shift positions FP1 and FP2 and to stop the chain guide FD2 relative to the base member FD1 in any one of the plurality of available front shift positions FP1 and FP2. A total number of the front shift positions is not limited to this embodiment.

In the present application, the term "front shift position" can encompass a position of the chain guide FD2 and/or a total number of teeth of a front sprocket engaged with the bicycle chain C.

As seen in FIG. 3, the bicycle rear derailleur RD includes a motor driver RD4 and a position sensor RD5. The motor driver RD4 is electrically connected to the actuator RD3 to control the actuator RD3 based on commands and/or signals from the controller CR10. Examples of the actuator RD3 include a direct-current (DC) motor and a stepper motor. The actuator RD3 includes a rotational shaft operatively coupled to the chain guide RD2. The position sensor RD5 is configured to sense a current rear shift position CRP of the bicycle rear derailleur RD. Examples of the position sensor RD5 include a potentiometer and a rotary encoder. The position sensor RD5 is configured to sense an absolute rotational position of the rotational shaft of the actuator RD3 as the current rear shift position CRP of the bicycle rear derailleur RD. The actuator RD3, the motor driver RD4, and the position sensor RD5 are electrically connected to each other with a bus RD6. The actuator RD3, the motor driver RD4, and the position sensor RD5 constitute a motor unit RD7.

The motor driver RD4 is configured to control the actuator RD3 to move the chain guide RD2 relative to the base member RD1 in the upshifting direction D31 based on the rear upshift control command CC11 and the current rear shift position CRP sensed by the position sensor RD5. The motor driver RD4 is configured to control the actuator RD3 to stop the chain guide RD2 relative to the base member RD1 based on the target-stop position TSP included in the rear upshift control command CC11 and the current rear shift position CRP sensed by the position sensor RD5.

The motor driver RD4 is configured to control the actuator RD3 to move the chain guide RD2 relative to the base member RD1 (FIG. 5) in the downshifting direction D32 (FIG. 6) based on the rear downshift control command CC12 and the current rear shift position CRP sensed by the position sensor RD5. The motor driver RD4 is configured to control the actuator RD3 to stop the chain guide RD2 relative to the base member RD1 (FIG. 5) based on the target-stop position TSP included in the rear downshift control command CC12 and the current rear shift position CRP sensed by the position sensor RD5.

As seen in FIG. 3, the front derailleur FD includes a motor driver FD4 and a position sensor FD5. The motor driver FD4 is electrically connected to the actuator FD3 to control the actuator FD3 based on commands and/or signals from the controller CR10. Examples of the actuator FD3 include a DC motor and a stepper motor. The actuator FD3 includes a rotational shaft operatively coupled to the chain guide FD2. The position sensor FD5 is configured to sense a current front shift position of the front derailleur FD. Examples of the position sensor FD5 include a potentiometer and a rotary encoder. The position sensor FD5 is configured to sense an absolute rotational position of the rotational shaft of the actuator FD3 as the current front shift position of the front derailleur FD. The actuator FD3, the motor driver FD4, and the position sensor FD5 are electrically connected to each other with a bus FD6. The actuator FD3, the motor driver FD4, and the position sensor FD5 constitute a motor unit FD7.

The motor driver FD4 is configured to control the actuator FD3 to move the chain guide FD2 relative to the base member FD1 in the upshifting direction D31 based on the front upshift control command CC21 and the current front shift position sensed by the position sensor FD5. The motor driver FD4 is configured to control the actuator FD3 to stop the chain guide FD2 relative to the base member FD1 based on the target-stop position TSP included in the front upshift control command CC21 and the current front shift position sensed by the position sensor FD5.

The motor driver FD4 is configured to control the actuator FD3 to move the chain guide FD2 relative to the base member FD1 in the downshifting direction D32 based on the front downshift control command CC22 and the current front shift position sensed by the position sensor FD5.

In the illustrated embodiment, the controller CR10 is constituted as a microcomputer and includes a processor CR11, a memory CR12, and a circuit board CR13. The processor CR11 includes a CPU and a memory controller. The memory CR12 is electrically connected to the processor CR11. The memory CR12 includes a ROM and a RAM. The ROM includes a non-transitory computer-readable storage medium. The RAM includes a transitory computer-readable storage medium. The memory CR12 includes storage areas each having an address in the ROM and the RAM. The processor CR11 controls the memory CR12 to store data in the storage areas of the memory CR12 and reads data from the storage areas of the memory CR12.

At least one program is stored in the memory CR12 (e.g., the ROM). The at least one program is read into the processor CR11, and thereby configurations of the controller CR10 are performed. The processor CR11 and the memory CR12 are mounted on the circuit board CR13 and are connected to each other with a bus CR14. Thus, the controller CR10 can also be referred to as a control circuit or circuitry CR10. The controller CR10 generates the rear upshift control command CC11, the rear downshift control command CC12, the front upshift control command CC21, and the front downshift control command CC22. The bus CR14 is connected to the bus RD6. The rear upshift control command CC11 and the rear downshift control command CC12 are transmitted from the controller CR10 to the motor driver RD4.

In this embodiment, the bicycle rear derailleur RD, the front derailleur FD, the power supply PS, and the bicycle operating device OD communicate with each other via the electric communication path CP using power line communication (PLC) technology. More specifically, each of the electric cables C1 to C6 includes a ground line and a voltage line that are detachably connected to a serial bus that is formed by communication interfaces and the electric junctions J1 and J2. In this embodiment, the bicycle rear derailleur RD, the front derailleur FD, the power supply PS, and the bicycle operating device OD can all communicate with each other through the voltage line using the PLC technology. Thus, the front upshift control command CC21 and the front downshift control command CC22 are transmitted from the controller CR10 to the front derailleur FD.

The PLC technology is used for communicating between electric components. The PLC carries data on a conductor that is also used simultaneously for electric power transmission or electric power distribution to the electric components. In this embodiment, electricity is supplied from the power supply PS to the bicycle rear derailleur RD, the front derailleur FD, and the bicycle operating device OD via the electric communication path CP. Furthermore, the controller CR10 can receive information signals from the bicycle rear derailleur RD, the front derailleur FD, the power supply PS, and the bicycle operating device OD via the electric communication path CP using the PLC.

The PLC uses unique identifying information such as a unique identifier that is assigned to each of the bicycle rear derailleur RD, the front derailleur FD, the power supply PS, the first operating device OD1, and the second operating device OD2. Each of the electric components RD, FD, PS, OD1, and OD2 includes a memory in which the unique identifying information is stored. Based on the unique identifying information, each of the electric components RD, FD, PS, OD1, and OD2 can recognize information signals which are necessary for itself among information signals transmitted via the electric communication path CP. For example, the controller CR10 can recognize information signals transmitted from the bicycle rear derailleur RD, the front derailleur FD, the power supply PS, the first operating device OD1, and the second operating device OD2 with the electric communication path CP. Instead of using the PLC technology, however, separate signal wires can be provided for transmitting data in addition to the ground wire and the voltage wire if needed and/or desired.

The controller CR10 includes an interface IF1. The interface IF1 is electrically connected to the processor CR11 and the memory CR12 with the bus CR14. The interface IF1 is electrically connected to the front derailleur FD, the power supply PS, and the bicycle operating device OD to communicate with the front derailleur FD, the power supply PS, and the bicycle operating device OD using the PLC. However, the interface IF1 can be configured to communicate with the front derailleur FD, the power supply PS, and the bicycle operating device OD using another communication protocol.

The interface IF1 includes a circuit configured to transmit and receive a signal to and from other components via the electric communication path CP using the PLC. The interface IF1 is configured to separate input signals to the power source voltage and information signals. The interface IF1 is configured to regulate the power source voltage to a level at which various components of the controller CR10, the motor driver RD4, and the position sensor RD5 can properly operate. The interface IF1 is configured to superimpose at least one of the front upshift control command CC21 and the front downshift control command CC22 to the power source voltage. The interface IF1 can be configured to superimpose at least one of the rear upshift control command CC11 and the rear downshift control command CC12 to the power source voltage.

The front derailleur FD includes an interface IF2. The interface IF2 is electrically connected to the motor driver FD4 and the position sensor FD5 with the bus FD6. The interface IF2 is electrically connected to the bicycle rear derailleur RD and the bicycle operating device OD to communicate with the bicycle rear derailleur RD and the bicycle operating device OD using the PLC. However, the interface IF2 can be configured to communicate with the bicycle rear derailleur RD and the bicycle operating device OD using another communication protocol.

The first operating device OD1 includes an interface IF3. The interface IF3 is electrically connected to the rear upshift switch OD11, the rear downshift switch OD12, and the first operation controller OD14 with the bus OD16. The interface IF3 is electrically connected to the bicycle rear derailleur RD and the front derailleur FD to communicate with the bicycle rear derailleur RD and the front derailleur FD using the PLC. However, the interface IF3 can be configured to communicate with the bicycle rear derailleur RD and the front derailleur FD using another communication protocol.

The second operating device OD2 includes an interface IF4. The interface IF4 is electrically connected to the front upshift switch OD21, the front downshift switch OD22, and the second operation controller OD24 with the bus OD26. The interface IF4 is electrically connected to the bicycle rear derailleur RD and the front derailleur FD to communicate with the bicycle rear derailleur RD and the front derailleur FD using the PLC. However, the interface IF4 can be configured to communicate with the bicycle rear derailleur RD and the front derailleur FD using another communication protocol.

The power supply PS includes an interface IF5. The interface IF5 is electrically connected to the battery holder PS2. The interface IF5 is electrically connected to the bicycle operating device OS, the bicycle rear derailleur RD, and the front derailleur FD to communicate with the bicycle operating device OD, the bicycle rear derailleur RD, and the front derailleur FD using the PLC. However, the interface IF5 can be configured to communicate with the bicycle operating device OD, the bicycle rear derailleur RD, and the front derailleur FD using another communication protocol.

The interfaces IF2, IF3, IF4, and IF5 have substantially the same configuration as that of the interface IF1. Thus, they will not be described in detail here for the sake of brevity.

Figure 9:
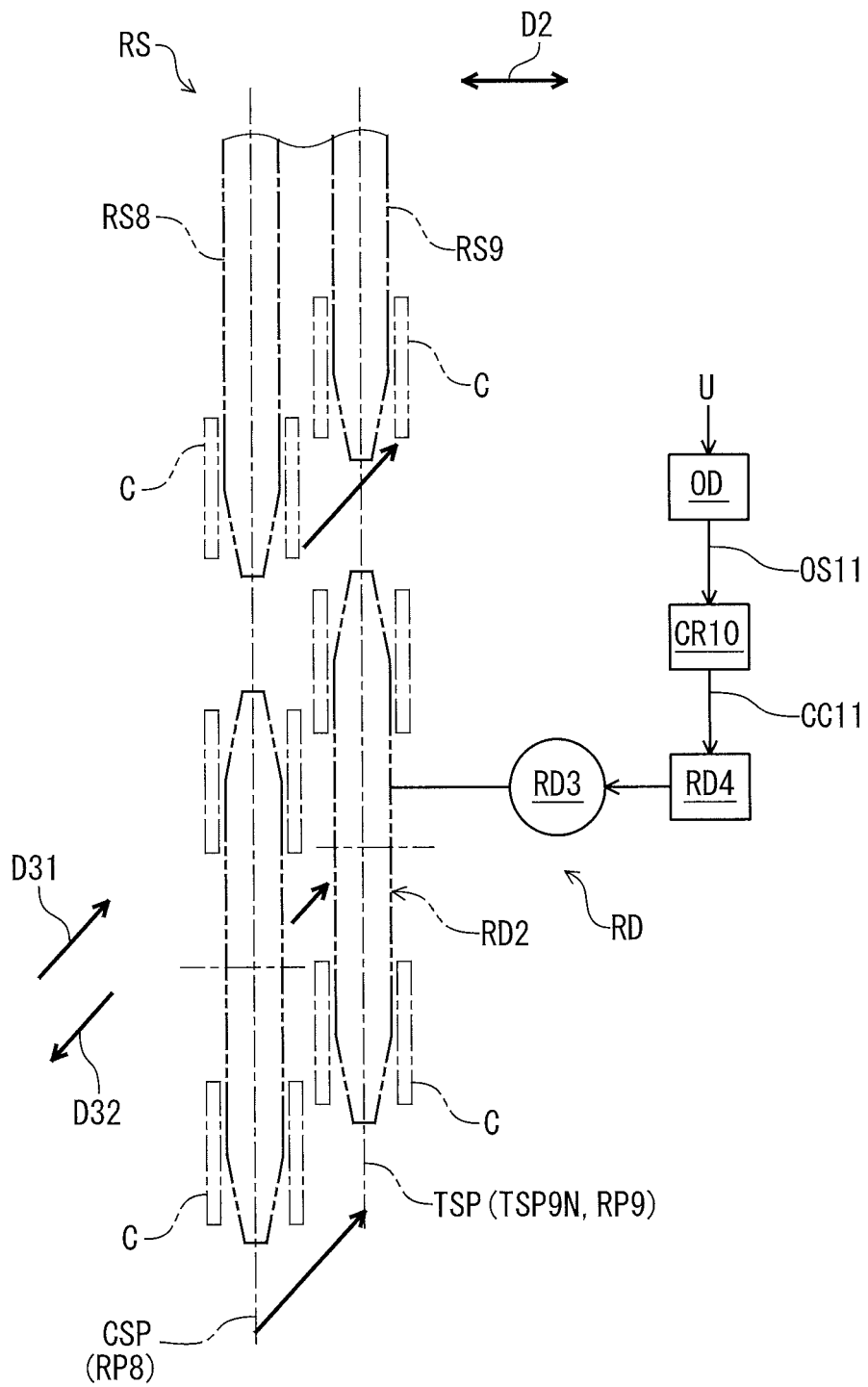
FIGS. 9 and 10 are partial schematic views of the rear sprocket assembly and the bicycle rear derailleur of the bicycle shifting control apparatus illustrated in FIG. 1.
Figure 10:
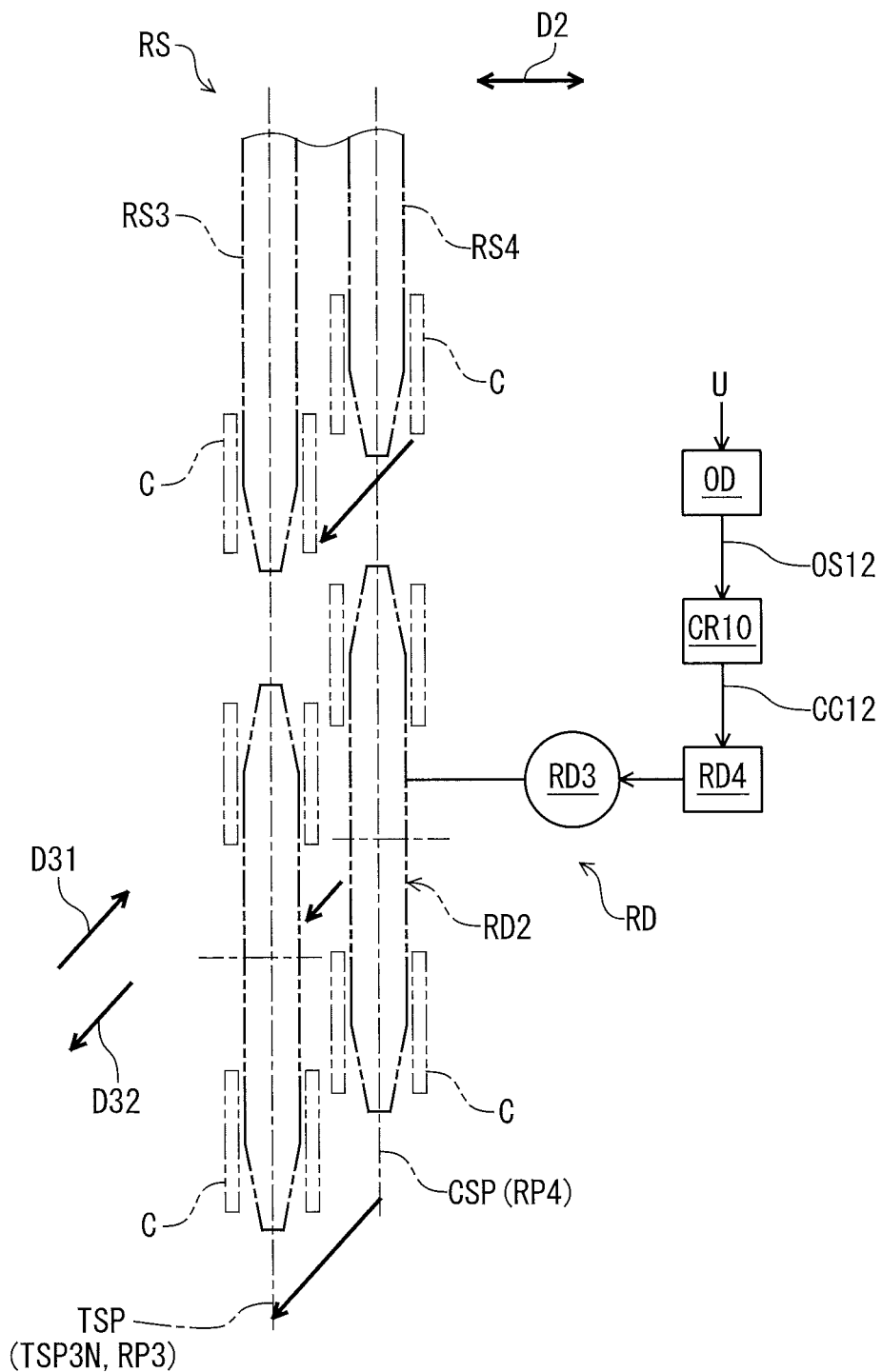

As seen in FIGS. 9 and 10, the controller CR10 is electrically connected to the actuator RD3 to move the chain guide RD2 relative to the base member RD1 (FIG. 5) from a current stop position CSP to a target-stop position TSP. The target-stop position TSP is adjacent to the current stop position CSP without another stop position between the current stop position CSP and the target-stop position TSP. In this embodiment, the controller CR10 controls the actuator RD3 to move the chain guide RD2 relative to the base member RD1 from the current stop position CSP to the target-stop position TSP in response to the user input U received by the bicycle operating device OD. The controller CR10 controls the actuator RD3 to move the chain guide RD2 relative to the base member RD1 from the current stop position CSP to the target-stop position TSP in response to one of the rear upshift signal OS11 and the rear downshift signal OS12.

Figure 11:
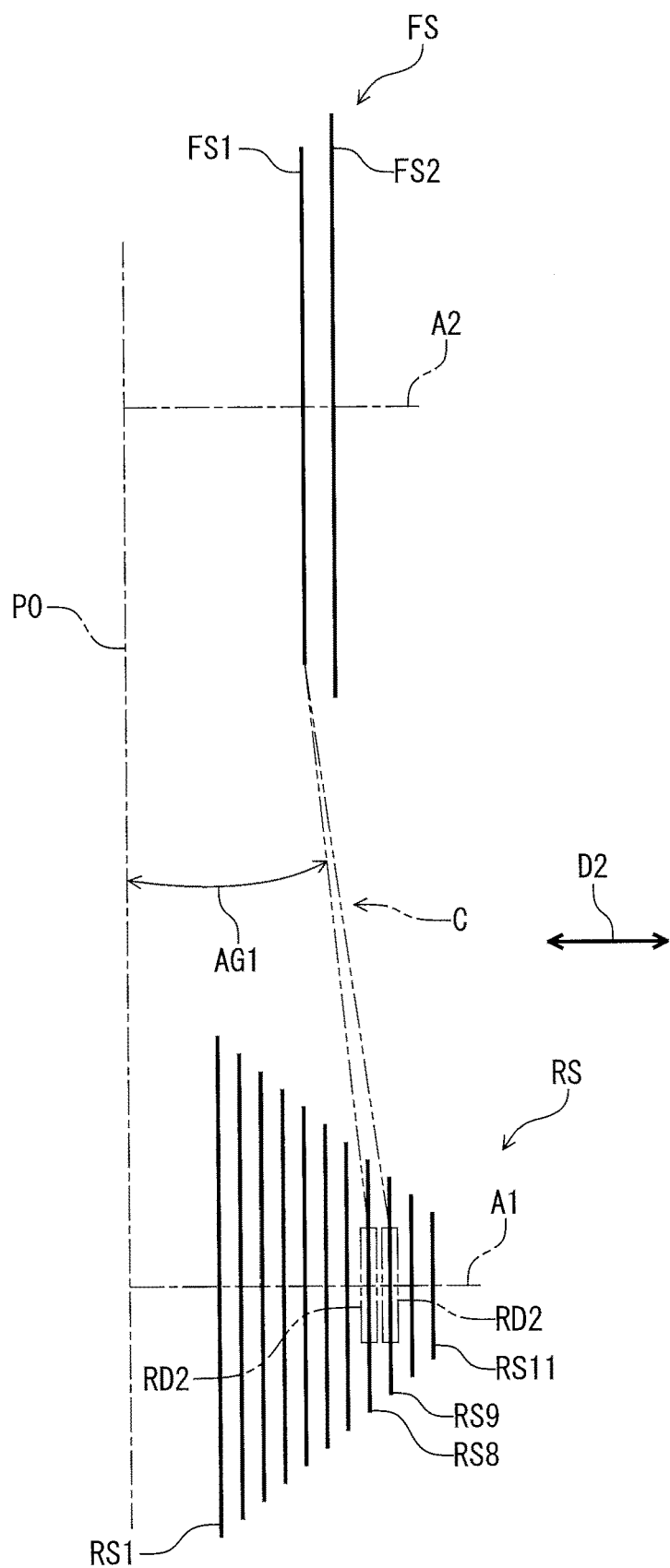
FIGS. 11 to 14 are partial schematic views of the front sprocket assembly, the rear sprocket assembly, and the bicycle rear derailleur of the bicycle shifting control apparatus illustrated in FIG. 1.
Figure 12:
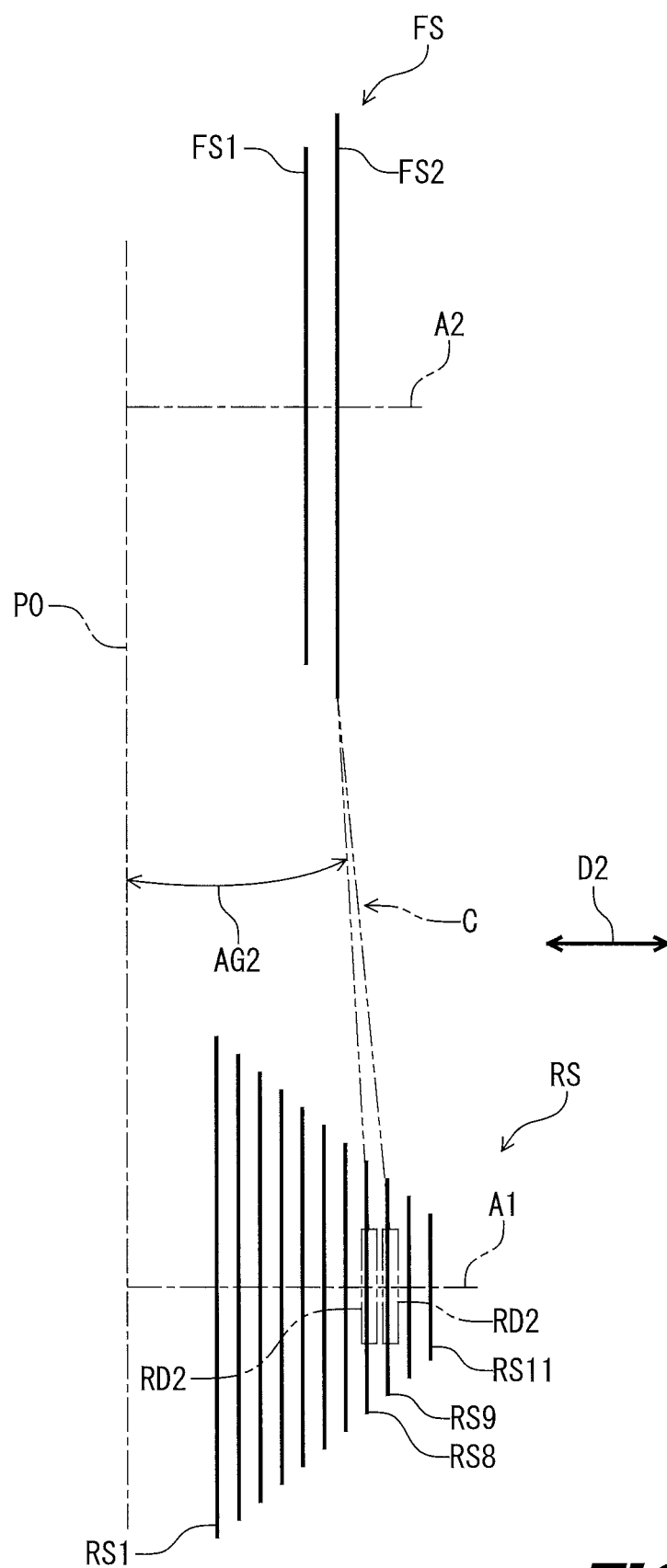

As seen in FIGS. 11 and 12, the bicycle chain C is inclined relative to a reference plane P0 perpendicular to the rotational center axis A1 of the rear sprocket assembly RS in a case where the rear sprocket engaged with the bicycle chain C is offset from the front sprocket engaged with the bicycle chain C. As seen in FIG. 11, for example, the bicycle chain C is inclined relative to the reference plane P0 by a first inclination angle AG1 in a case where the rear sprocket RS8 engaged with the bicycle chain C is offset from the front sprocket FS1 engaged with the bicycle chain C. As seen in FIG. 12, the bicycle chain C is inclined relative to the reference plane P0 by a second inclination angle AG2 in a case where the rear sprocket RS8 engaged with the bicycle chain C is offset from the front sprocket FS2 engaged with the bicycle chain C. The chain guide RD2 is more largely pulled by the bicycle chain C in the axial direction D2 in the case of FIG. 11 compared with the case of FIG. 12 when the chain guide RD2 is moved from the rear sprocket RS8 to the rear sprocket RS9 since the first inclination angle AG1 is larger than the second inclination angle AG2.

Figure 13:
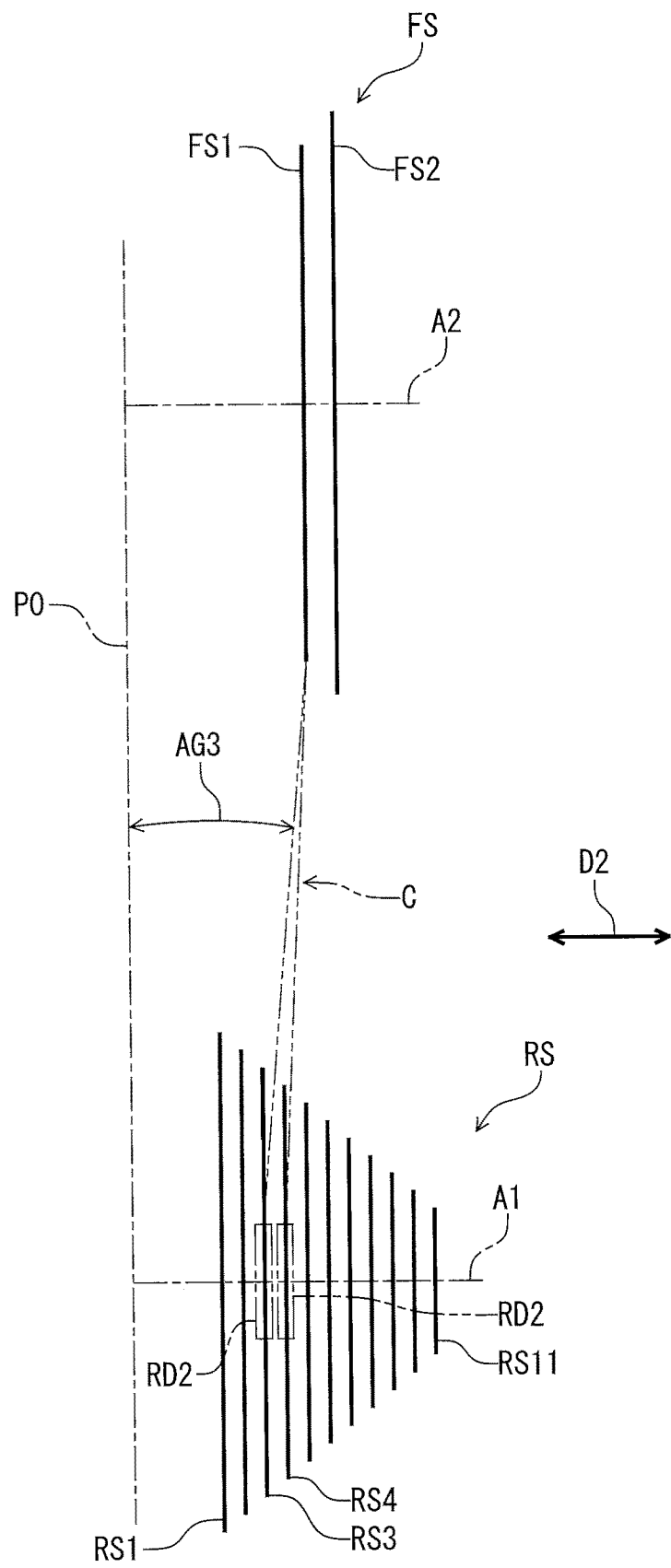
Figure 14:
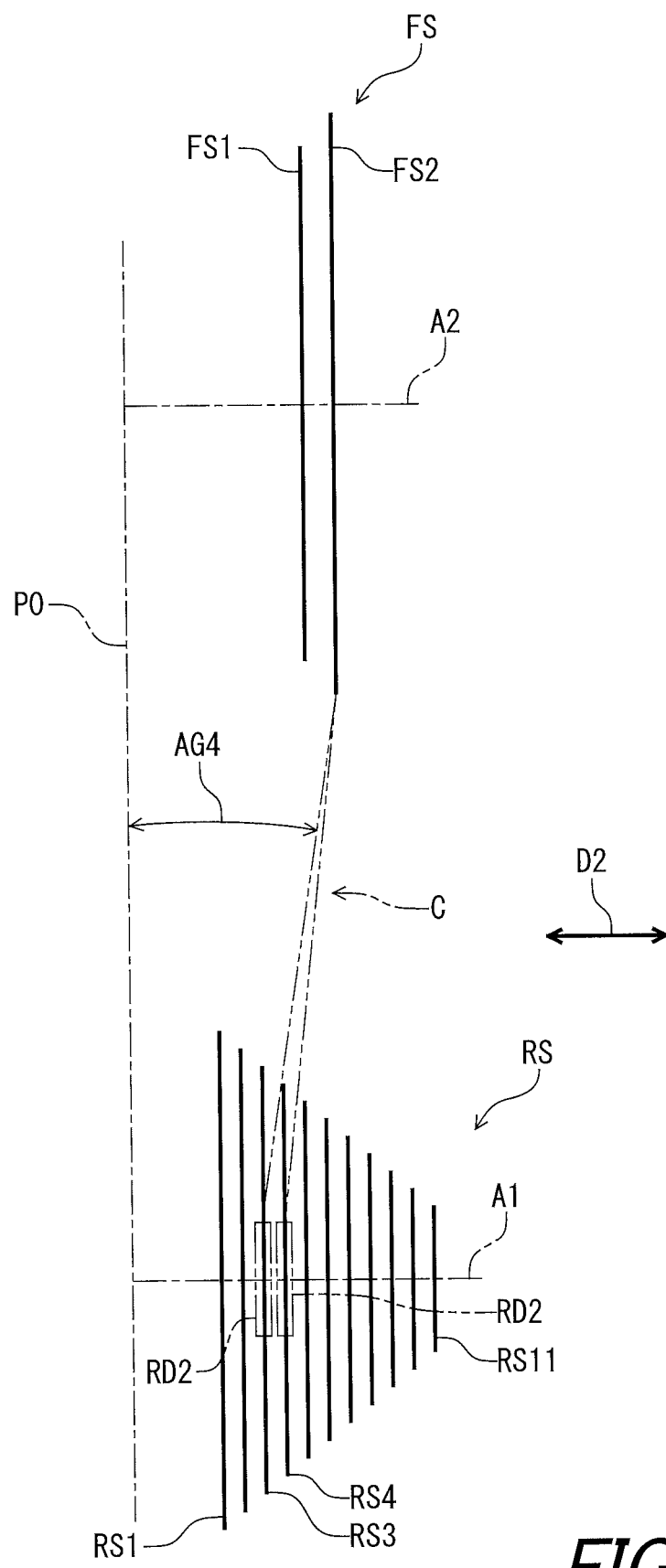

Similarly, as seen in FIGS. 13 and 14, the chain guide RD2 is more largely pulled by the bicycle chain C in the axial direction D2 in the case of FIG. 14 compared with the case of FIG. 13 when the chain guide RD2 is moved from the rear sprocket RS4 to the rear sprocket RS3 since a fourth inclination angle AG4 is larger than a third inclination angle AG3.

Figure 15:
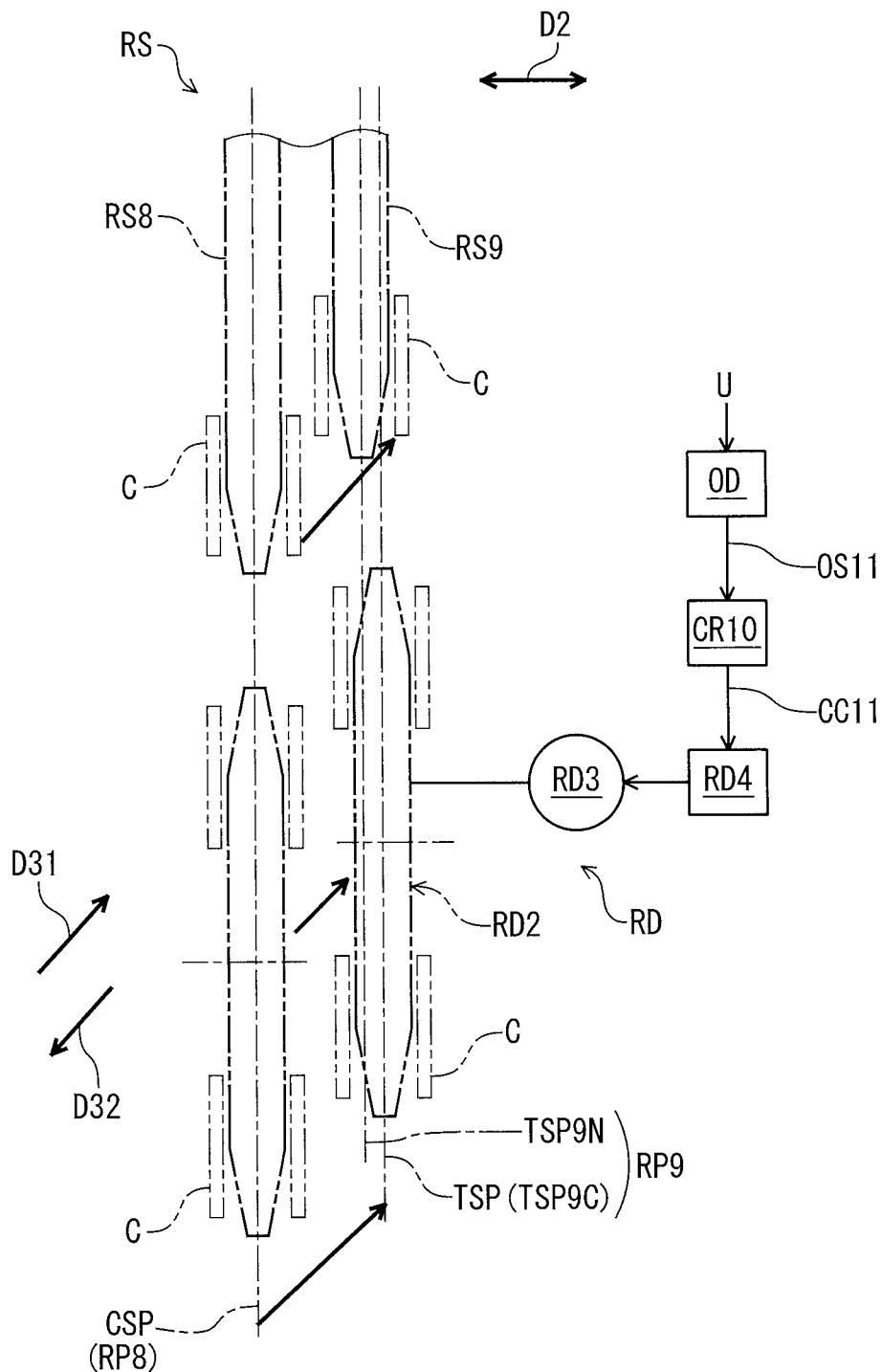
FIGS. 15 and 16 are partial schematic views of the rear sprocket assembly and the bicycle rear derailleur of the bicycle shifting control apparatus illustrated in FIG. 1.
Figure 16:
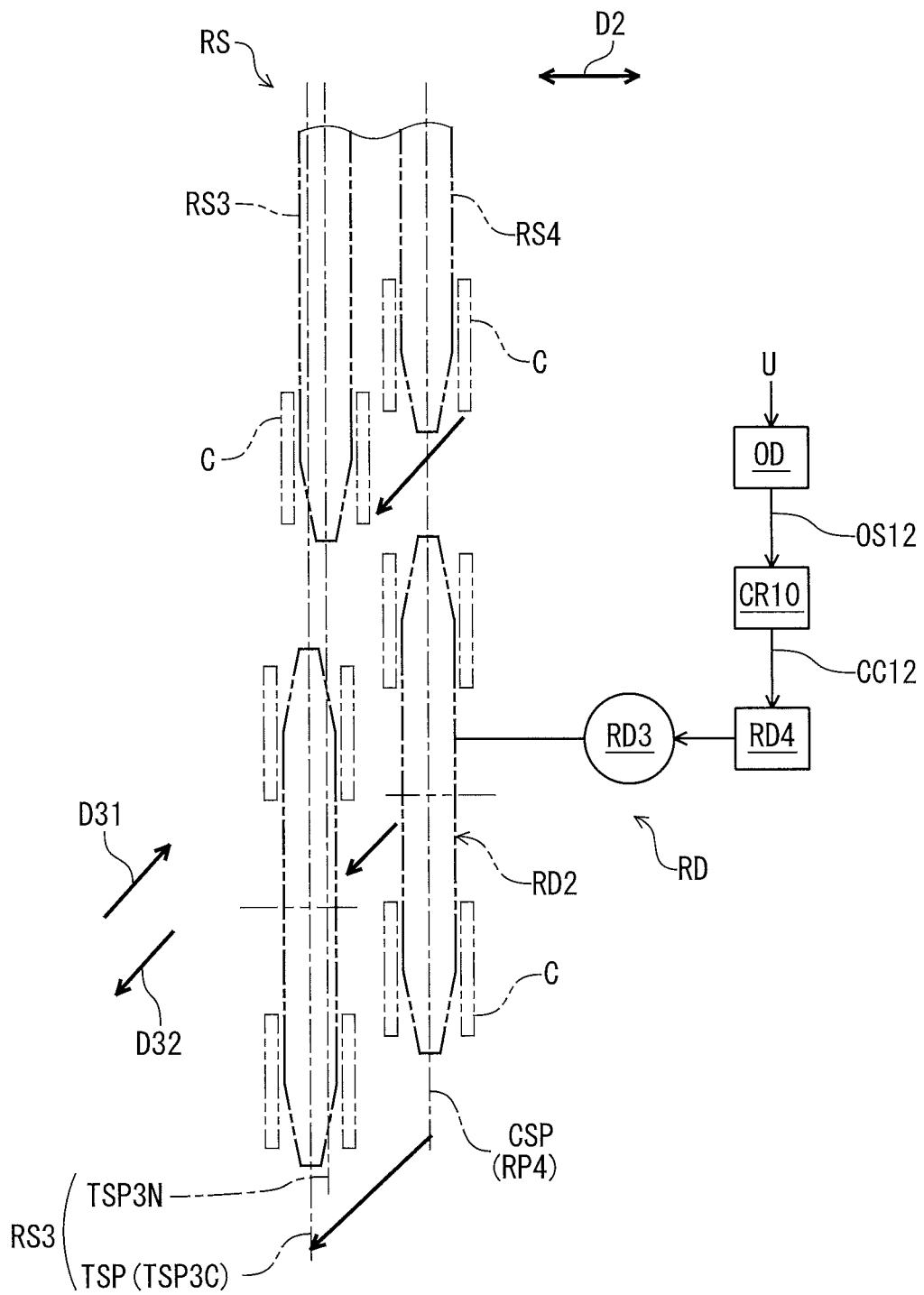

In this embodiment, as seen in FIGS. 15 to 16, the controller CR10 is configured to change, based on the front shift position of the front derailleur FD, at least one of the target-stop position TSP and a temporary position in which the chain guide RD2 temporarily is in a shifting operation in which the chain guide RD2 moves from the current stop position CSP to the target-stop position TSP. Specifically, the controller CR10 is configured to change the at least one of the target-stop position TSP and the temporary position based on the front shift position and the current rear shift position CRP corresponding to the current stop position CSP.

In this embodiment, the controller CR10 is configured to change the target-stop position TSP based on the front shift position, the current rear shift position CRP, and the user input U received by the bicycle operating device OD. However, the controller CR10 can be configured to change the target-stop position TSP or both the target-stop position TSP and the temporary position based on the front shift position, the current rear shift position CRP, and the user input U received by the bicycle operating device OD.

In this embodiment, the front shift position includes a current front shift position. However, the front shift position can include a combination of a previous front shift position and a front shift signal.

The memory CR12 is configured to store the current rear shift position CRP sensed by the position sensor RD5 of the bicycle rear derailleur RD. The memory CR12 is configured to store the current front shift position sensed by the position sensor FD5 of the front derailleur FD.

As seen in FIG. 17, the memory CR12 is configured to store the plurality of available front shift positions FP1 and FP2 of the front derailleur FD. In this embodiment, the memory CR12 is configured to store the plurality of available front shift positions FP1 and FP2 of the front derailleur FD and the plurality of available rear shift positions RP1 to RP11 of the bicycle rear derailleur RD.

The memory CR12 is configured to store the target-stop position TSP and the temporary position in which the chain guide RD2 temporarily is in the shifting operation in which the chain guide RD2 moves from the current stop position CSP to the target-stop position TSP. In this embodiment, the memory CR12 is configured to store the target-stop position TSP. However, the memory CR12 can be configured to store only the temporary position or both the target-stop position TSP and the temporary position.

Specifically, the memory CR12 is configured to store a plurality of available target-stop positions TSP1N to TSP11C of the chain guide RD2. The memory CR12 is configured to store the plurality of available target-stop positions TSP1N to TSP11C of the chain guide RD2 for at least one position of the plurality of available rear shift positions RP1 to RP11. In this embodiment, the memory CR12 is configured to store a plurality of available target-stop positions TSP1N and TSP1C of the chain guide RD2 for the available rear shift position RP1. The memory CR12 is configured to store a plurality of available target-stop positions TSP2N and TSP2C of the chain guide RD2 for the available rear shift position RP2. The memory CR12 is configured to store a plurality of available target-stop positions TSP3N and TSP3C of the chain guide RD2 for the available rear shift position RP3.

The memory CR12 is configured to store an available target-stop position TSP4N of the chain guide RD2 for the available rear shift position RP4. The memory CR12 is configured to store an available target-stop position TSP5N of the chain guide RD2 for the available rear shift position RP5. The memory CR12 is configured to store an available target-stop position TSP6N of the chain guide RD2 for the available rear shift position RP6. The memory CR12 is configured to store an available target-stop position TSP7N of the chain guide RD2 for the available rear shift position RP7. The memory CR12 is configured to store an available target-stop position TSP8N of the chain guide RD2 for the available rear shift position RP8.

The memory CR12 is configured to store a plurality of available target-stop positions TSP9N and TSP9C of the chain guide RD2 for the available rear shift position RP9. The memory CR12 is configured to store a plurality of available target-stop positions TSP10N and TSP10C of the chain guide RD2 for the available rear shift position RP10. The memory CR12 is configured to store a plurality of available target-stop positions TSP11N and TSP11C of the chain guide RD2 for the available rear shift position RP11.

In this embodiment, as seen in FIG. 18, the memory CR12 is configured to store a table TB1. The table TB1 indicates correspondence relationship among the plurality of available front shift positions FP1 and FP2, the plurality of available rear shift positions RP1 to RP11, the rear upshift signal OS11, the rear downshift signal OS12, and the plurality of available target-stop positions. For example, the chain guide RD2 is moved to the available target-stop position TSP in response to the rear upshift signal OS11 in a state where the front shift position is the available front shift position and the rear shift position is the available rear shift position.

The controller CR10 is configured to compare the front shift position with the plurality of available front shift positions FP1 and FP2 before changing the at least one of the target-stop position TSP and the temporary position. In this embodiment, the controller CR10 is configured to compare the front shift position with the plurality of available front shift positions FP1 and FP2 before changing the target-stop position TSP.

Specifically, the controller CR10 is configured to compare the front shift position with the plurality of available front shift positions FP1 and FP2 and compare the current rear shift position CRP with the plurality of available rear shift positions RP1 to RP11 before changing the at least one of the target-stop position TSP and the temporary position. In this embodiment, the controller CR10 is configured to compare the front shift position with the plurality of available front shift positions FP1 and FP2 and compare the current rear shift position CRP with the plurality of available rear shift positions RP1 to RP11 before changing the target-stop position TSP.

The controller CR10 is configured to select, as the target-stop position TSP, one position of the plurality of available target-stop positions TSP1N to TSP11C which corresponds to one position of the plurality of available front shift positions FP1 and FP2 in a case where the controller CR10 concludes that the front shift position is the one position of the plurality of available front shift positions FP1 and FP2.

Specifically, the controller CR10 is configured to select, as the target-stop position TSP, one position of the plurality of available target-stop positions TSP1N to TSP11C which corresponds to one position of the plurality of available front shift positions FP1 and FP2 and one position of the plurality of available rear shift positions RP1 to RP11 in a case where the controller CR10 concludes that the front shift position is the one position of the plurality of available front shift positions FP1 and FP2 and that the current rear shift position CRP is the one position of the plurality of available rear shift positions RP1 to RP11.

The operation of the bicycle shifting control apparatus 12 will be described below referring to FIGS. 19 and 20.

Figure 19:
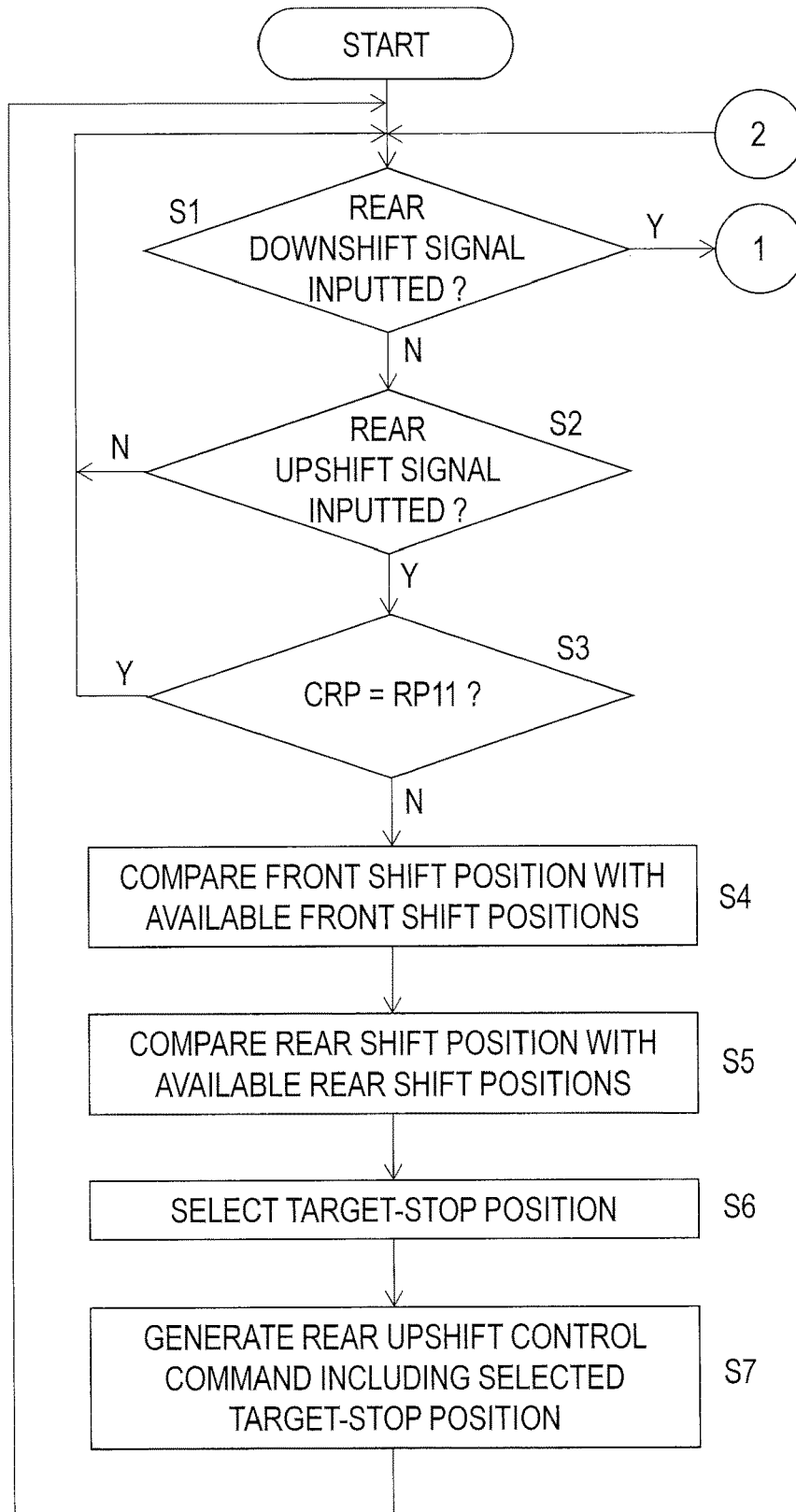
FIGS. 19 and 20 are flow charts showing an operation of the bicycle shifting control apparatus illustrated in FIG. 1.

As seen in FIG. 19, the controller CR10 changes the target-stop position TSP based on the front shift position of the front derailleur FD, the current rear shift position CRP corresponding to the current stop position CSP, and the user input U. In this embodiment, the controller CR10 changes the target-stop position TSP based on the front shift position of the front derailleur FD, the current stop position CSP, and one of the rear upshift signal OS11 and the rear downshift signal OS12.

Specifically, the controller CR10 determines whether one of the rear upshift signal OS11 and the rear downshift signal OS12 is input (steps S1 and S2). The controller CR10 monitors an input of one of the rear upshift signal OS11 and the rear downshift signal OS12 until the controller CR10 receives one of the rear upshift signal OS11 and the rear downshift signal OS12 (steps S1 and S2).

The controller CR10 compares the front shift position with the table TB1 (FIG. 18) when the controller CR10 receives the rear upshift signal OS11. In this embodiment, the controller CR10 compares the front shift position with the plurality of available front shift positions FP1 and FP2 in the table TB1 (FIG. 18) before changing the target-stop position TSP (step S3). The controller CR10 compares the current rear shift position CRP with the plurality of available rear shift positions RP1 to RP11 in the table TB1 (FIG. 18) before changing the target-stop position TSP (step S4). Furthermore, the controller CR10 compares the rear shift signal generated by the bicycle operating device OD with the plurality of available rear shift signals in the table TB1 (FIG. 18) before changing the target-stop position TSP (step S5).

The controller CR10 selects, as the target-stop position TSP, one position of the plurality of available target-stop positions TSP1N to TSP11C which corresponds to one position of the plurality of available front shift positions FP1 and FP2 in a case where the controller CR10 concludes that the front shift position is the one position of the plurality of available front shift positions FP1 and FP2 (step S6).

Specifically, the controller CR10 selects, as the target-stop position TSP, one position of the plurality of available target-stop positions TSP1N to TSP11C which corresponds to one position of the plurality of available front shift positions FP1 and FP2 and one position of the plurality of available rear shift positions RP1 to RP11 in a case where the controller CR10 concludes that the front shift position is the one position of the plurality of available front shift positions FP1 and FP2 and that the current rear shift position CRP is the one position of the plurality of available rear shift positions RP1 to RP11 (step S6).

The controller CR10 generates the rear upshift control command CC11 including the target-stop position TSP selected by the controller CR10 (step S7). The chain guide RD2 is moved relative to the base member RD1 from the current stop position CSP to the target-stop position TSP selected by the controller CR10 in response to the rear upshift control command CC11.

For example, the controller CR10 selects, as the target-stop position TSP, the available target-stop position TSP9C which corresponds to the available front shift position FP1 and the available rear shift position RP8 in response to the rear upshift signal OS11 in a case where the controller CR10 concludes that the front shift position is the available front shift position FP1 and that the current rear shift position CRP is the available rear shift position RP8. The controller CR10 generates the rear upshift control command CC11 including the target-stop position TSP9C selected by the controller CR10 in response to the rear upshift signal OS11. As seen in FIG. 15, the chain guide RD2 is moved relative to the base member RD1 from the current stop position CSP to the target-stop position TSP9C selected by the controller CR10 in response to the rear upshift control command CC11.

The controller CR10 selects, as the target-stop position TSP, the available target-stop position TSP9N which corresponds to the available front shift position FP2 and the available rear shift position RP8 in response to the rear downshift signal OS12 in a case where the controller CR10 concludes that the front shift position is the available front shift position FP2 and that the current rear shift position CRP is the available rear shift position RP8. The controller CR10 generates the rear upshift control command CC11 including the target-stop position TSP9N selected by the controller CR10 in response to the rear upshift signal OS11. As seen in FIG. 9, the chain guide RD2 is moved relative to the base member RD1 from the current stop position CSP to the target-stop position TSP9N selected by the controller CR10 in response to the rear upshift control command CC11.

Figure 20:
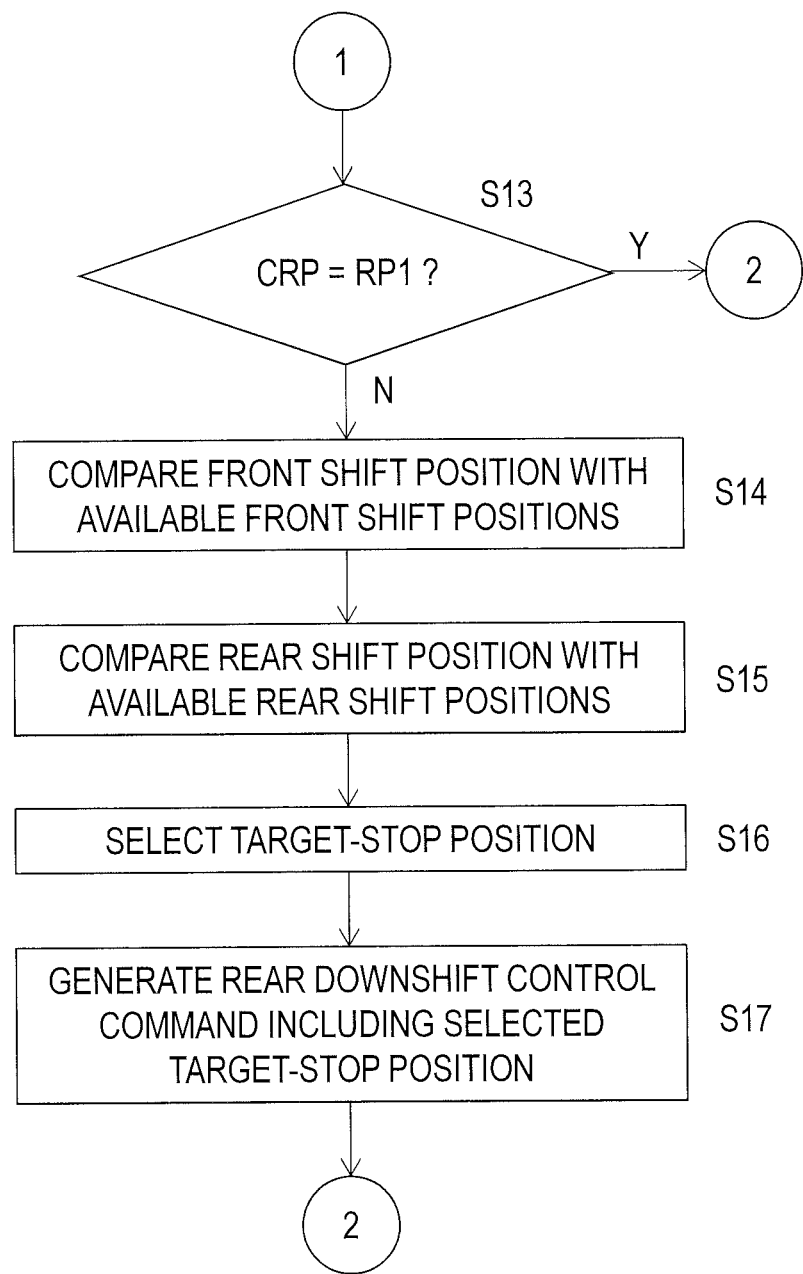

As seen in FIG. 20, the controller CR10 compares the front shift position with the table TB1 (FIG. 18) when the controller CR10 receives the rear downshift signal OS12. In this embodiment, the controller CR10 compares the front shift position with the plurality of available front shift positions FP1 and FP2 in the table TB1 (FIG. 18) before changing the target-stop position TSP (step S13). The controller CR10 compares the current rear shift position CRP with the plurality of available rear shift positions RP1 to RP11 in the table TB1 (FIG. 18) before changing the target-stop position TSP (step S14). Furthermore, the controller CR10 compares the rear shift signal generated by the bicycle operating device OD with the plurality of available rear shift signals in the table TB1 (FIG. 18) before changing the target-stop position TSP (step S15).

The controller CR10 selects, as the target-stop position TSP, one position of the plurality of available target-stop positions TSP1N to TSP11C which corresponds to one position of the plurality of available front shift positions FP1 and FP2 in a case where the controller CR10 concludes that the front shift position is the one position of the plurality of available front shift positions FP1 and FP2 (step S16).

Specifically, the controller CR10 selects, as the target-stop position TSP, one position of the plurality of available target-stop positions TSP1N to TSP11C which corresponds to one position of the plurality of available front shift positions FP1 and FP2 and one position of the plurality of available rear shift positions RP1 to RP11 in a case where the controller CR10 concludes that the front shift position is the one position of the plurality of available front shift positions FP1 and FP2 and that the current rear shift position CRP is the one position of the plurality of available rear shift positions RP1 to RP11 (step S16).

The controller CR10 generates the rear downshift control command CC12 including the target-stop position TSP selected by the controller CR10 (step S17). The chain guide RD2 is moved relative to the base member RD1 from the current stop position CSP to the target-stop position TSP selected by the controller CR10 in response to the rear downshift control command CC12.

For example, the controller CR10 selects, as the target-stop position TSP, the available target-stop position TSP3N which corresponds to the available front shift position FP1 and the available rear shift position RP4 in response to the rear downshift signal OS12 in a case where the controller CR10 concludes that the front shift position is the available front shift position FP1 and that the current rear shift position CRP is the available rear shift position RP4. The controller CR10 generates the rear downshift control command CC12 including the target-stop position TSP3N selected by the controller CR10 in response to the rear downshift signal OS12. As seen in FIG. 10, the chain guide RD2 is moved relative to the base member RD1 from the current stop position CSP to the target-stop position TSP3N selected by the controller CR10 in response to the rear downshift control command CC12.

The controller CR10 selects, as the target-stop position TSP, the available target-stop position TSP3C which corresponds to the available front shift position FP2 and the available rear shift position RP4 in response to the rear downshift signal OS12 in a case where the controller CR10 concludes that the front shift position is the available front shift position FP2 and that the current rear shift position CRP is the available rear shift position RP4. The controller CR10 generates the rear downshift control command CC12 including the target-stop position TSP3C selected by the controller CR10 in response to the rear downshift signal OS12. As seen in FIG. 16, the chain guide RD2 is moved relative to the base member RD1 from the current stop position CSP to the target-stop position TSP3C selected by the controller CR10 in response to the rear downshift control command CC12.

Second Embodiment

A bicycle shifting control apparatus 212 in accordance with a second embodiment will be described below referring to FIGS. 21 to 29. The bicycle shifting control apparatus 212 has the same structure and/or configuration as those of the bicycle shifting control apparatus 12 except for the controller CR10. Thus, elements having substantially the same function as those in the first embodiment will be numbered the same here, and will not be described and/or illustrated again in detail here for the sake of brevity.

Figure 21:
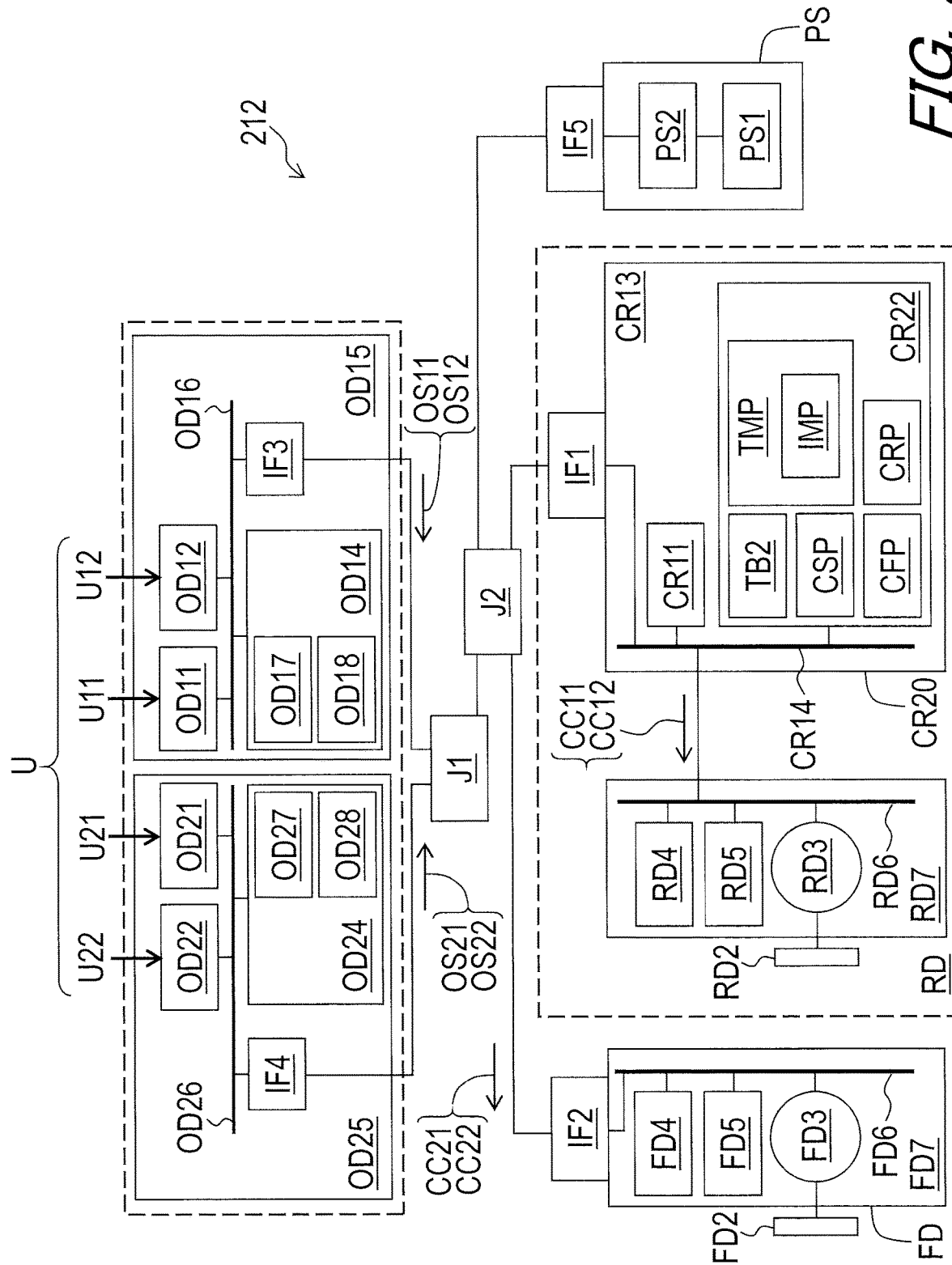
FIG. 21 is a schematic block diagram of a bicycle shifting control apparatus in accordance with a second embodiment.

As seen in FIG. 21, the bicycle shifting control apparatus 212 comprises a controller CR20. The controller CR20 includes a memory CR22. The controller CR20 has substantially the same structure and/or configuration as that of the controller CR10 of the first embodiment. The memory CR22 has substantially the same structure and/or configuration as that of the memory CR12 of the first embodiment. The controller CR20 is electrically connected to the actuator RD3 to move the chain guide RD2 relative to the base member RD1 from the current stop position CSP to the target-stop position TSP.

In this embodiment, the controller CR20 is configured to change, based on the front shift position of the front derailleur FD, at least one of the target-stop position TSP and a temporary position TMP in which the chain guide RD2 temporarily is in a shifting operation in which the chain guide RD2 moves from the current stop position CSP to the target-stop position TSP. Specifically, the controller CR20 is configured to change the at least one of the target-stop position TSP and the temporary position TMP based on the front shift position and the current rear shift position CRP corresponding to the current stop position CSP. The memory CR22 is configured to store the target-stop position TSP and the temporary position TMP.

As seen in FIGS. 22 to 25, the temporary position TMP includes an intermediate position IMP provided between the current stop position CSP and the target-stop position TSP. The controller CR20 is configured to change the intermediate position IMP based on the front shift position of the front derailleur FD and the current rear shift position CRP corresponding to the current stop position CSP.

The controller CR20 controls the motor driver RD4 to temporarily stop the chain guide RD2 at the intermediate position IMP in the shifting operation in which the chain guide RD2 moves from the current stop position CSP to the target-stop position TSP. Specifically, the controller CR20 controls the motor driver RD4 to move the chain guide RD2 from the current stop position CSP to the intermediate position IMP and to temporarily stop the chain guide RD2 at the intermediate position IMP. The controller CR20 controls the motor driver RD4 to move the chain guide RD2 from the intermediate position IMP to the target-stop position TSP. However, the controller CR20 can be configured to control the motor driver RD4 to reduce a speed of the chain guide RD2 at and/or around the intermediate position IMP in the shifting operation.

As seen in FIG. 26, the memory CR22 is configured to store a plurality of available temporary positions TMP of the chain guide RD2. In this embodiment, the memory CR22 is configured to store a plurality of available intermediate positions IMP1N to IMP11C of the chain guide RD2.

As seen in FIG. 27, the memory CR22 is configured to store a table TB2. The table TB2 indicates correspondence relationship among the plurality of available front shift positions FP1 and FP2, the plurality of available rear shift positions RP1 to RP11, the rear upshift signal OS11, the rear downshift signal OS12, and the plurality of available temporary positions (e.g., the plurality of available intermediate positions IMP1N to IMP11C).

For example, the chain guide RD2 is moved to the available intermediate positions in response to the rear upshift signal OS11 in a state where the front shift position is the available front shift position and the rear shift position is the available rear shift position.

The controller CR20 is configured to compare the front shift position with the plurality of available front shift positions FP1 and FP2 before changing the at least one of the target-stop position TSP and the temporary position TMP. The controller CR20 is configured to compare the front shift position with the plurality of available front shift positions FP1 and FP2 and compare the current rear shift position CRP with the plurality of available rear shift positions RP1 to RP11 before changing the at least one of the target-stop position TSP and the temporary position TMP.

In this embodiment, the controller CR20 is configured to compare the front shift position with the plurality of available front shift positions FP1 and FP2 and compare the current rear shift position CRP with the plurality of available rear shift positions RP1 to RP11 before changing the intermediate position IMP.

The controller CR20 is configured to select, as the temporary position TMP, one position of the plurality of available temporary positions which corresponds to one position of the plurality of available front shift positions FP1 and FP2 in a case where the controller CR20 concludes that the front shift position is the one position of the plurality of available front shift positions FP1 and FP2. The controller CR20 is configured to select, as the temporary position TMP, one position of the plurality of available temporary positions IMP1N to IMP11C which corresponds to one position of the plurality of available front shift positions FP1 and FP2 and one position of the plurality of available rear shift positions RP1 to RP11 in a case where the controller CR20 concludes that the front shift position is the one position of the plurality of available front shift positions FP1 and FP2 and that the current rear shift position CRP is the one position of the plurality of available rear shift positions RP1 to RP11.

In this embodiment, the controller CR20 is configured to select, as the intermediate position IMP, one position of the plurality of available intermediate positions IMP1N to IMP11C which corresponds to one position of the plurality of available front shift positions FP1 and FP2 in a case where the controller CR20 concludes that the front shift position is the one position of the plurality of available front shift positions FP1 and FP2.

The operation of the bicycle shifting control apparatus 212 will be described below referring to FIGS. 28 and 29. The steps S1 to S5 and S13 to S15 are the same as those of the bicycle shifting control apparatus 12 of the first embodiment.

Figure 28:
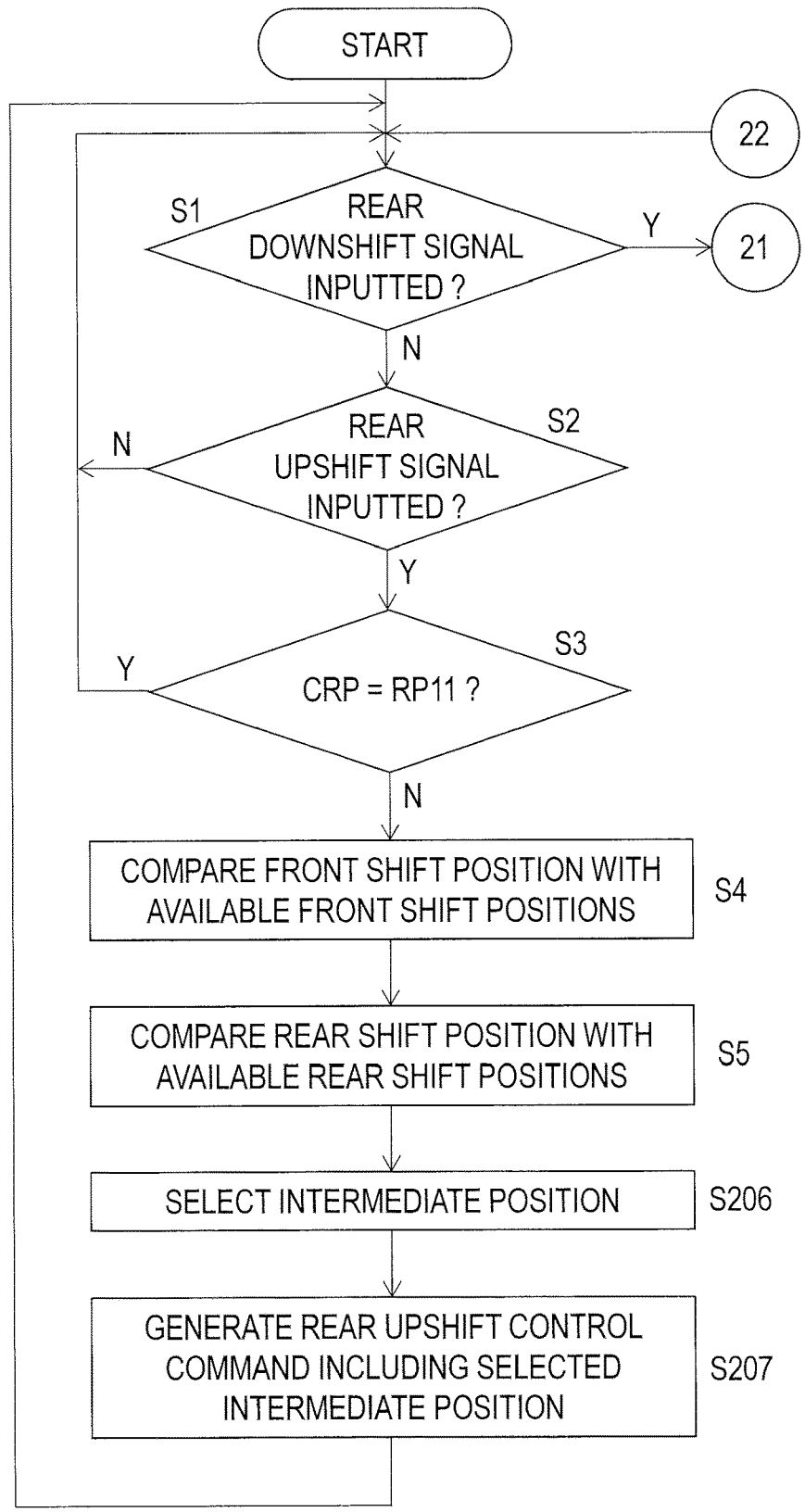
FIGS. 28 and 29 are flow charts showing an operation of the bicycle shifting control apparatus illustrated in FIG. 21.
Figure 29:
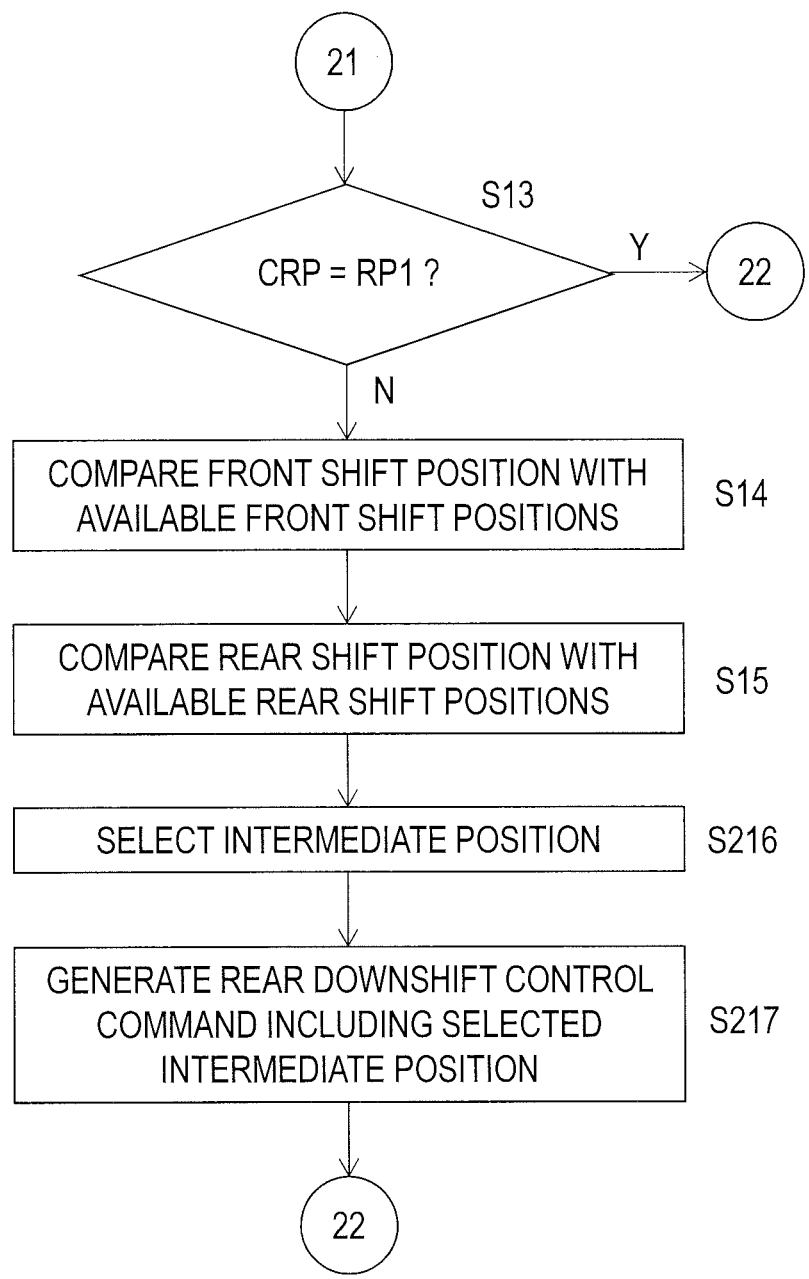

As seen in FIGS. 28 and 29, the controller CR20 selects, as the intermediate position IMP, one position of the plurality of available intermediate positions IMP1N to IMP11C which corresponds to one position of the plurality of available front shift positions FP1 and FP2 and one position of the plurality of available rear shift positions RP1 to RP11 in a case where the controller CR20 concludes that the front shift position is the one position of the plurality of available front shift positions FP1 and FP2 and that the current rear shift position CRP is the one position of the plurality of available rear shift positions RP1 to RP11 (step S206 or S216). The controller CR20 generates the rear upshift control command CC11 including the intermediate position IMP selected by the controller CR20 (step S207 or S217).

Figure 22:
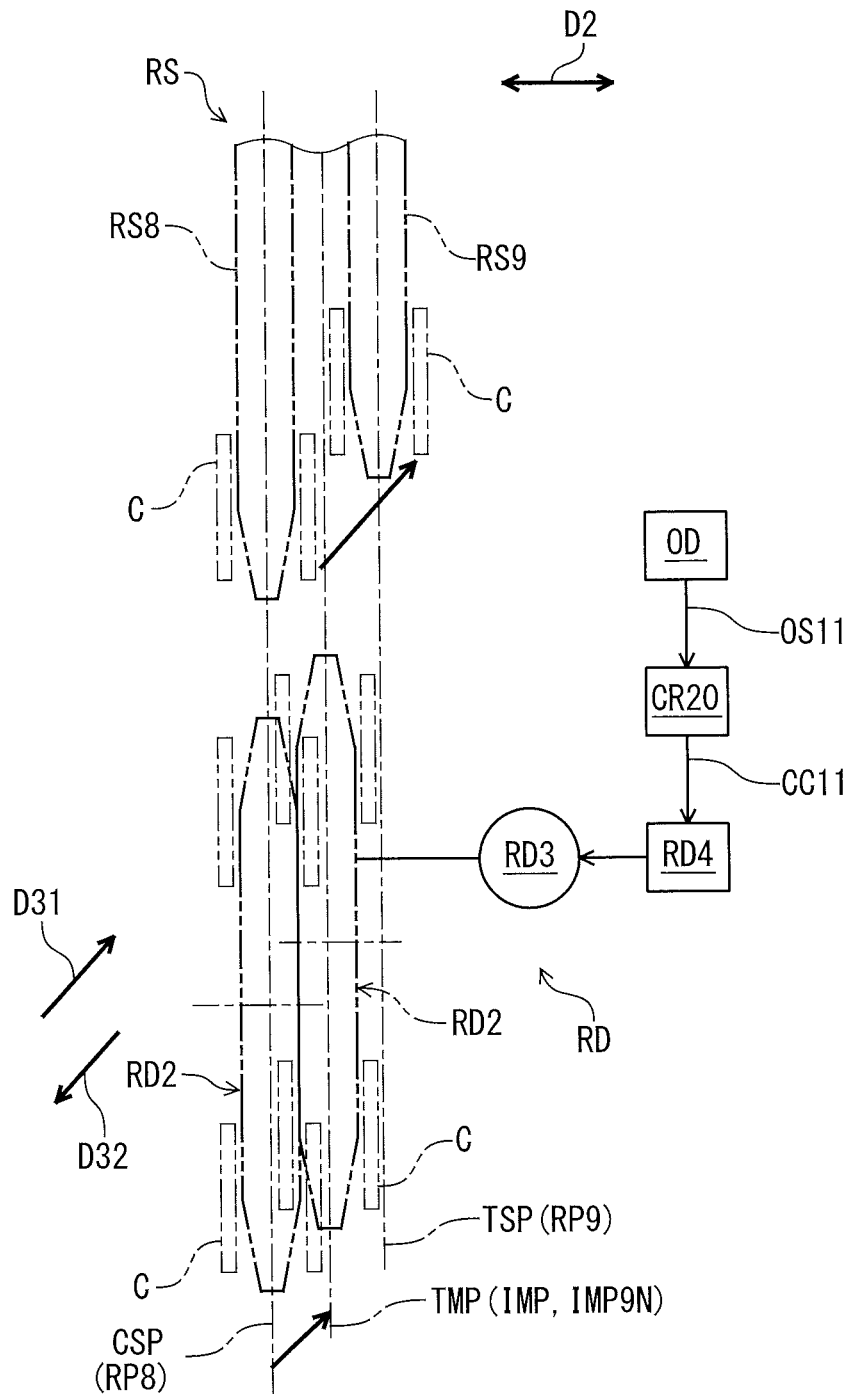
FIGS. 22 to 25 are partial schematic views of a rear sprocket assembly and a bicycle rear derailleur of the bicycle shifting control apparatus illustrated in FIG. 21.
Figure 23:
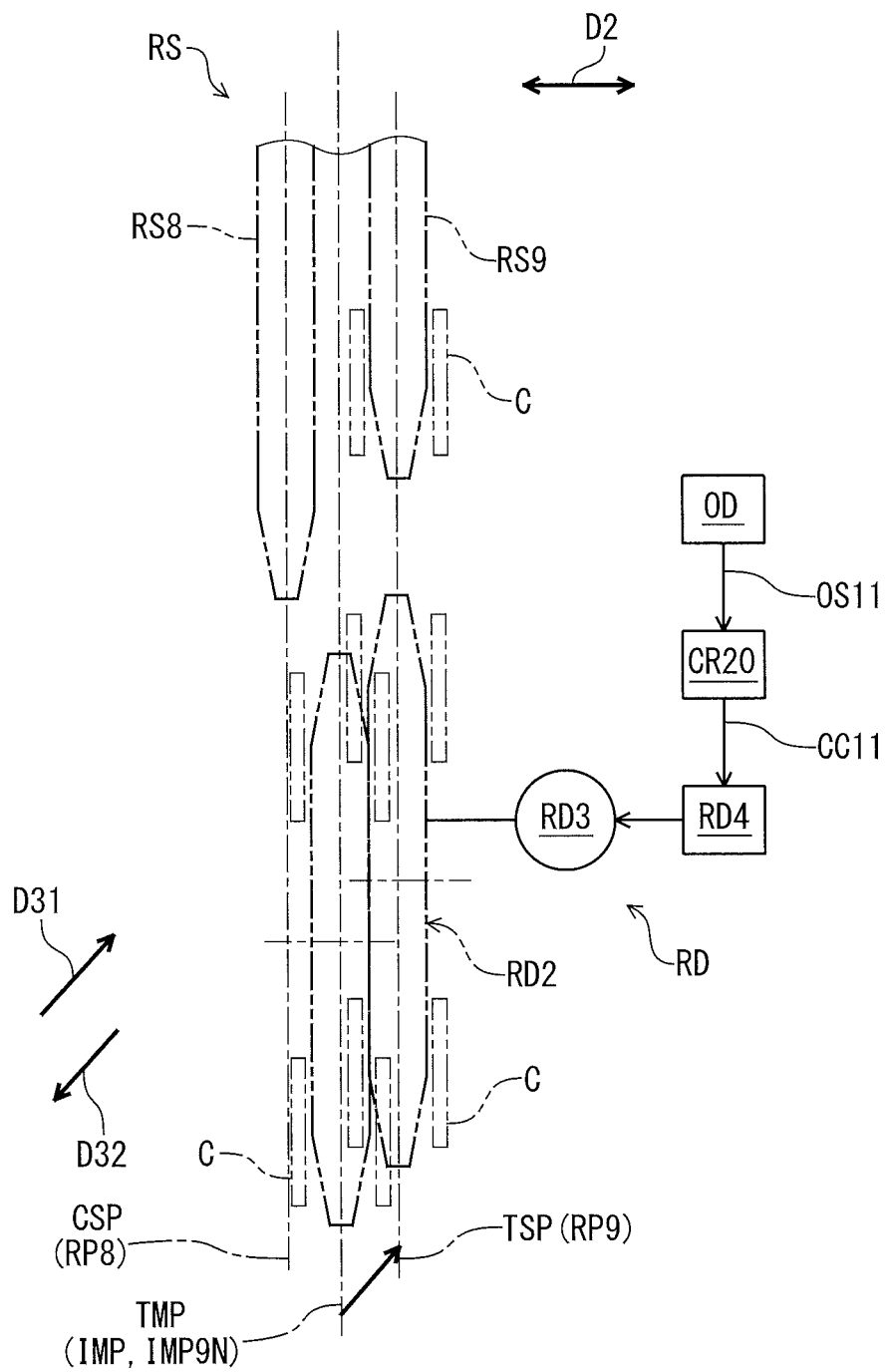

For example, the controller CR20 selects the available intermediate position IMP9N which corresponds to the available front shift position FP1 in a case where the controller CR20 concludes that the front shift position is the available front shift position FP1 and that the current rear shift position CRP is the available rear shift position RP8 in response to the rear upshift signal OS11. As seen in FIG. 22, when the controller CR20 selects the available intermediate position IMP9N, the controller CR20 controls the motor driver RD4 to move the chain guide RD2 from the current stop position CSP (e.g., the rear shift position RP8) to the intermediate position IMP9N and to temporarily stop the chain guide RD2 at the intermediate position IMP9N. As seen in FIG. 23, the controller CR20 controls the motor driver RD4 to move the chain guide RD2 from the intermediate position IMP9N to the target-stop position (e.g., the rear shift position RP9).

Figure 24:
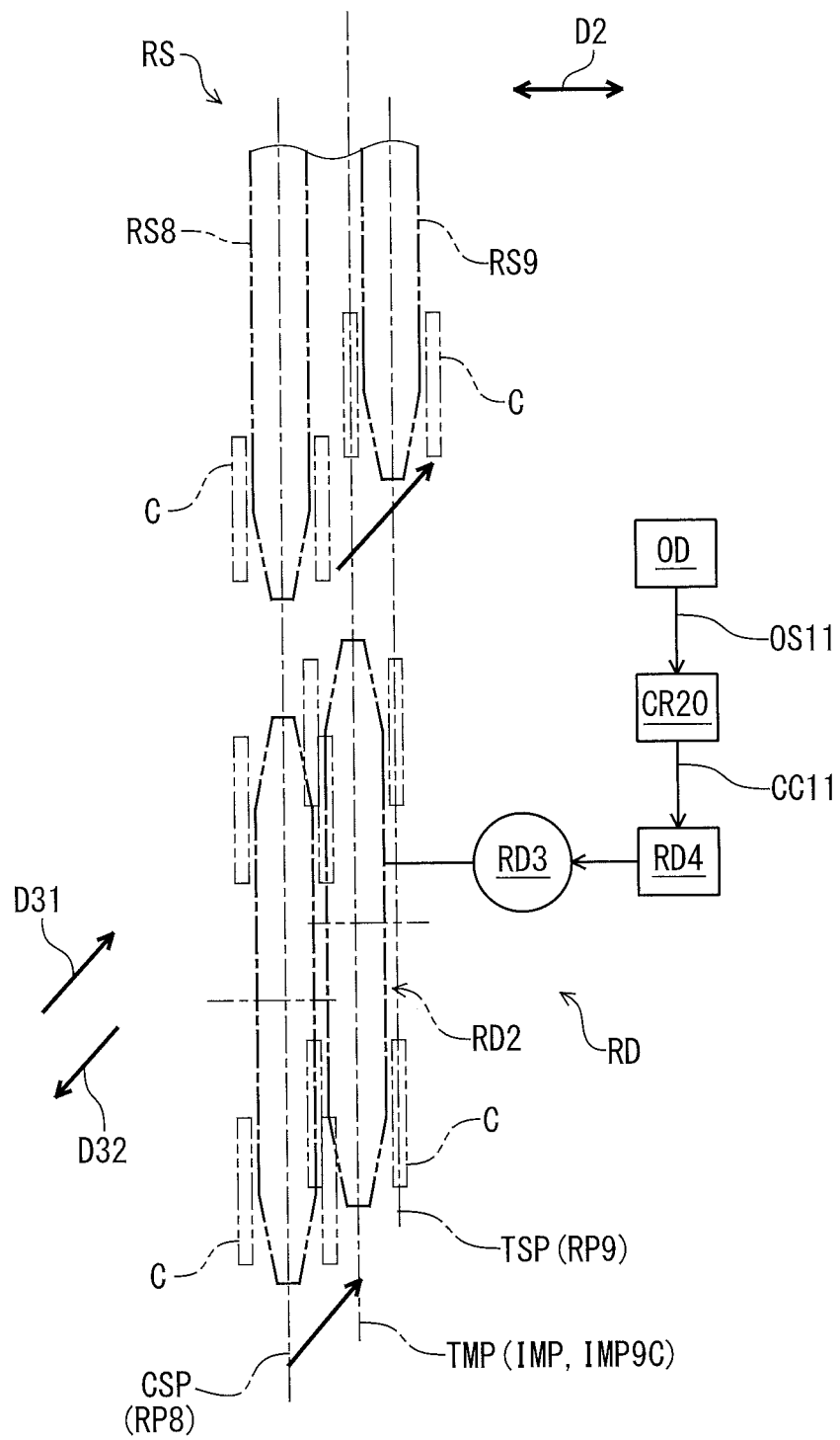
Figure 25:
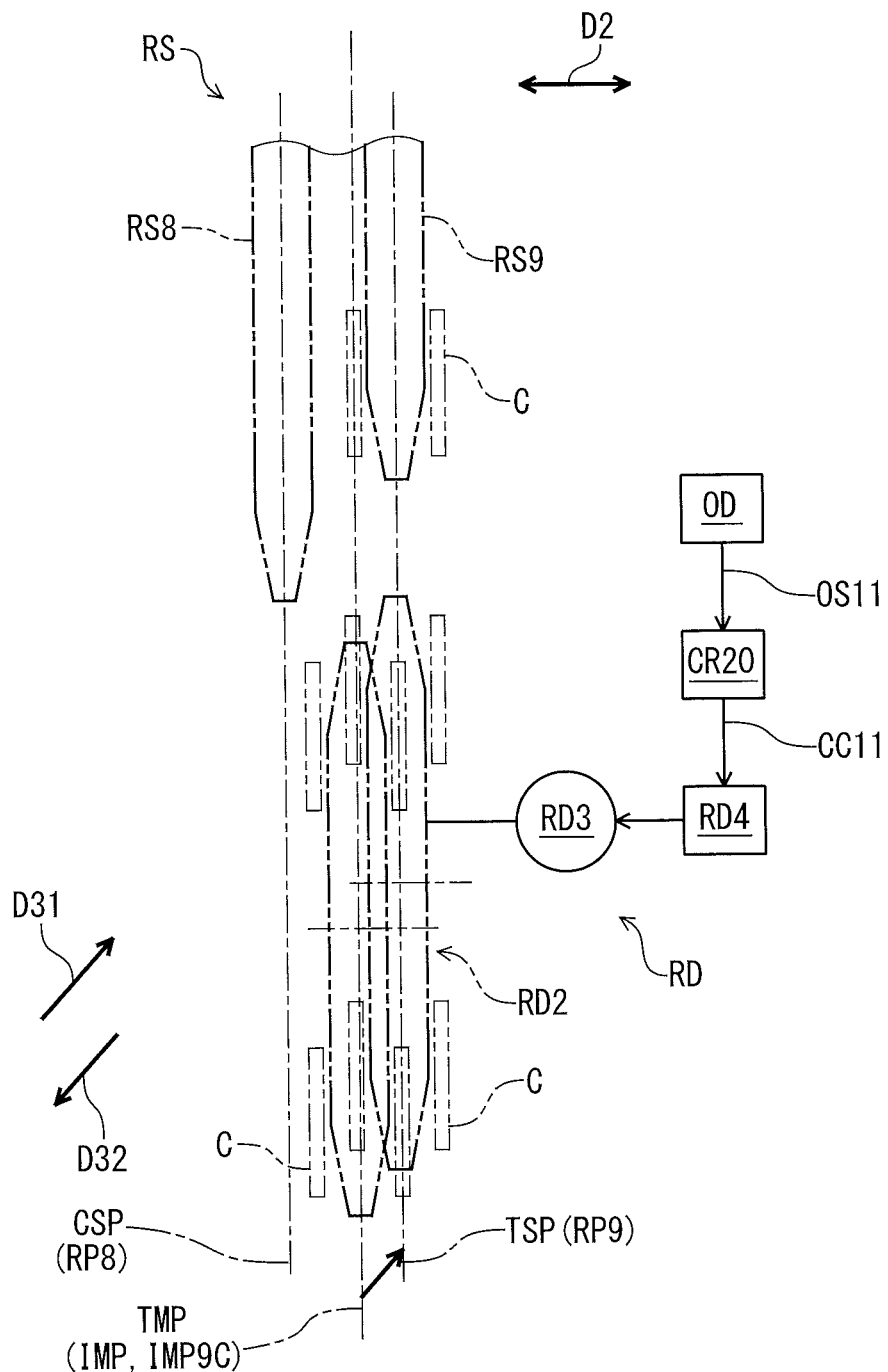

The controller CR20 selects the available intermediate position IMP9C which corresponds to the available front shift position FP2 in a case where the controller CR20 concludes that the front shift position is the available front shift position FP2 and that the current rear shift position CRP is the available rear shift position RP8 in response to the rear upshift signal OS11. As seen in FIG. 24, when the controller CR20 selects the available intermediate position IMP9C, the controller CR20 controls the motor driver RD4 to move the chain guide RD2 from the current stop position CSP (e.g., the rear shift position RP8) to the intermediate position IMP9C and to temporarily stop the chain guide RD2 at the intermediate position IMP9C. As seen in FIG. 25, the controller CR20 controls the motor driver RD4 to move the chain guide RD2 from the intermediate position IMP9C to the target-stop position (e.g., the rear shift position RP9).

Third Embodiment

A bicycle shifting control apparatus 312 in accordance with a third embodiment will be described below referring to FIGS. 30 to 38. The bicycle shifting control apparatus 312 has the same structure and/or configuration as those of the bicycle shifting control apparatus 12 except for the controller CR10. Thus, elements having substantially the same function as those in the first embodiment will be numbered the same here, and will not be described and/or illustrated again in detail here for the sake of brevity.

Figure 30:
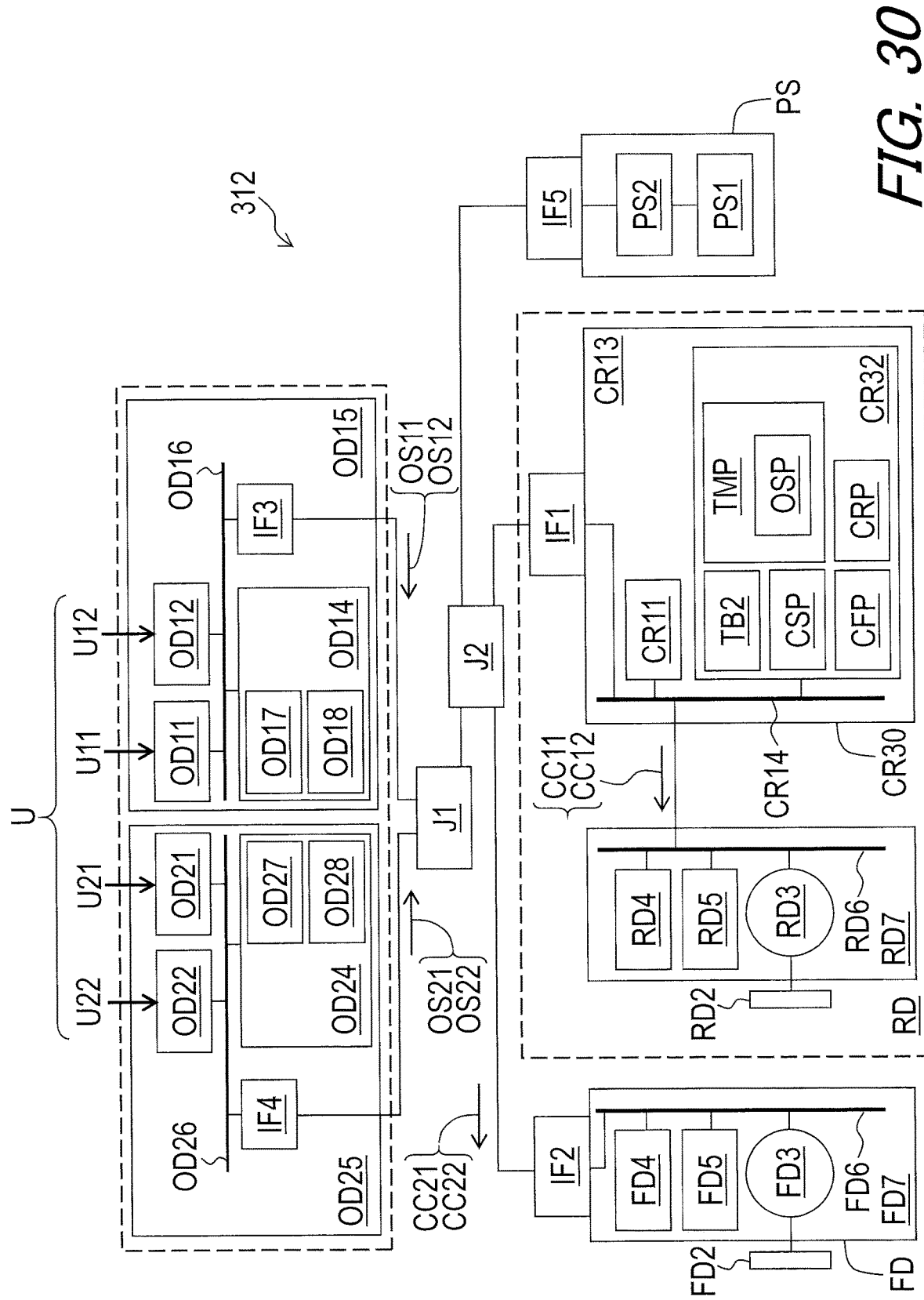
FIG. 30 is a schematic block diagram of a bicycle shifting control apparatus in accordance with a third embodiment.

As seen in FIG. 30, the bicycle shifting control apparatus 312 comprises a controller CR30. The controller CR30 includes a memory CR32. The controller CR30 has substantially the same structure and/or configuration as that of the controller CR10 of the first embodiment. The memory CR32 has substantially the same structure and/or configuration as that of the memory CR12 of the first embodiment. The controller CR30 is electrically connected to the actuator RD3 to move the chain guide RD2 relative to the base member RD1 from the current stop position CSP to the target-stop position TSP.

In this embodiment, the controller CR30 is configured to change, based on the front shift position of the front derailleur FD, at least one of the target-stop position TSP and a temporary position TMP in which the chain guide RD2 temporarily is in a shifting operation in which the chain guide RD2 moves from the current stop position CSP to the target-stop position TSP. Specifically, the controller CR30 is configured to change the at least one of the target-stop position TSP and the temporary position TMP based on the front shift position and the current rear shift position CRP corresponding to the current stop position CSP. The memory CR32 is configured to store the target-stop position TSP and the temporary position TMP.

As seen in FIGS. 31 to 34, the temporary position TMP includes an overstroke position OSP. The target-stop position TSP is provided between the current stop position CSP and the overstroke position OSP. The controller CR30 is configured to change the overstroke position OSP based on the front shift position of the front derailleur FD and the current rear shift position CRP corresponding to the current stop position CSP.

In the present application, the term "overstroke position" can encompass a position of the chain guide RD2 and/or an amount of overstroke of the chain guide RD2.

The controller CR20 controls the motor driver RD4 to temporarily stop the chain guide RD2 at the overstroke position OSP in the shifting operation in which the chain guide RD2 moves from the current stop position CSP to the target-stop position TSP. Specifically, the controller CR30 controls the motor driver RD4 to move the chain guide RD2 from the current stop position CSP to the overstroke position OSP and to temporarily stop the chain guide RD2 at the overstroke position OSP. The controller CR30 controls the motor driver RD4 to move the chain guide RD2 from the overstroke position OSP to the target-stop position TSP.

As seen in FIG. 35, the memory CR32 is configured to store a plurality of available temporary positions TMP of the chain guide RD2. In this embodiment, the memory CR32 is configured to store a plurality of available overstroke positions OSP1N to OSP11C of the chain guide RD2.

As seen in FIG. 36, the memory CR32 is configured to store a table TB3. The table TB3 indicates correspondence relationship among the plurality of available front shift positions FP1 and FP2, the plurality of available rear shift positions RP1 to RP11, the rear upshift signal OS11, the rear downshift signal OS12, and the plurality of available temporary positions (e.g., the plurality of available overstroke positions OSP1N to OSP11C).

For example, the chain guide RD2 is moved to the available overstroke position in response to the rear upshift signal OS11 in a state where the front shift position is the available front shift position and the rear shift position is the available rear shift position.

The controller CR30 is configured to compare the front shift position with the plurality of available front shift positions FP1 and FP2 before changing the at least one of the target-stop position TSP and the temporary position TMP. The controller CR30 is configured to compare the front shift position with the plurality of available front shift positions FP1 and FP2 and compare the current rear shift position CRP with the plurality of available rear shift positions RP1 to RP11 before changing the at least one of the target-stop position and the temporary position TMP.

In this embodiment, the controller CR30 is configured to compare the front shift position with the plurality of available front shift positions FP1 and FP2 and compare the current rear shift position CRP with the plurality of available rear shift positions RP1 to RP11 before changing the overstroke position OSP.

The controller CR30 is configured to select, as the temporary position TMP, one position of the plurality of available temporary positions which corresponds to one position of the plurality of available front shift positions FP1 and FP2 in a case where the controller CR30 concludes that the front shift position is the one position of the plurality of available front shift positions FP1 and FP2. The controller CR30 is configured to select, as the temporary position TMP, one position of the plurality of available temporary positions OSP1N to OSP11C which corresponds to one position of the plurality of available front shift positions FP1 and FP2 and one position of the plurality of available rear shift positions RP1 to RP11 in a case where the controller CR30 concludes that the front shift position is the one position of the plurality of available front shift positions FP1 and FP2 and that the current rear shift position CRP is the one position of the plurality of available rear shift positions RP1 to RP11.

In this embodiment, the controller CR30 is configured to select, as the overstroke position OSP, one position of the plurality of available overstroke positions OSP1N to OSP11C which corresponds to one position of the plurality of available front shift positions FP1 and FP2 in a case where the controller CR30 concludes that the front shift position is the one position of the plurality of available front shift positions FP1 and FP2.

The operation of the bicycle shifting control apparatus 312 will be described below referring to FIGS. 37 and 38. The steps S1 to S5 and S13 to S15 are the same as those of the bicycle shifting control apparatus 12 of the first embodiment.

Figure 37:
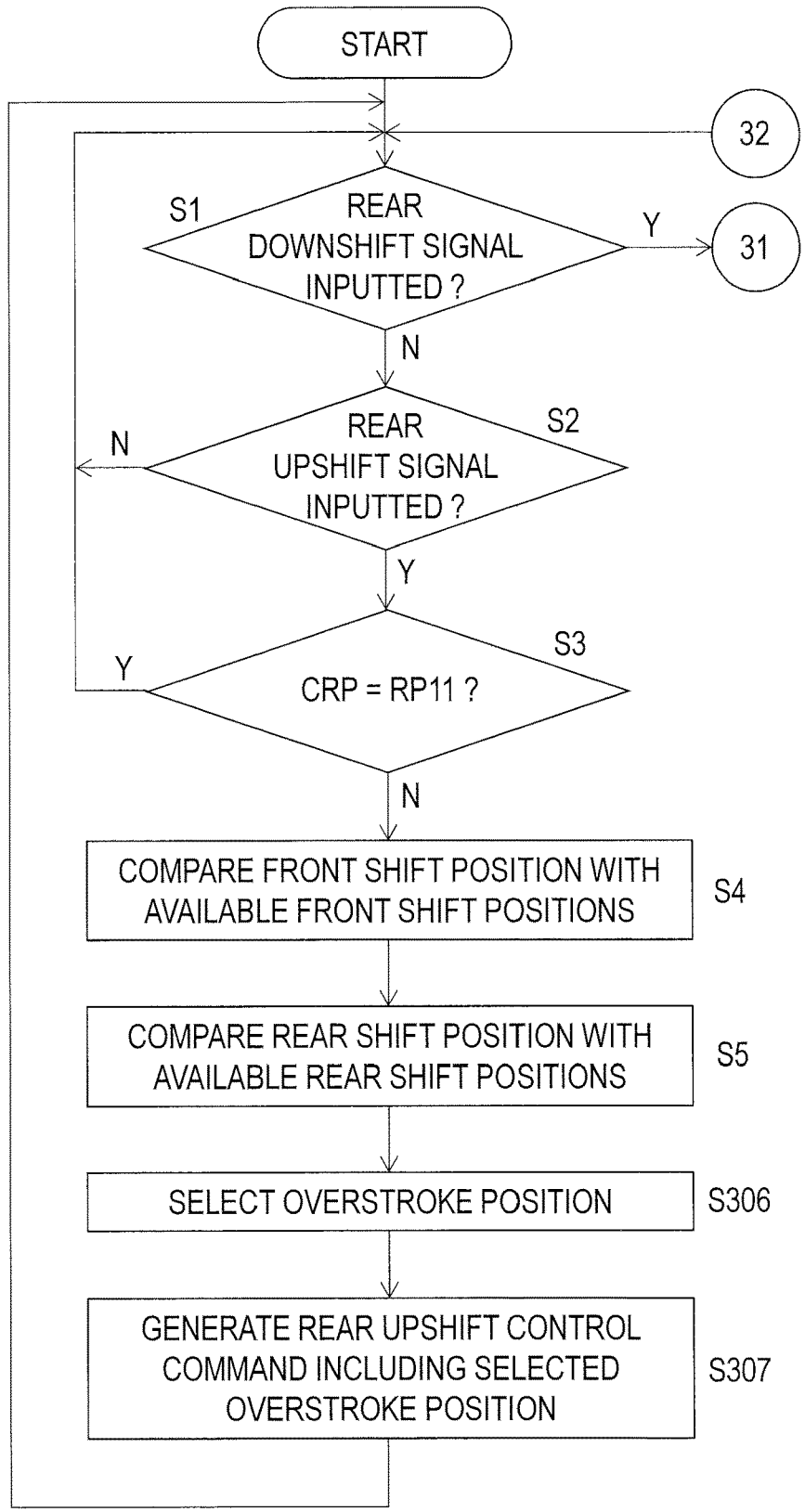
FIGS. 37 and 38 are flow charts showing an operation of the bicycle shifting control apparatus illustrated in FIG. 30.
Figure 38:
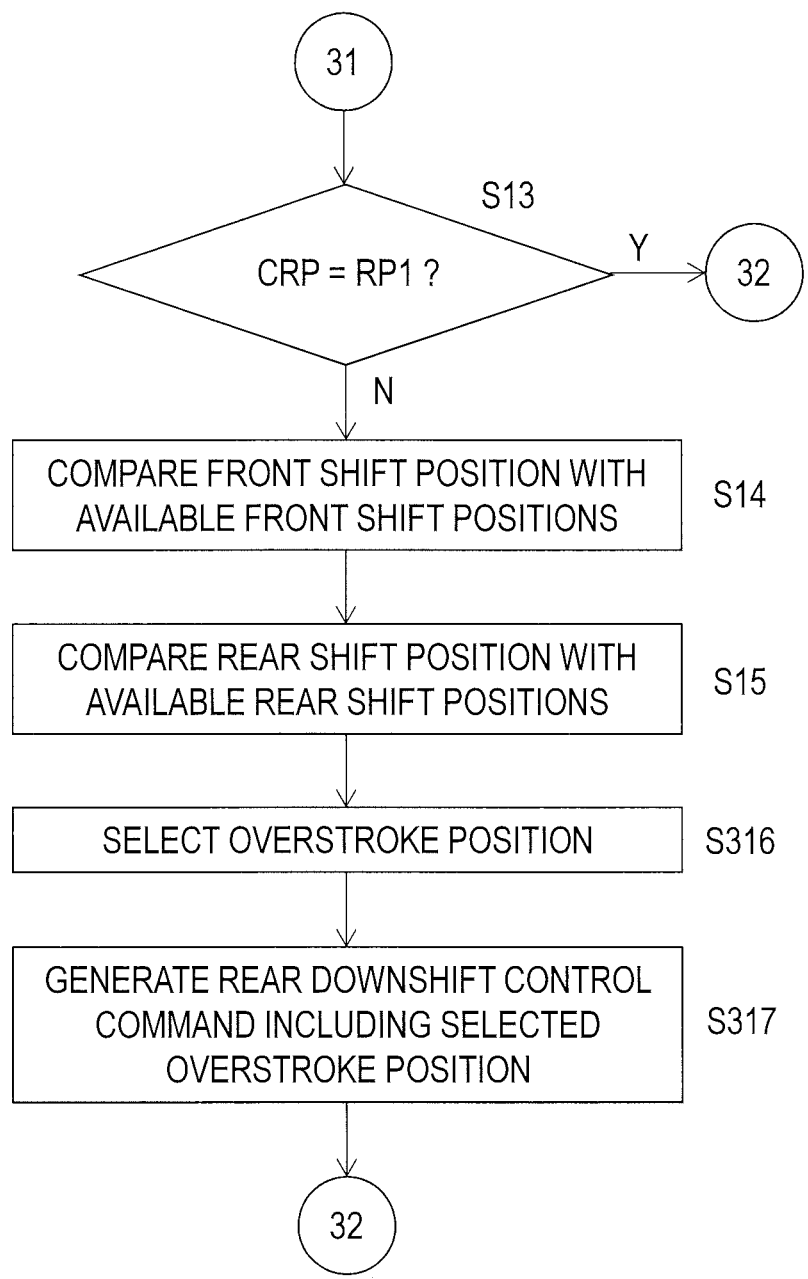

As seen in FIGS. 37 and 38, the controller CR30 selects, as the overstroke position OSP, one position of the plurality of available overstroke positions OSP1N to OSP11C which corresponds to one position of the plurality of available front shift positions FP1 and FP2 and one position of the plurality of available rear shift positions RP1 to RP11 in a case where the controller CR30 concludes that the front shift position is the one position of the plurality of available front shift positions FP1 and FP2 and that the current rear shift position CRP is the one position of the plurality of available rear shift positions RP1 to RP11 (step S306 or S316). The controller CR30 generates the rear upshift control command CC11 including the overstroke position OSP selected by the controller CR30 (step S307 or S317).

Figure 31:
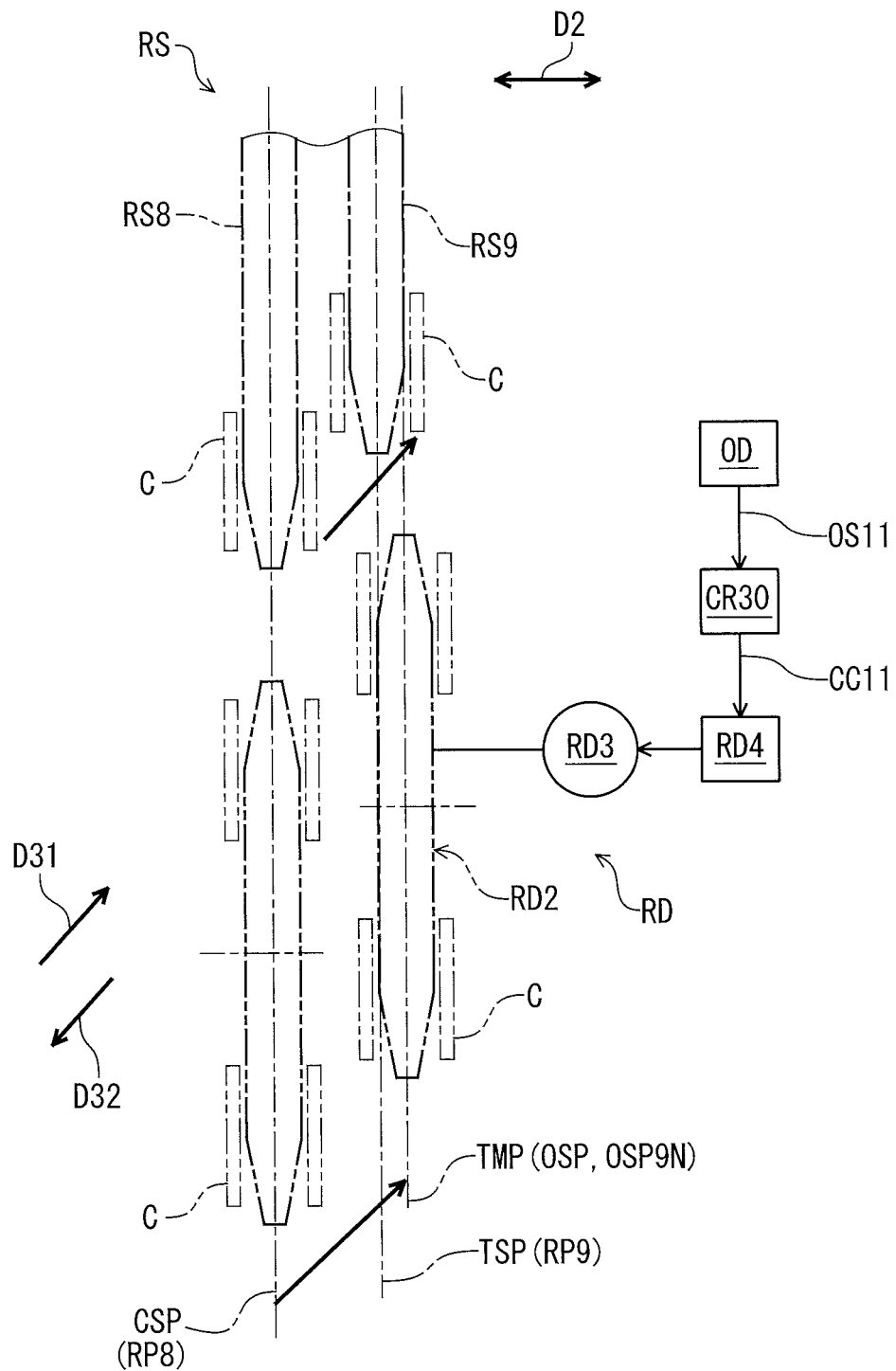
FIGS. 31 to 34 are partial schematic views of a rear sprocket assembly and a bicycle rear derailleur of the bicycle shifting control apparatus illustrated in FIG. 30.
Figure 32:
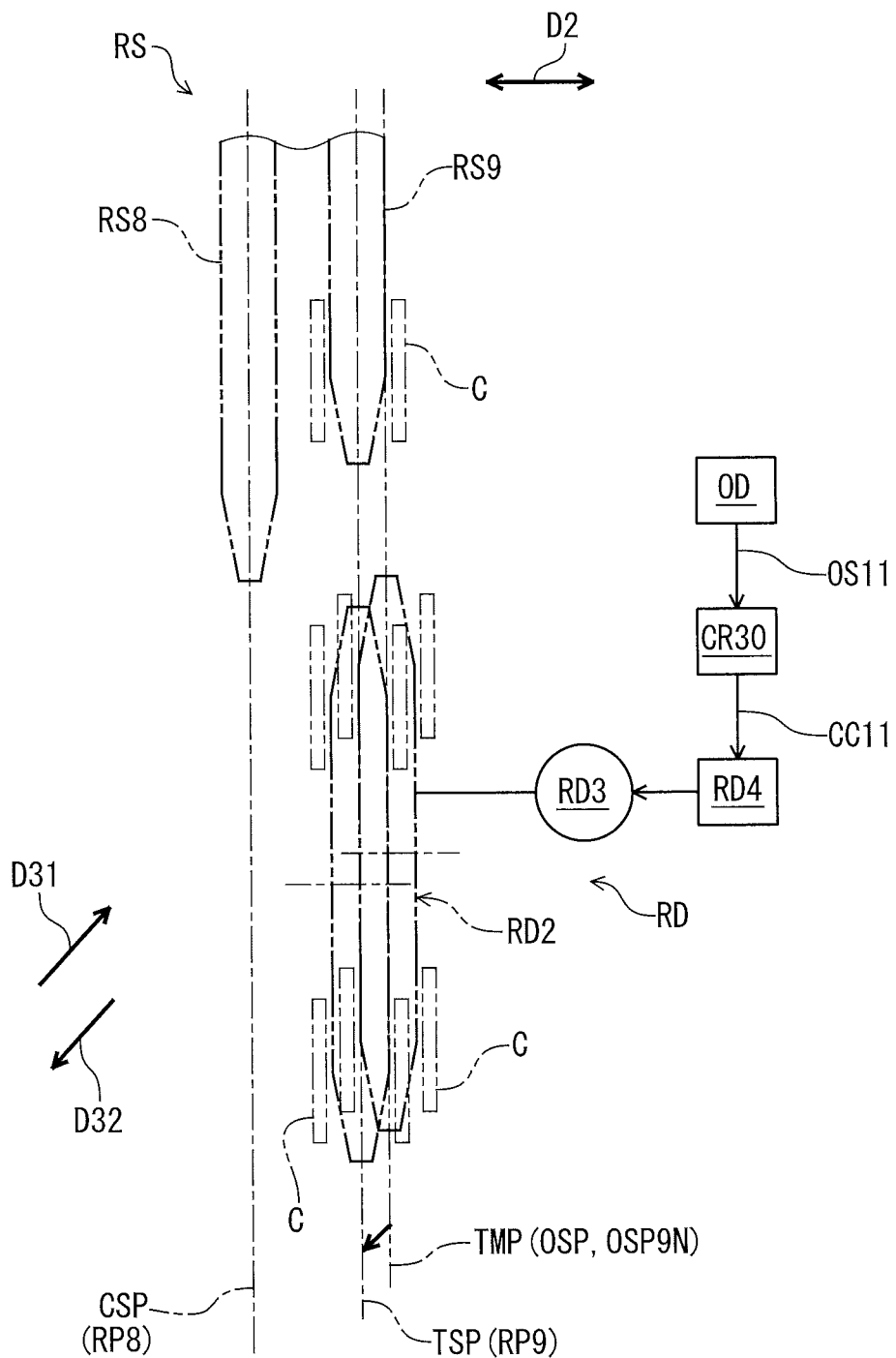

For example, the controller CR30 selects the available overstroke position OSP9N which corresponds to the available front shift position FP1 in a case where the controller CR30 concludes that the front shift position is the available front shift position FP1 and that the current rear shift position CRP is the available rear shift position RP8 in response to the rear upshift signal OS11. As seen in FIG. 31, when the controller CR30 selects the available overstroke position OSP9N, the controller CR30 controls the motor driver RD4 to move the chain guide RD2 from the current stop position CSP (e.g., the rear shift position RP8) to the overstroke position OSP9N and to temporarily stop the chain guide RD2 at the overstroke position OSP9N. As seen in FIG. 32, the controller CR30 controls the motor driver RD4 to move the chain guide RD2 from the overstroke position OSP9N to the target-stop position (e.g., the rear shift position RP9).

Figure 33:
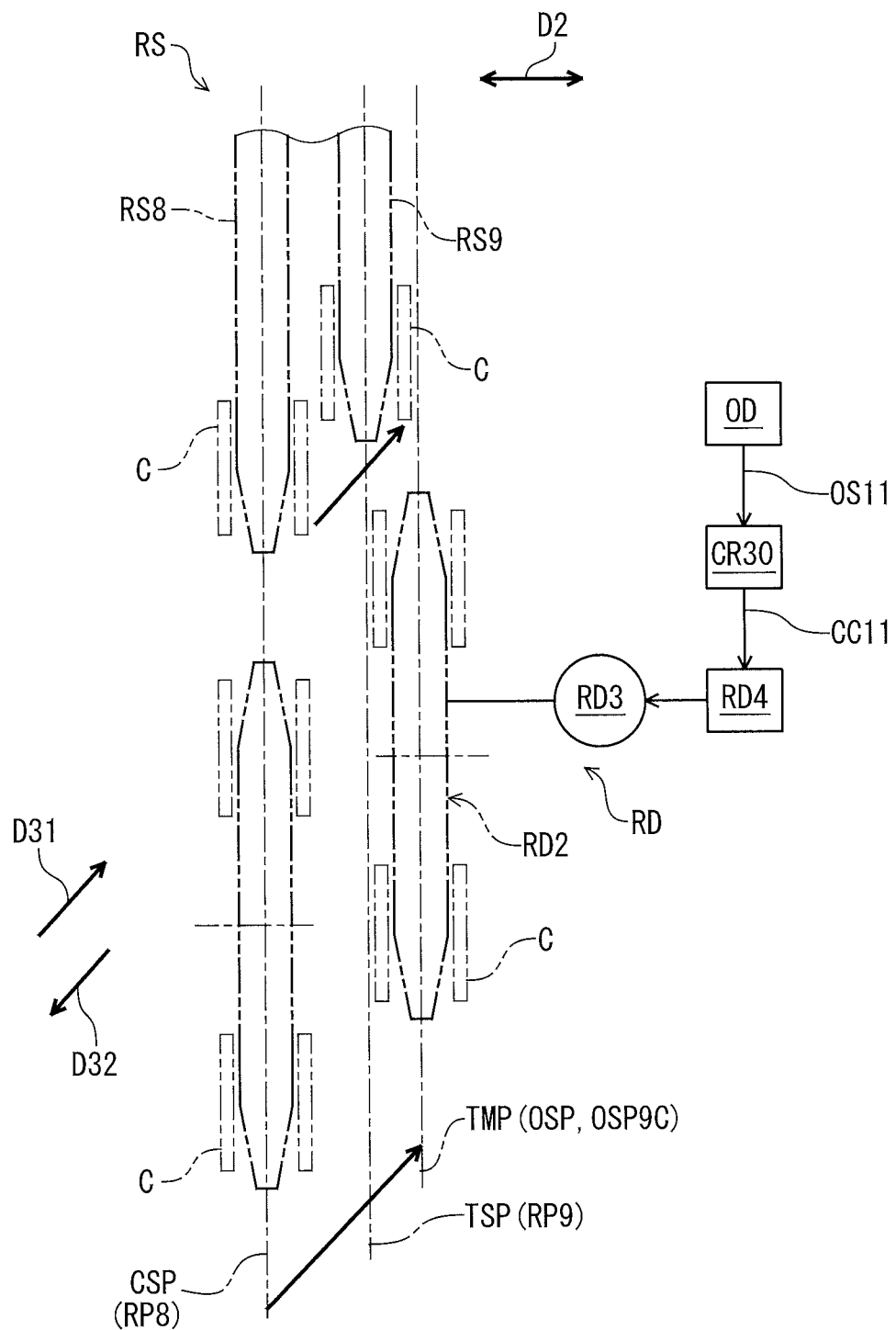
Figure 34:
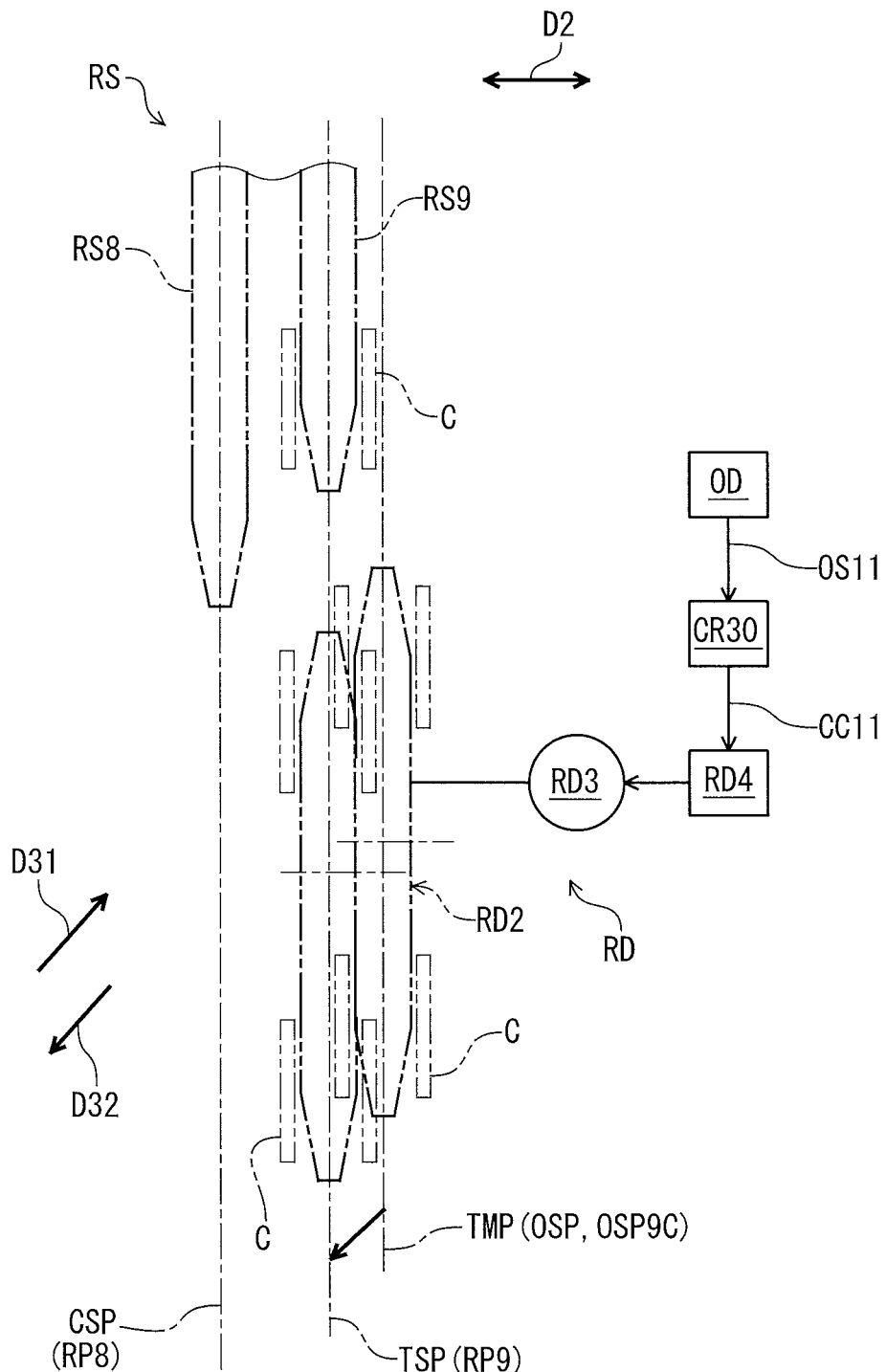

The controller CR30 selects the available overstroke position OSP9C which corresponds to the available front shift position FP2 in a case where the controller CR30 concludes that the front shift position is the available front shift position FP2 and that the current rear shift position CRP is the available rear shift position RP8 in response to the rear upshift signal OS11. As seen in FIG. 33, when the controller CR30 selects the available overstroke position OSP9C, the controller CR30 controls the motor driver RD4 to move the chain guide RD2 from the current stop position CSP (e.g., the rear shift position RP8) to the overstroke position OSP9C and to temporarily stop the chain guide RD2 at the overstroke position OSP9C. As seen in FIG. 34, the controller CR30 controls the motor driver RD4 to move the chain guide RD2 from the overstroke position OSP9C to the target-stop position (e.g., the rear shift position RP9).

Fourth Embodiment

A bicycle shifting control apparatus 412 in accordance with a fourth embodiment will be described below referring to FIGS. 39 to 44. The bicycle shifting control apparatus 412 has the same structure and/or configuration as those of the bicycle shifting control apparatus 12 except for the controller CR10. Thus, elements having substantially the same function as those in the first embodiment will be numbered the same here, and will not be described and/or illustrated again in detail here for the sake of brevity.

Figure 39:
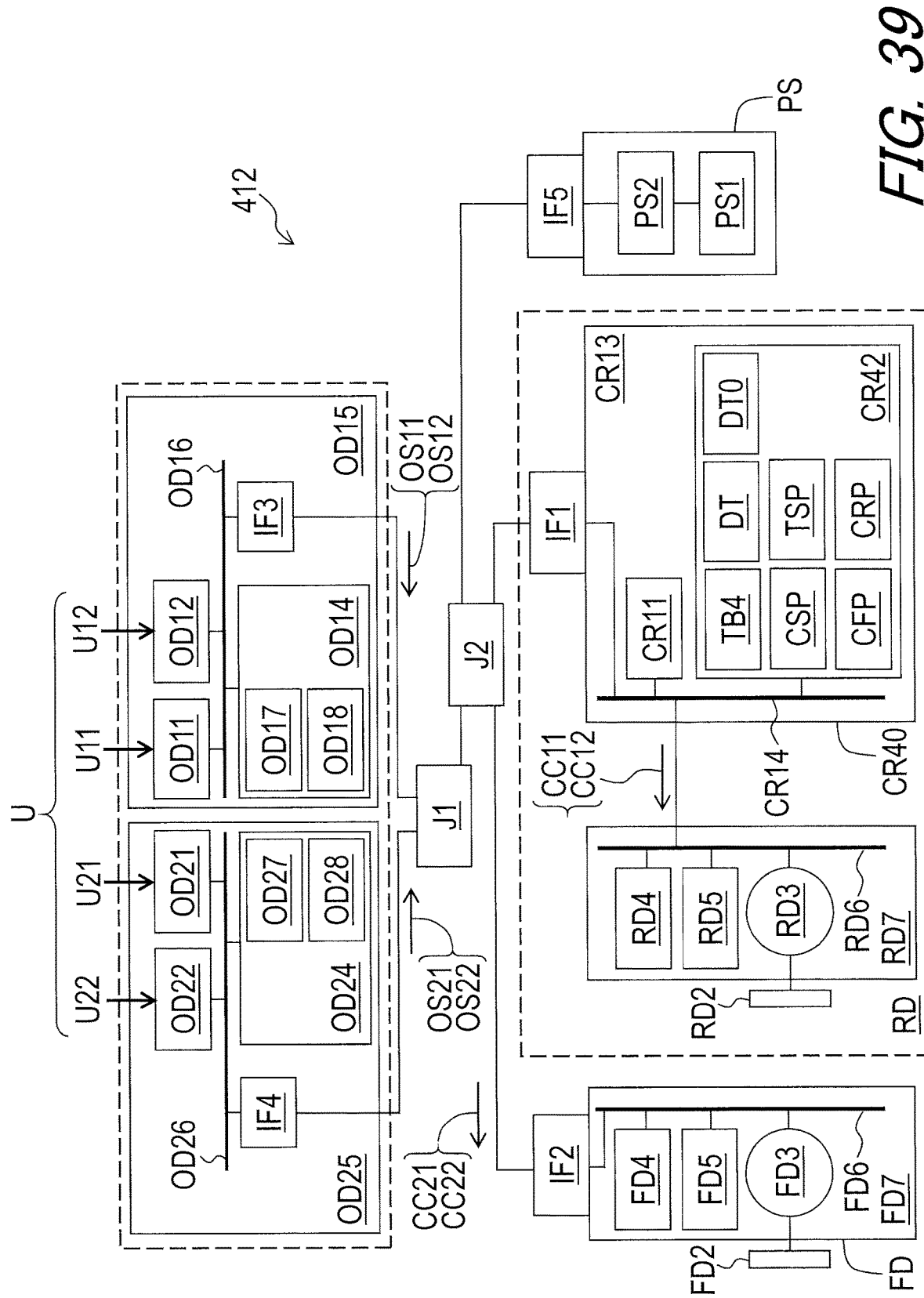
FIG. 39 is a schematic block diagram of a bicycle shifting control apparatus in accordance with a fourth embodiment.

As seen in FIG. 39, the bicycle shifting control apparatus 412 comprises a controller CR40. The controller CR40 includes a memory CR42. The controller CR40 has substantially the same structure and/or configuration as that of the controller CR10 of the first embodiment. The memory CR42 has substantially the same structure and/or configuration as that of the memory CR12 of the first embodiment. The controller CR40 is electrically connected to the actuator RD3 to move the chain guide RD2 relative to the base member RD1 from the current stop position CSP to the target-stop position TSP.

In this embodiment, the controller CR40 is configured to change the target-stop position TSP based on at least one of the current rear shift position CRP corresponding to the current stop position CSP and a distance DT provided between the chain guide RD2 and the rear sprocket corresponding to the current rear shift position CRP. In this embodiment, the controller CR40 is configured to change the target-stop position TSP based on the current rear shift position CRP and the distance DT.

As seen in FIG. 40, the memory CR42 is configured to store a table TB4. The table TB4 indicates correspondence relationship among the plurality of available rear shift positions RP1 to RP11, the rear upshift signal OS11, the rear downshift signal OS12, the plurality of available target-stop positions TSP1N to TSP11C, and the distance DT.

Figure 41:
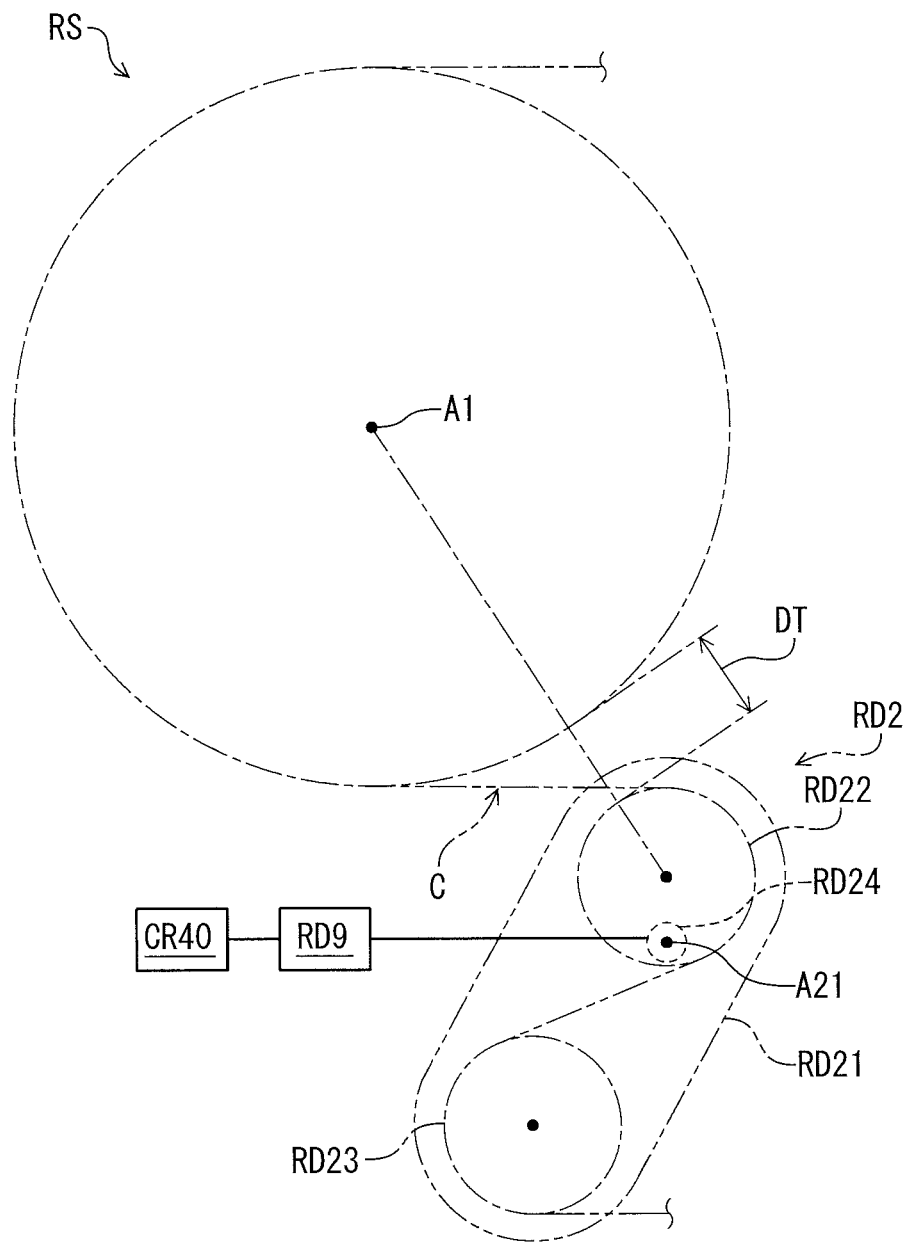
FIGS. 41 and 42 are schematic diagrams of a rear sprocket assembly and a bicycle rear derailleur of the bicycle shifting control apparatus illustrated in FIG. 39.

As seen in FIG. 41, the guide plate RD21 of the chain guide RD2 is pivotally coupled to the link structure RD23 about the pivot axis A21 with the pivot shaft RD24. The pivot shaft RD24 is secured to the guide plate RD21 and is rotatable relative to the link structure RD23 together with the guide plate RD21.

The bicycle rear derailleur RD includes a chain-guide sensor RD9 configured to sense an orientation of the guide plate RD21 relative to the base member RD1. Examples of the chain-guide sensor RD9 include a potentiometer and a rotary encoder. The chain-guide sensor RD9 is configured to sense an absolute rotational position of the pivot shaft RD24 of the chain guide RD2 as the orientation of the guide plate RD21.

Figure 42:
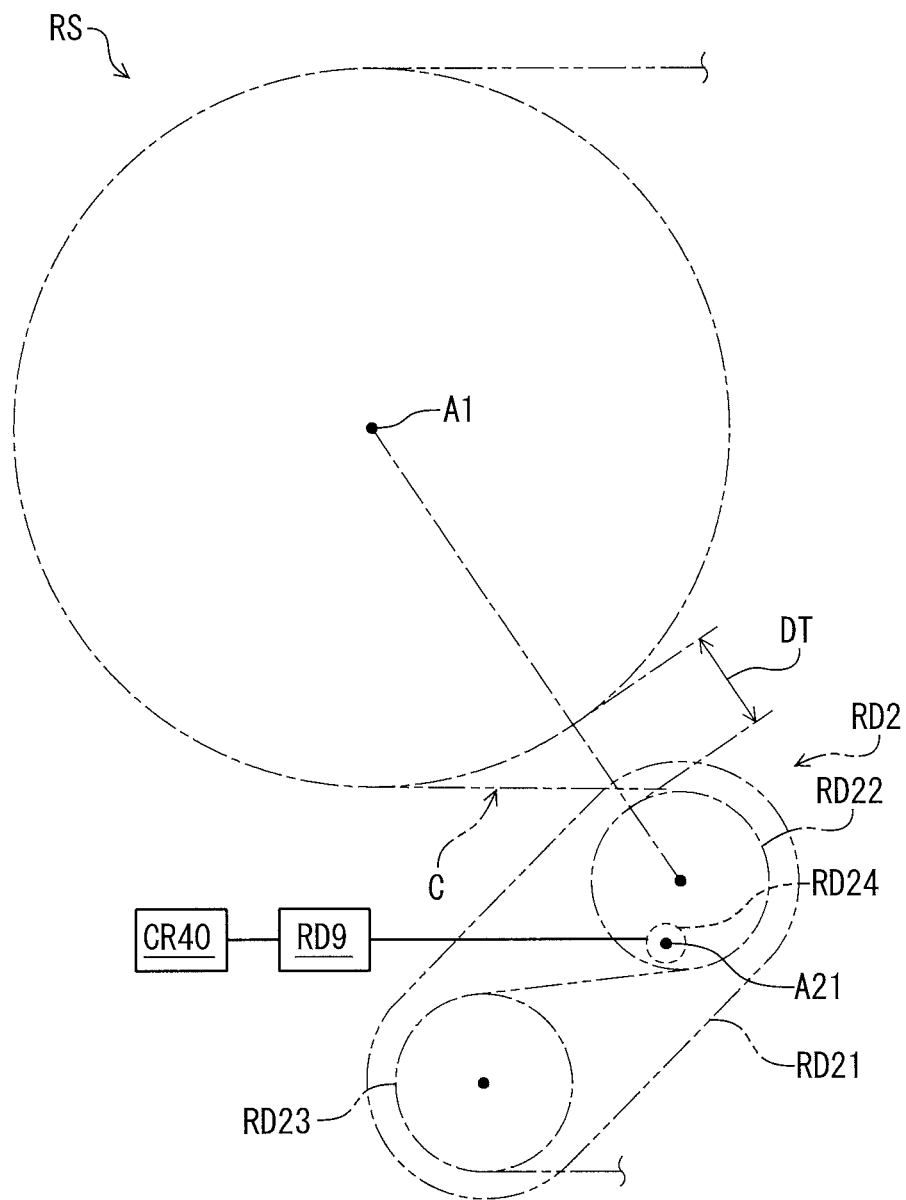

As seen in FIGS. 41 and 42, the orientation of the guide plate RD21 indicates the distance DT provided between the chain guide RD2 and the rear sprocket corresponding to the current rear shift position CRP. The distance DT is defined between an outer circumference of the rear sprocket and an outer circumference of the guide pulley RD22 of the chain guide RD2.

The controller CR40 is configured to compare the distance DT sensed by the chain-guide sensor RD9 with a reference distance DT0 stored in the memory CR42. For example, the controller CR40 selects the target-stop position TSP9N in a case where the controller CR40 concludes that the distance DT sensed by the chain-guide sensor RD9 is smaller than the reference distance DT0. The controller CR40 selects the target-stop position TSP9C in a case where the controller CR40 concludes that the distance DT sensed by the chain-guide sensor RD9 is equal to or larger than the reference distance DT0.

The operation of the bicycle shifting control apparatus 412 will be described below referring to FIGS. 43 and 44. The steps S1 to S5 and S13 to S15 are the same as those of the bicycle shifting control apparatus 12 of the first embodiment.

Figure 43:
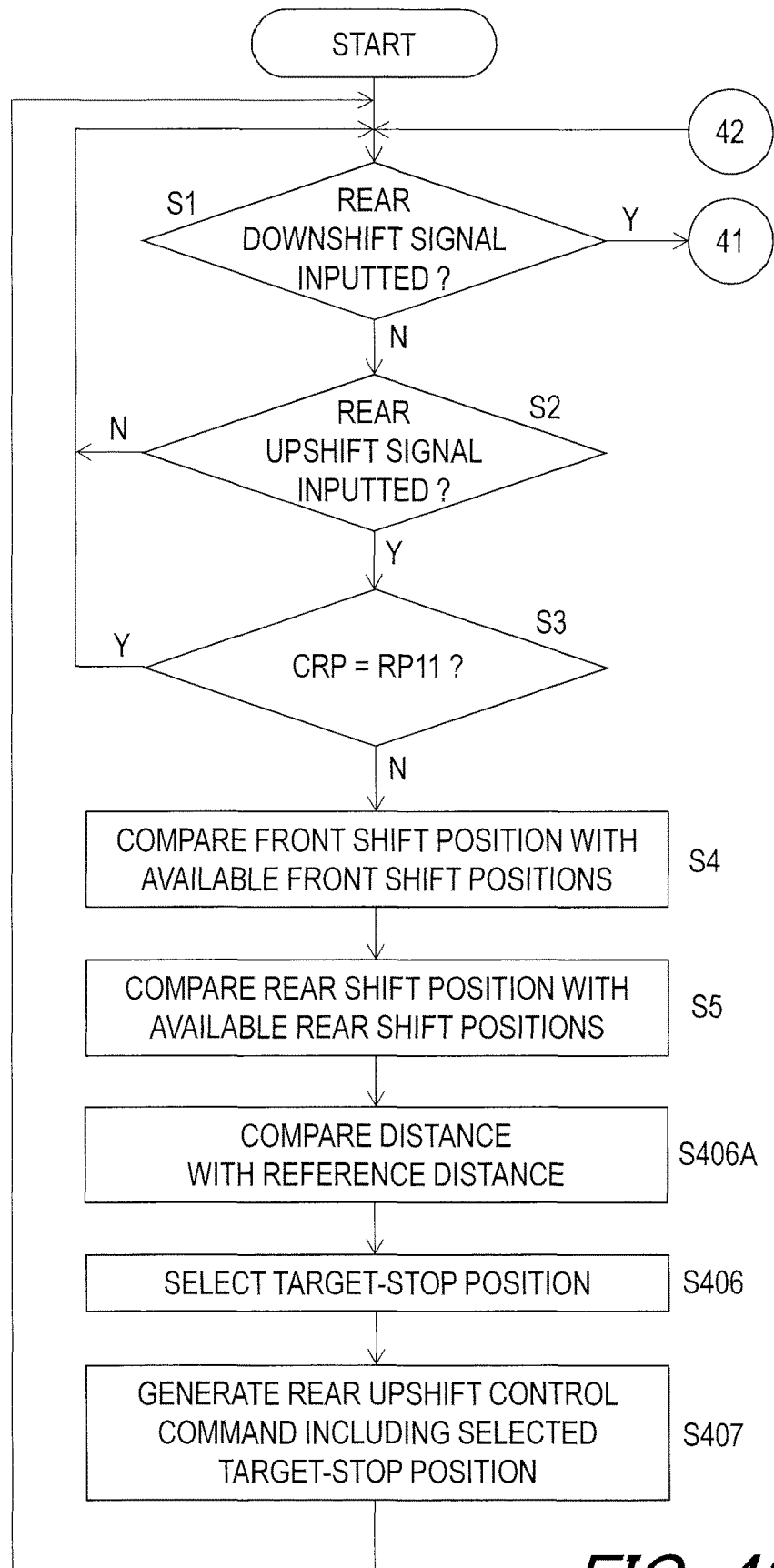
FIGS. 43 and 44 are flow charts showing an operation of the bicycle shifting control apparatus illustrated in FIG. 30.
Figure 44:
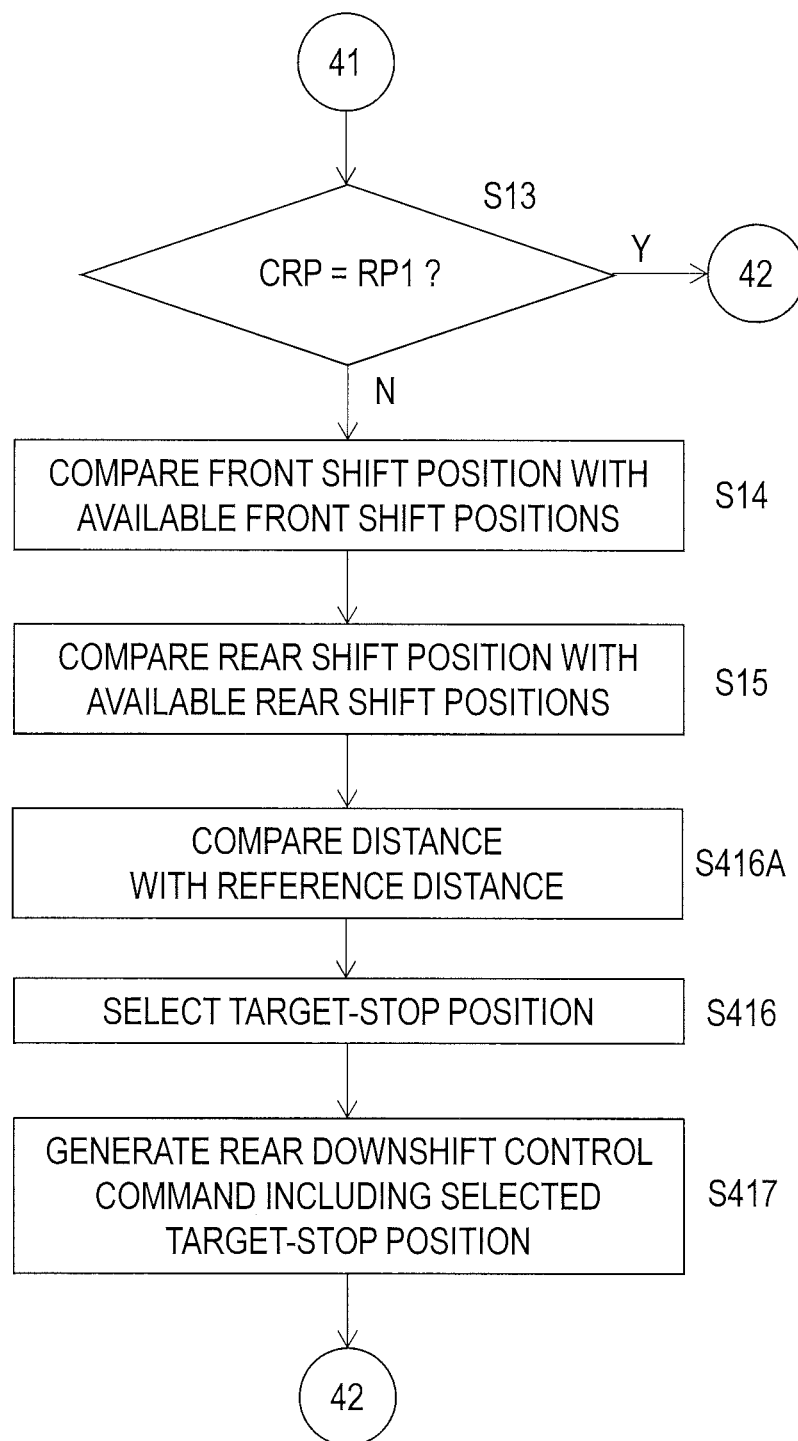

As seen in FIGS. 43 and 44, the controller CR40 compares the distance DT with the reference distance DT0 (step S406A or S416A). Based on the comparison result of the distance DT, the controller CR40 selects, as the target-stop position TSP, one position of the plurality of available target-stop positions TSP1N to TSP11C which corresponds to one position of the plurality of available front shift positions FP1 and FP2 and one position of the plurality of available rear shift positions RP1 to RP11 in a case where the controller CR40 concludes that the front shift position is the one position of the plurality of available front shift positions FP1 and FP2 and that the current rear shift position CRP is the one position of the plurality of available rear shift positions RP1 to RP11 (step S406 or S416). The controller CR40 generates the rear upshift control command CC11 including the target-stop position TSP selected by the controller CR40 (step S407 or S417).

For example, when the distance DT is smaller than the reference distance DT0, the controller CR40 selects the available target-stop position TSP9N which corresponds to the available front shift position FP1 in a case where the controller CR40 concludes that the front shift position is the available front shift position FP1 and that the current rear shift position CRP is the available rear shift position RP8 in response to the rear upshift signal OS11.

When the distance DT is equal to or larger than the reference distance DT0, the controller CR40 selects the available target-stop position TSP9C which corresponds to the available front shift position FP2 in a case where the controller CR40 concludes that the front shift position is the available front shift position FP2 and that the current rear shift position CRP is the available rear shift position RP8 in response to the rear upshift signal OS11.

Fifth Embodiment

A bicycle shifting control apparatus 512 in accordance with a fifth embodiment will be described below referring to FIGS. 45 to 48. The bicycle shifting control apparatus 512 has the same structure and/or configuration as those of the bicycle shifting control apparatus 412 except for the controller CR40. Thus, elements having substantially the same function as those in the above embodiments will be numbered the same here, and will not be described and/or illustrated again in detail here for the sake of brevity.

Figure 45:
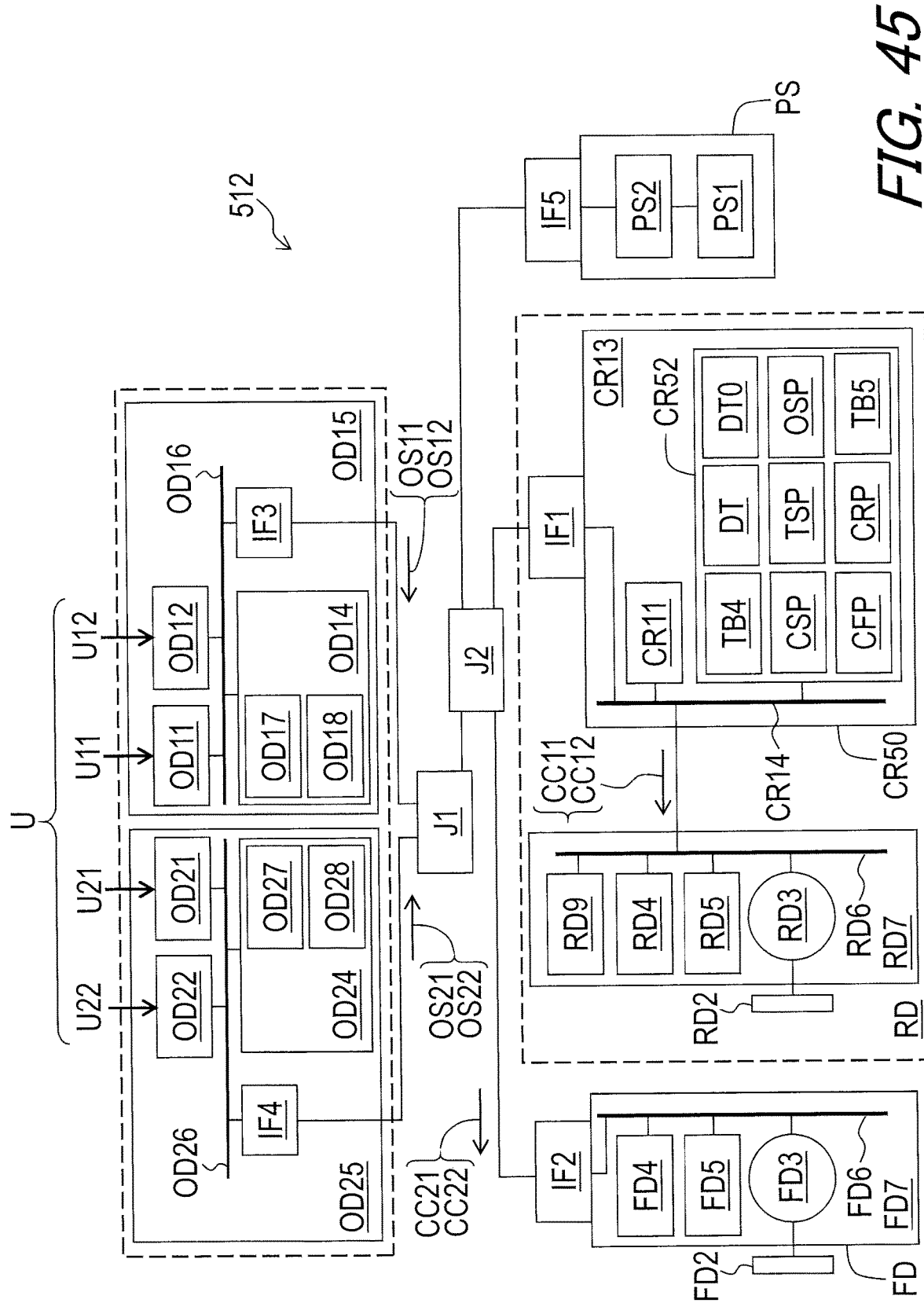
FIG. 45 is a schematic block diagram of a bicycle shifting control apparatus in accordance with a fifth embodiment.

As seen in FIG. 45, the bicycle shifting control apparatus 512 comprises a controller CR50. The controller CR50 includes a memory CR52. The controller CR50 has substantially the same structure and/or configuration as that of the controller CR40 of the fourth embodiment. The memory CR52 has substantially the same structure and/or configuration as that of the memory CR42 of the fourth embodiment. The controller CR50 is electrically connected to the actuator RD3 to move the chain guide RD2 relative to the base member RD1 from the current stop position CSP to the target-stop position TSP.

In this embodiment, the controller CR50 is configured to change the target-stop position TSP based on at least one of the current rear shift position CRP corresponding to the current stop position CSP and the distance DT provided between the chain guide RD2 and the rear sprocket corresponding to the current rear shift position CRP. In this embodiment, the controller CR50 is configured to change the target-stop position TSP based on the current rear shift position CRP and the distance DT.

As seen in FIG. 46, the memory CR52 is configured to store a table TB5 in addition to the table TB4 illustrated in FIG. 40. The table TB5 indicates correspondence relationship among the plurality of available rear shift positions RP1 to RP11, the rear upshift signal OS11, the rear downshift signal OS12, the plurality of available overstroke positions OSP1N to OSP11C, and the distance DT.

In this embodiment, the controller CR50 is further configured to change the overstroke position. The controller CR50 is configured to change the overstroke position based on at least one of the current rear shift position CRP, the distance DT provided between the chain guide RD2 and the rear sprocket corresponding to the current rear shift position CRP, and the target-stop position TSP. The controller CR50 is configured to change the overstroke position OSP based on the current rear shift position CRP and the distance DT.

The operation of the bicycle shifting control apparatus 512 will be described below referring to FIGS. 47 and 48. The steps S1 to S5 and S13 to S15 are the same as those of the bicycle shifting control apparatus 12 of the first embodiment. The steps S406A, S406, S416A, and S416 are the same as those of the bicycle shifting control apparatus 412 of the fourth embodiment.

Figure 47:
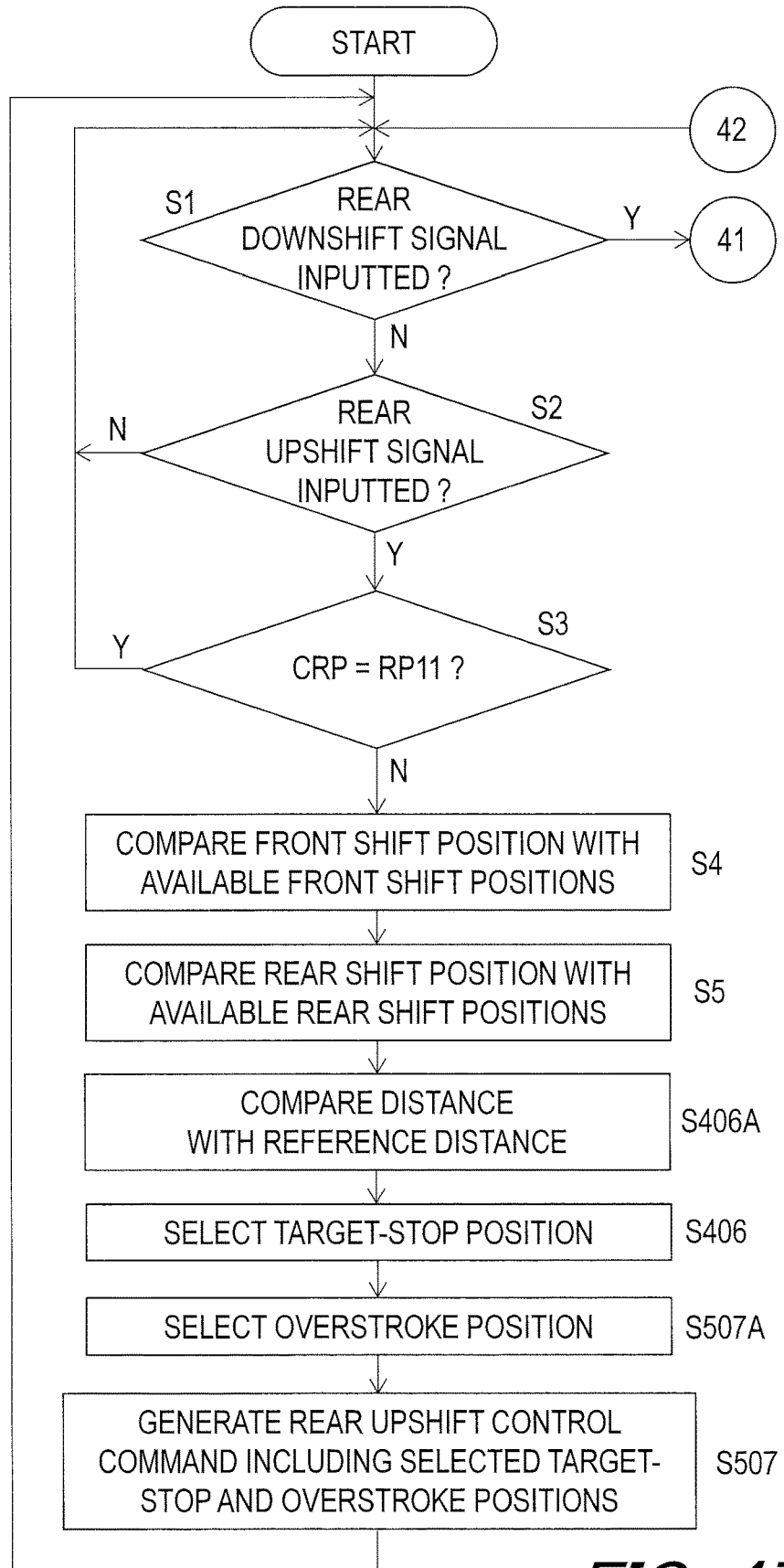
FIGS. 47 and 48 are flow charts showing an operation of the bicycle shifting control apparatus illustrated in FIG. 45.
Figure 48:
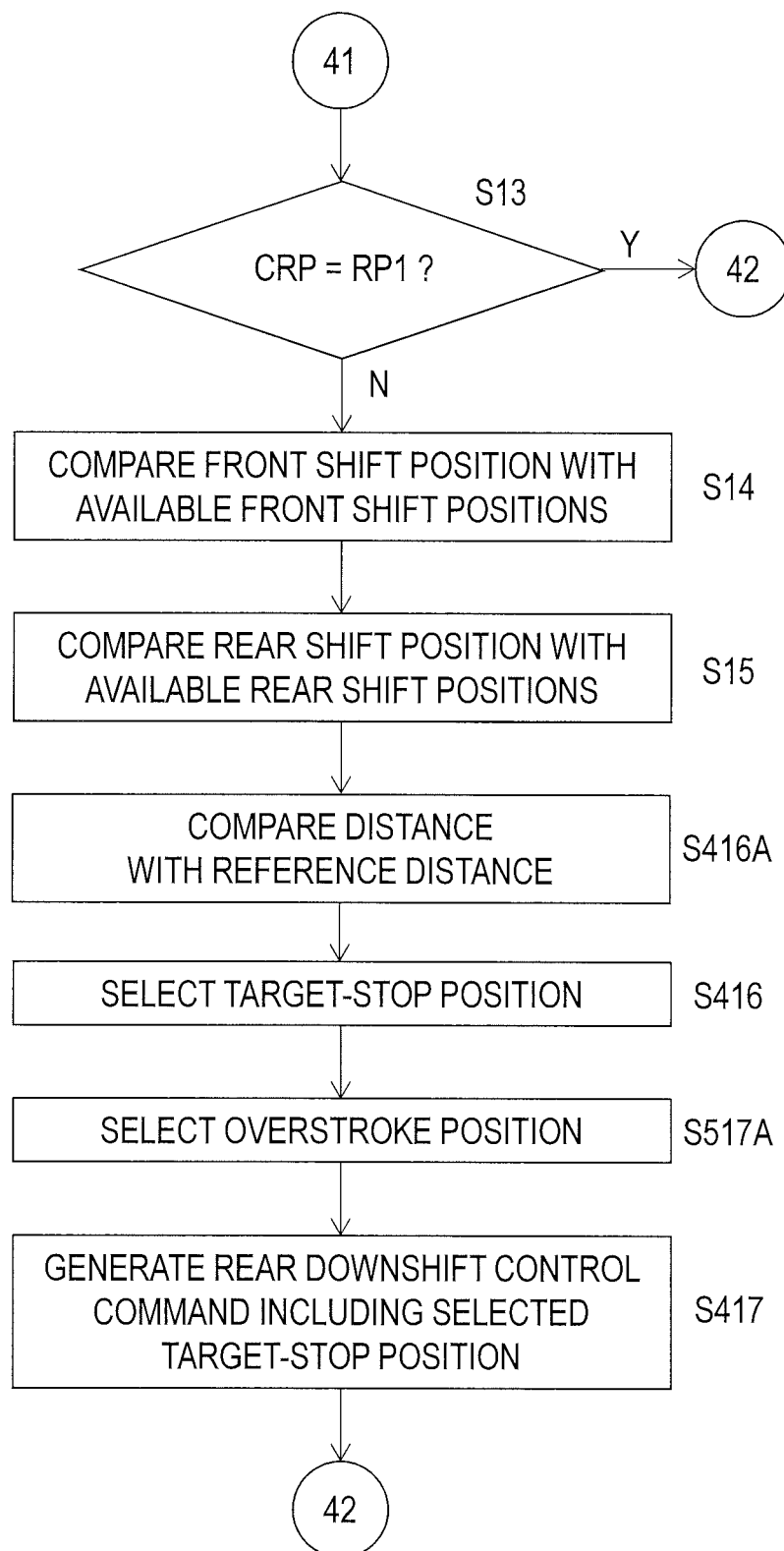

As seen in FIGS. 47 and 48, the controller CR50 compares the distance DT with the reference distance DT0 (step S406A or S416A). Based on the comparison result of the distance DT, the controller CR50 selects one position of the plurality of available target-stop positions TSP1N to TSP11C as the target-stop position TSP (step S406 or S416). Furthermore, the controller CR50 selects, as the overstroke position OSP, one position of the plurality of available overstroke positions OSP1N to OSP11C which corresponds to one position of the plurality of available front shift positions FP1 and FP2 and one position of the plurality of available rear shift positions RP1 to RP11 in a case where the controller CR50 concludes that the front shift position is the one position of the plurality of available front shift positions FP1 and FP2 and that the current rear shift position CRP is the one position of the plurality of available rear shift positions RP1 to RP11 (step S507A or S517A). The controller CR50 generates the rear upshift control command CC11 including the target-stop position TSP and the overstroke position OSP selected by the controller CR50 (step S507 or S517).

For example, when the distance DT is smaller than the reference distance DT0, the controller CR50 selects the available target-stop position TSP9N and the available overstroke position OSP9N in a case where the controller CR50 concludes that the front shift position is the available front shift position FP1 and that the current rear shift position CRP is the available rear shift position RP8 in response to the rear upshift signal OS11.

When the distance DT is equal to or larger than the reference distance DT0, the controller CR50 selects the available target-stop position TSP9C and the available overstroke position OSP9C in a case where the controller CR50 concludes that the front shift position is the available front shift position FP2 and that the current rear shift position CRP is the available rear shift position RP8 in response to the rear upshift signal OS11.

Sixth Embodiment

A bicycle shifting control apparatus 612 in accordance with a sixth embodiment will be described below referring to FIGS. 49 to 54. The bicycle shifting control apparatus 612 has the same structure and/or configuration as those of the bicycle shifting control apparatus 12 except for the controller CR10. Thus, elements having substantially the same function as those in the above embodiments will be numbered the same here, and will not be described and/or illustrated again in detail here for the sake of brevity.

Figure 49:
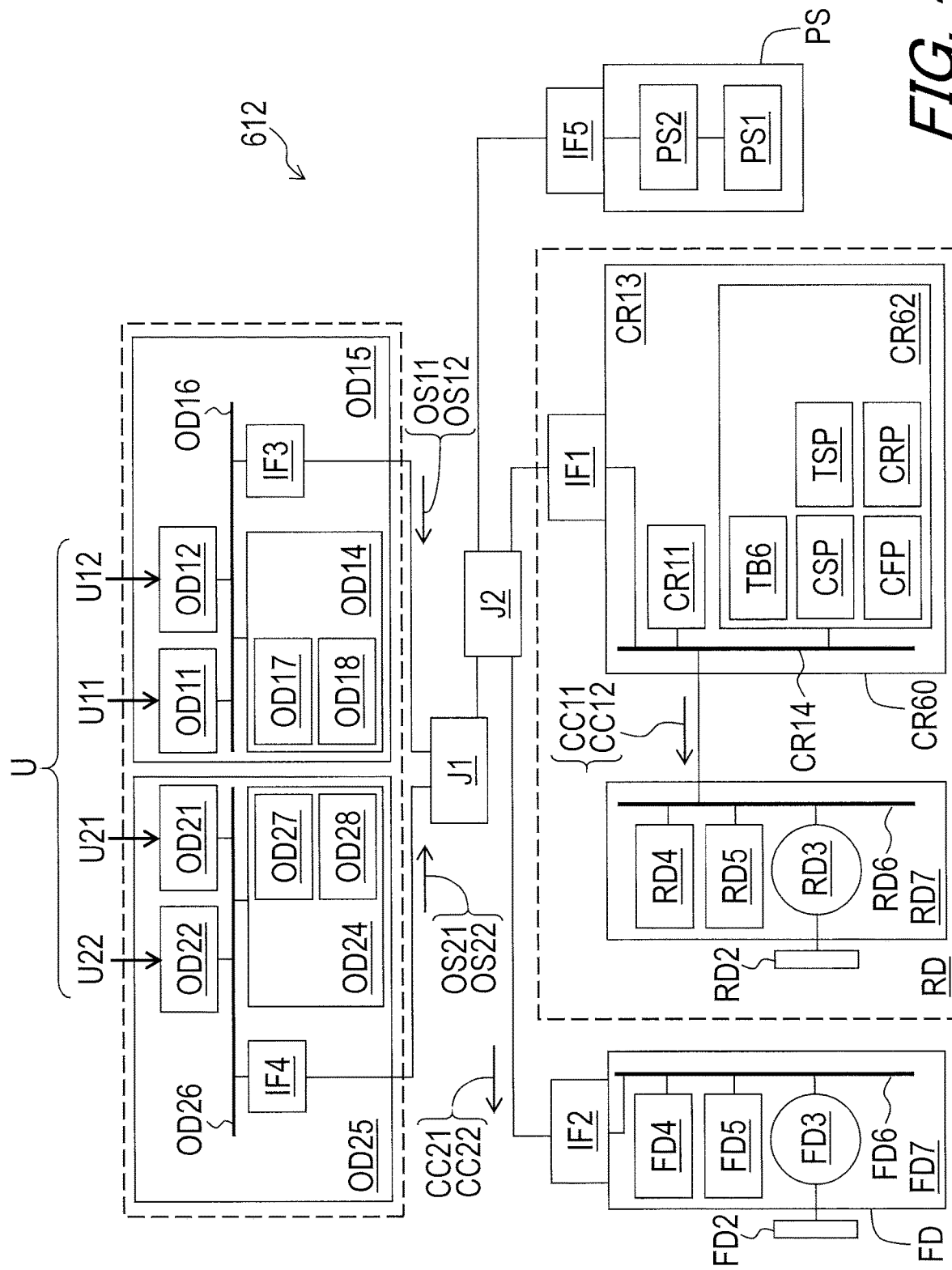
FIG. 49 is a schematic block diagram of a bicycle shifting control apparatus in accordance with a sixth embodiment.

As seen in FIG. 49, the bicycle shifting control apparatus 612 comprises a controller CR60. The controller CR60 includes a memory CR62. The controller CR60 has substantially the same structure and/or configuration as that of the controller CR10 of the first embodiment. The memory CR62 has substantially the same structure and/or configuration as that of the memory CR42 of the fourth embodiment.

In this embodiment, the controller CR60 is electrically connected to the actuator RD3 to move the chain guide RD2 relative to the base member RD1 from the current stop position CSP to the target-stop position TSP. The controller CR60 is configured to change the current rear shift position CRP corresponding to the current stop position CSP based on the front shift position CFP of the front derailleur FD.

As seen in FIG. 50, the memory CR62 is configured to store a table TB6. The table TB6 indicates correspondence relationship among the plurality of available front shift positions FP1 and FP2 and the plurality of available rear shift positions RP1N to RP11C.

The controller CR60 is configured to change the current rear shift position CRP based on the front shift position CFP in response to one of the front upshift signal OS21 and the front downshift signal OS22. Specifically, the controller CR60 is configured to select the available rear shift position corresponding to the front shift position from the plurality of available rear shift positions in response to one of the front upshift signal OS21 and the front downshift signal OS22.

Figure 51:
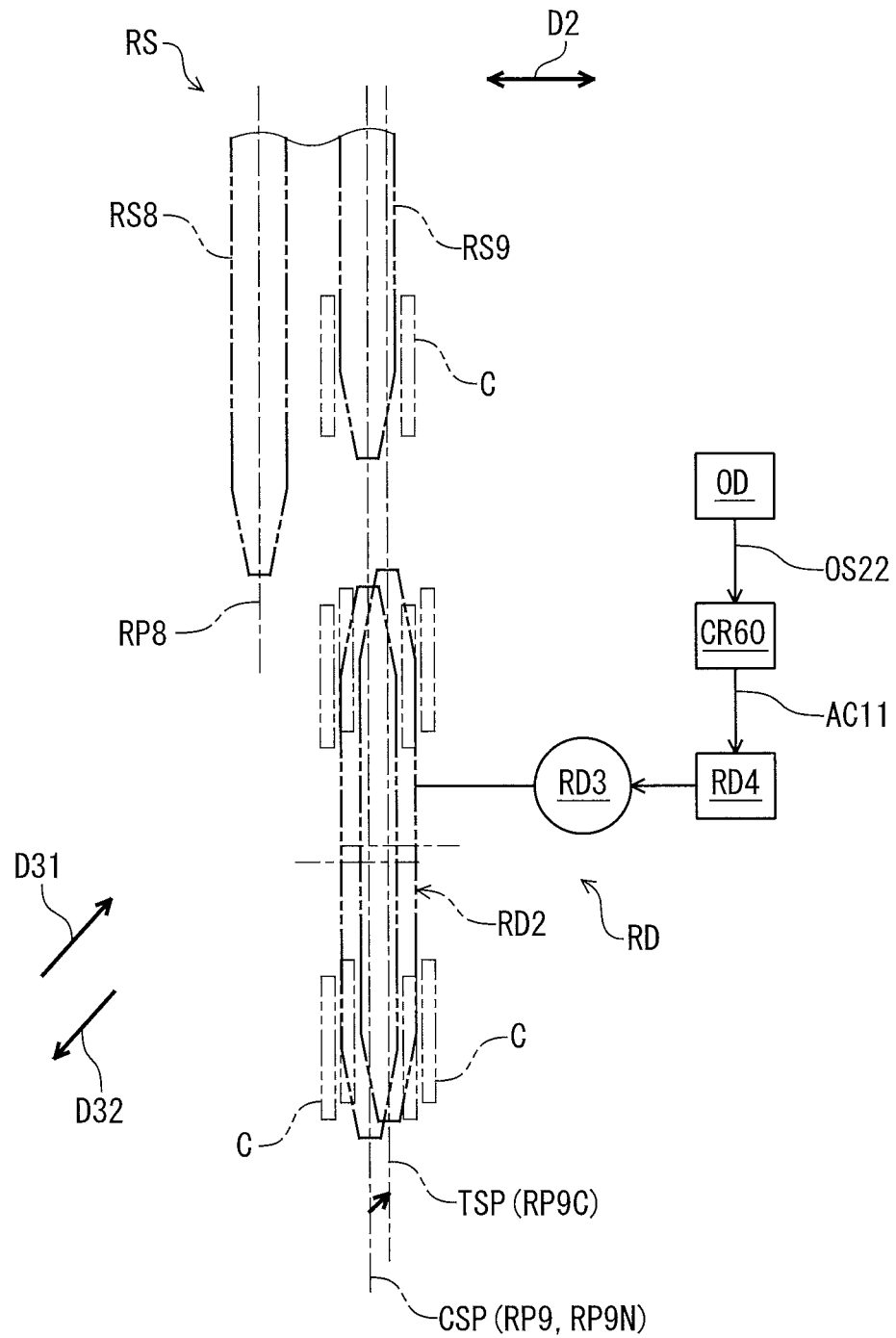
FIGS. 51 and 52 are schematic diagrams of a rear sprocket assembly and a bicycle rear derailleur of the bicycle shifting control apparatus illustrated in FIG. 49.

As seen in FIG. 51, for example, the controller CR60 is configured to select the available rear shift position RP9C corresponding to the front shift position FP1 in response to the front downshift signal OS22 in a state where the current rear shift position CRP is the rear shift position RP9. The controller CR60 controls the motor driver RD4 to move the chain guide RD2 from the rear shift position RP9N to the available rear shift position RP9C.

Figure 52:
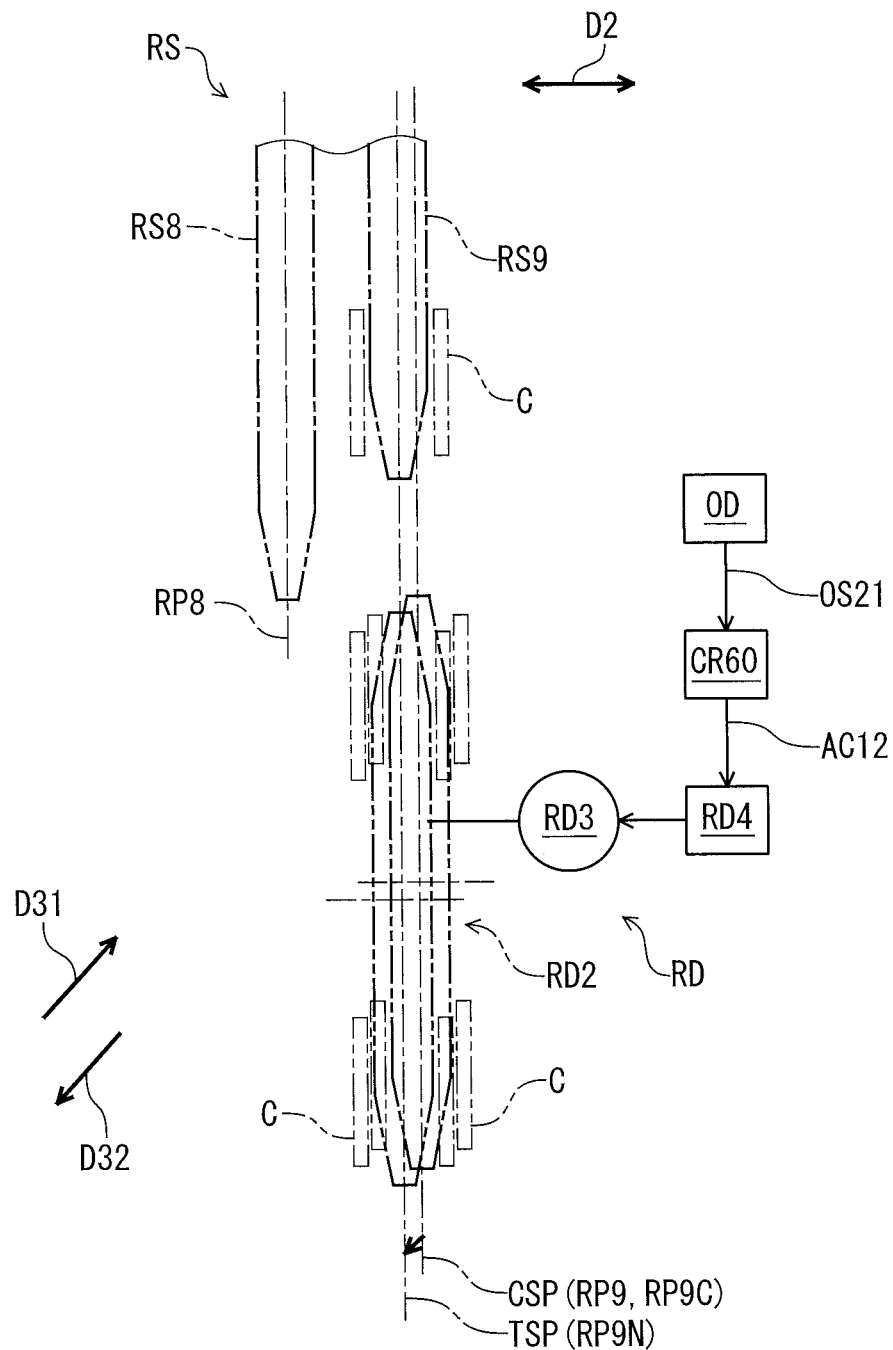

As seen in FIG. 52, the controller CR60 is configured to select the available rear shift position RP9N corresponding to the front shift position FP2 in response to the front upshift signal OS21 in a state where the current rear shift position CRP is the rear shift position RP9. The controller CR60 controls the motor driver RD4 to move the chain guide RD2 from the rear shift position RP9C to the available rear shift position RP9N.

The operation of the bicycle shifting control apparatus 612 will be described below referring to FIGS. 53 and 54.

Figure 53:
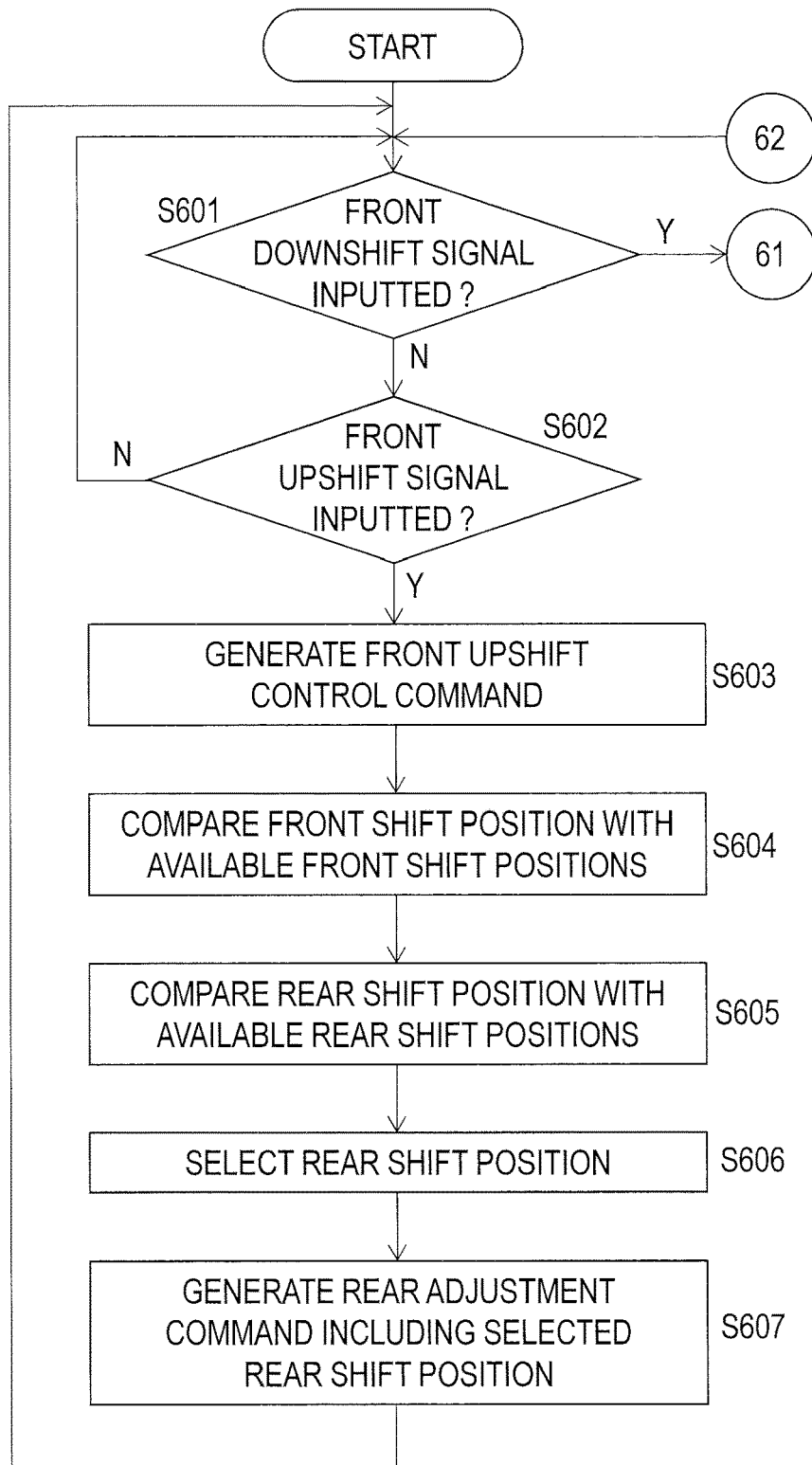
FIGS. 53 and 54 are flow charts showing an operation of the bicycle shifting control apparatus illustrated in FIG. 49.

As seen in FIG. 53, the controller CR60 determines whether one of the front upshift signal OS21 and the front downshift signal OS22 is input (steps S601 and S602). The controller CR60 monitors an input of one of the front upshift signal OS21 and the front downshift signal OS22 until the controller CR60 receives one of the front upshift signal OS21 and the front downshift signal OS22 (steps S601 and S602).

Figure 54:
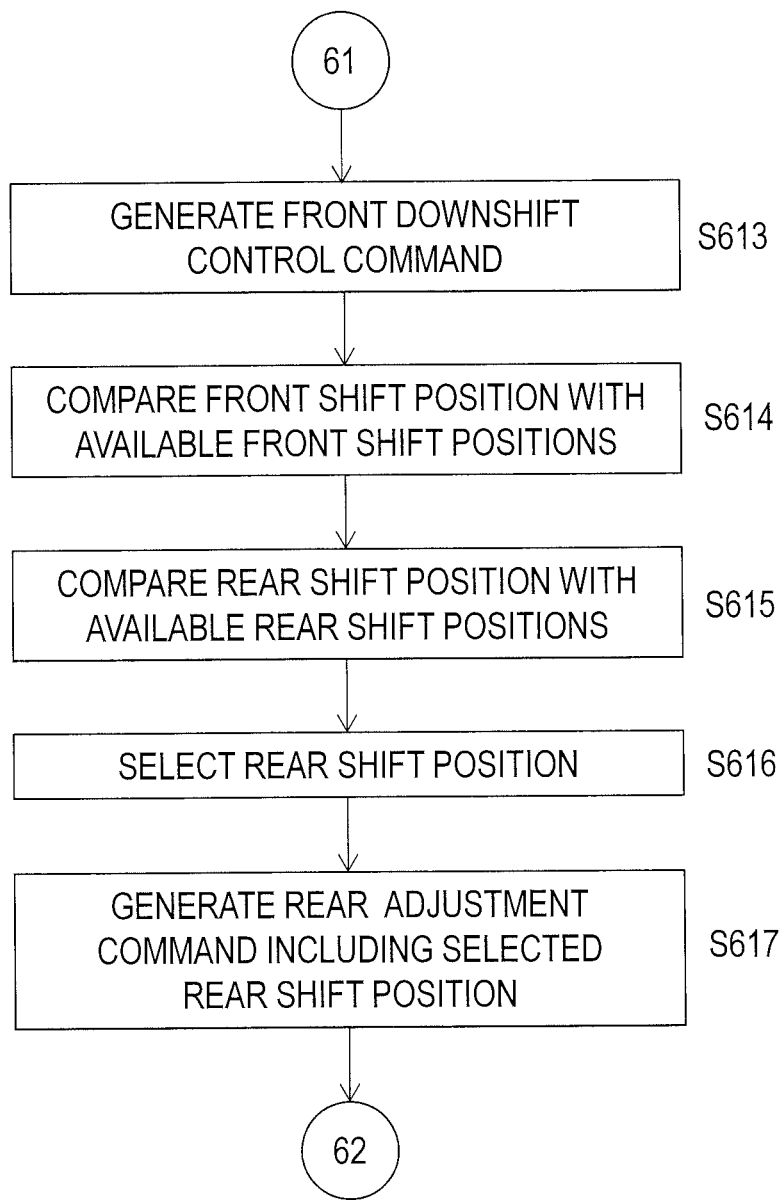

As seen in FIGS. 53 and 54, the controller CR60 generates the front upshift control command CC21 in response to one of the front upshift signal OS21 and the front downshift signal OS22 (steps S603 or S613). The chain guide FD2 of the front derailleur FD is moved from the front shift position FP1 to the front shift position FP2 in response to the front upshift signal OS21. In this case, the current front shift position CFP indicates the front shift position FP2 after upshifting. The chain guide FD2 of the front derailleur FD is moved from the front shift position FP2 to the front shift position FP1 in response to the front downshift signal OS22. In this case, the current front shift position CFP indicates the front shift position FP1 after downshifting.

The controller CR60 compares the front shift position CFP with the plurality of available front shift positions FP1 and FP2 in the table TB6 (step S604 or S614). The controller CR60 compares the current rear shift position CRP with the plurality of available rear shift positions RP1 to RP11 in the table TB6 (step S605 or S615). The controller CR60 selects one position of the plurality of available rear shift positions RP1N to RP11C which corresponds to the front shift position CFP and the current rear shift position CRP (step S606 or S616). The controller CR60 generates a rear adjustment command including the available rear shift position selected by the controller CR60 (step S607 or S617).

As seen in FIG. 51, for example, when the controller CR60 selects the available rear shift position RP9C, the controller CR60 generates the rear adjustment command AC11 including the available rear shift position RP9C. The motor driver RD4 controls the actuator RD3 to move the chain guide RD2 from the rear shift position RP9N to the rear shift position RP9C based on the rear adjustment command AC11 including the available rear shift position RP9C.

As seen in FIG. 52, for example, when the controller CR60 selects the available rear shift position RP9N, the controller CR60 generates the rear adjustment command AC12 including the available rear shift position RP9N. The motor driver RD4 controls the actuator RD3 to move the chain guide RD2 from the rear shift position RP9C to the rear shift position RP9N based on the rear adjustment command AC12 including the available rear shift position RP9N.

Seventh Embodiment

A bicycle shifting control apparatus 712 in accordance with a seventh embodiment will be described below referring to FIGS. 55 to 60. The bicycle shifting control apparatus 712 has the same structure and/or configuration as those of the bicycle shifting control apparatus 12 except for the controller CR10. Thus, elements having substantially the same function as those in the above embodiments will be numbered the same here, and will not be described and/or illustrated again in detail here for the sake of brevity.

Figure 55:
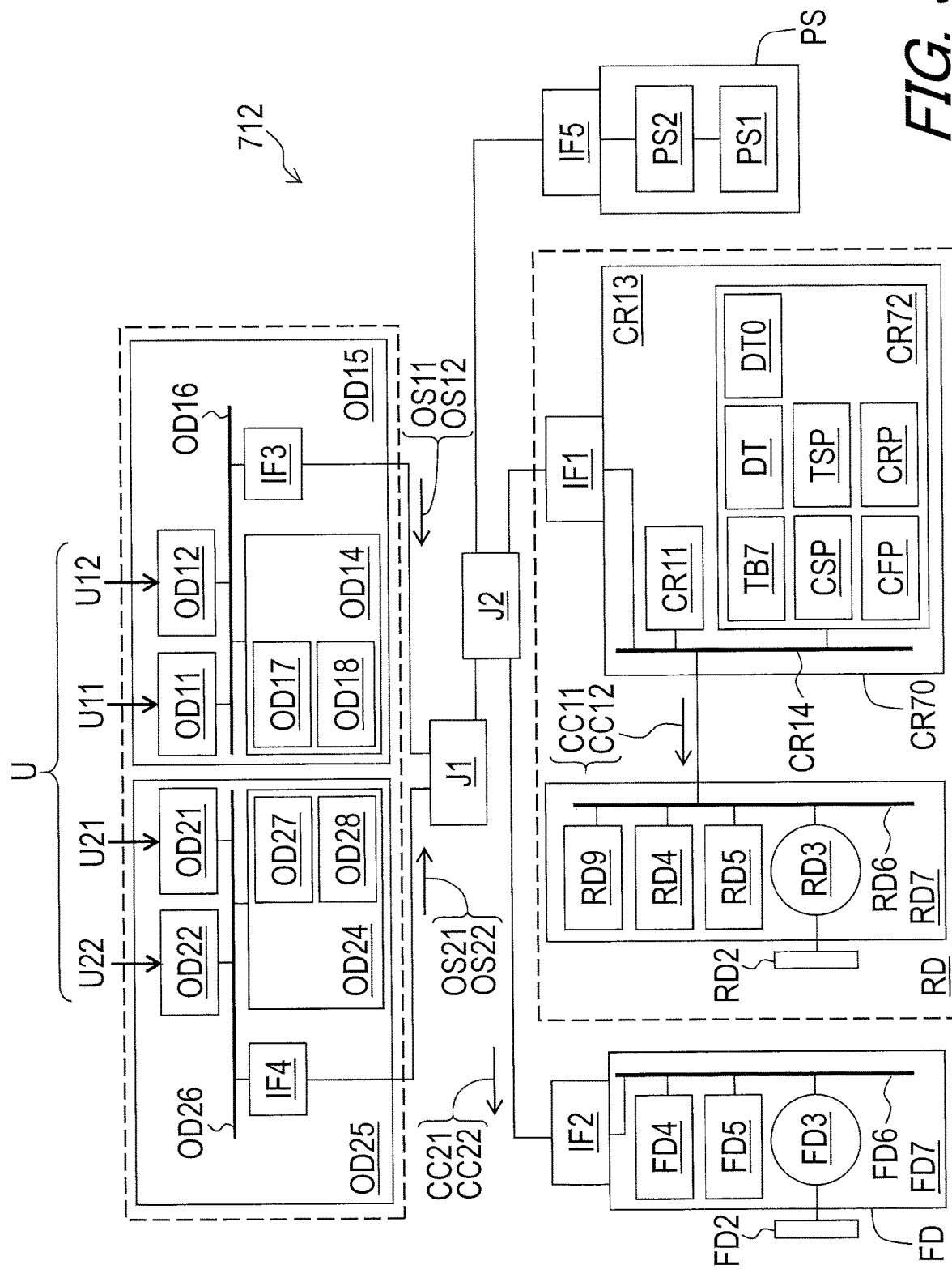
FIG. 55 is a schematic block diagram of a bicycle shifting control apparatus in accordance with a seventh embodiment.

As seen in FIG. 55, the bicycle shifting control apparatus 712 comprises a controller CR70. The controller CR70 includes a memory CR72. The controller CR70 has substantially the same structure and/or configuration as that of the controller CR10 of the first embodiment. The memory CR72 has substantially the same structure and/or configuration as that of the memory CR42 of the fourth embodiment.

In this embodiment, the controller CR70 is electrically connected to the actuator RD3 to move the chain guide RD2 relative to the base member RD1 from the current stop position CSP to the target-stop position TSP. The controller CR70 is configured to change the current rear shift position CRP corresponding to the current stop position CSP based on the front shift position CFP of the front derailleur FD.

As seen in FIG. 56, the memory CR72 is configured to store a table TB7. The table TB7 indicates correspondence relationship among the distance DT and the plurality of available rear shift positions RP1N to RP11C.

The controller CR70 is configured to change the current rear shift position CRP corresponding to the current stop position CSP based on the distance DT provided between the chain guide RD2 and the rear sprocket corresponding to the current rear shift position CRP. For example, the controller CR70 selects the target-stop position TSP9N in a case where the controller CR70 concludes that the distance DT sensed by the chain-guide sensor RD9 is smaller than the reference distance DT0. The controller CR70 selects the target-stop position TSP9C in a case where the controller CR70 concludes that the distance DT sensed by the chain-guide sensor RD9 is equal to or larger than the reference distance DT0.

The controller CR70 is configured to change the current rear shift position CRP based on the distance DT in response to one of the front upshift signal OS21 and the front downshift signal OS22. Specifically, the controller CR70 is configured to select the available rear shift position in accordance with the distance DT in response to one of the front upshift signal OS21 and the front downshift signal OS22.

Figure 57:
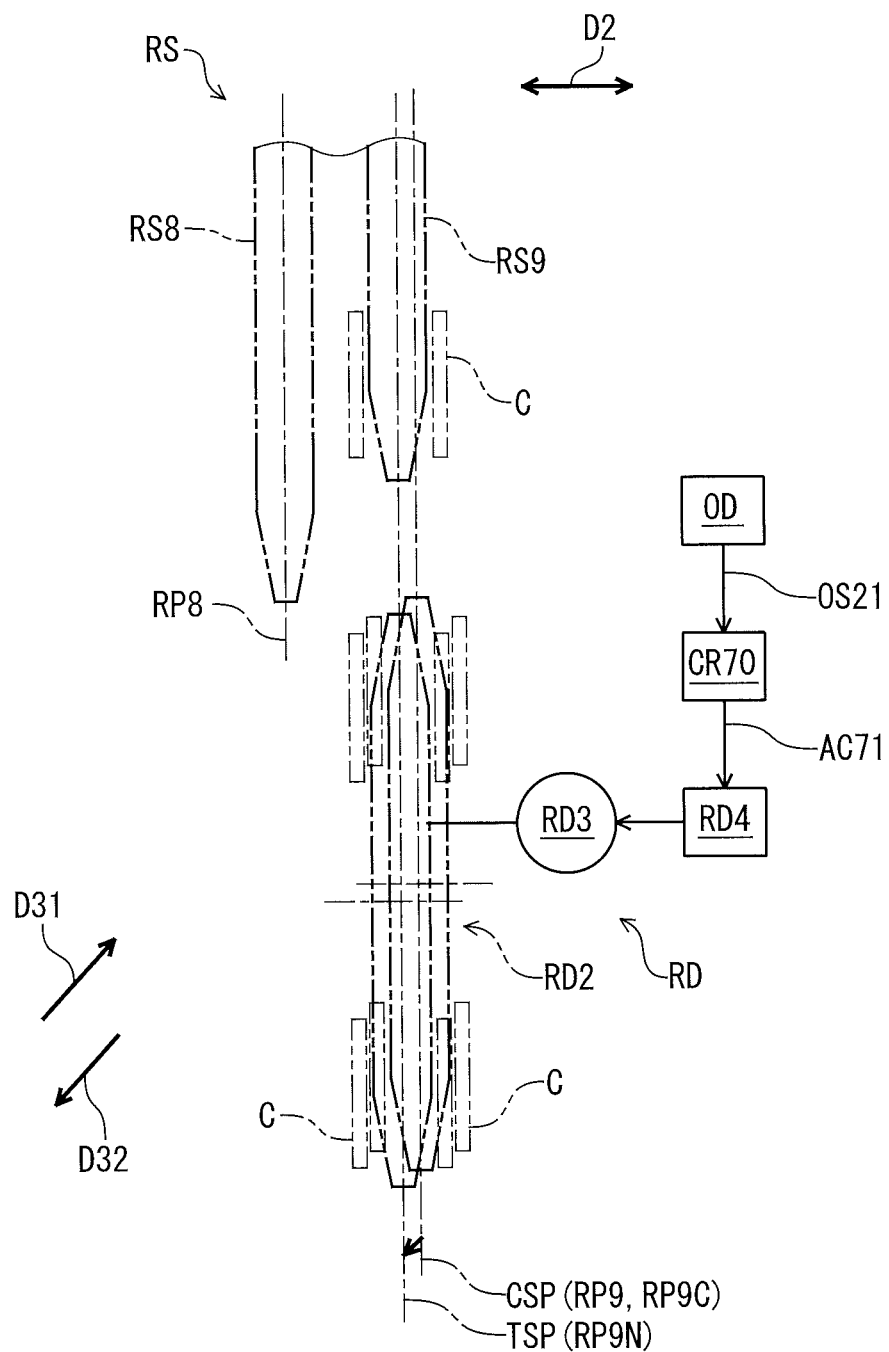
FIGS. 57 and 58 are schematic diagrams of a rear sprocket assembly and a bicycle rear derailleur of the bicycle shifting control apparatus illustrated in FIG. 55.

As seen in FIG. 57, for example, the controller CR70 is configured to select the available rear shift position RP9N in response to the front downshift signal OS22 in a case where the controller CR70 concludes that the distance DT sensed by the chain-guide sensor RD9 is smaller than the reference distance DT0 in a state where the current rear shift position CRP is the rear shift position RP9. The controller CR70 controls the motor driver RD4 to move the chain guide RD2 from the rear shift position RP9C to the available rear shift position RP9N.

Figure 58:
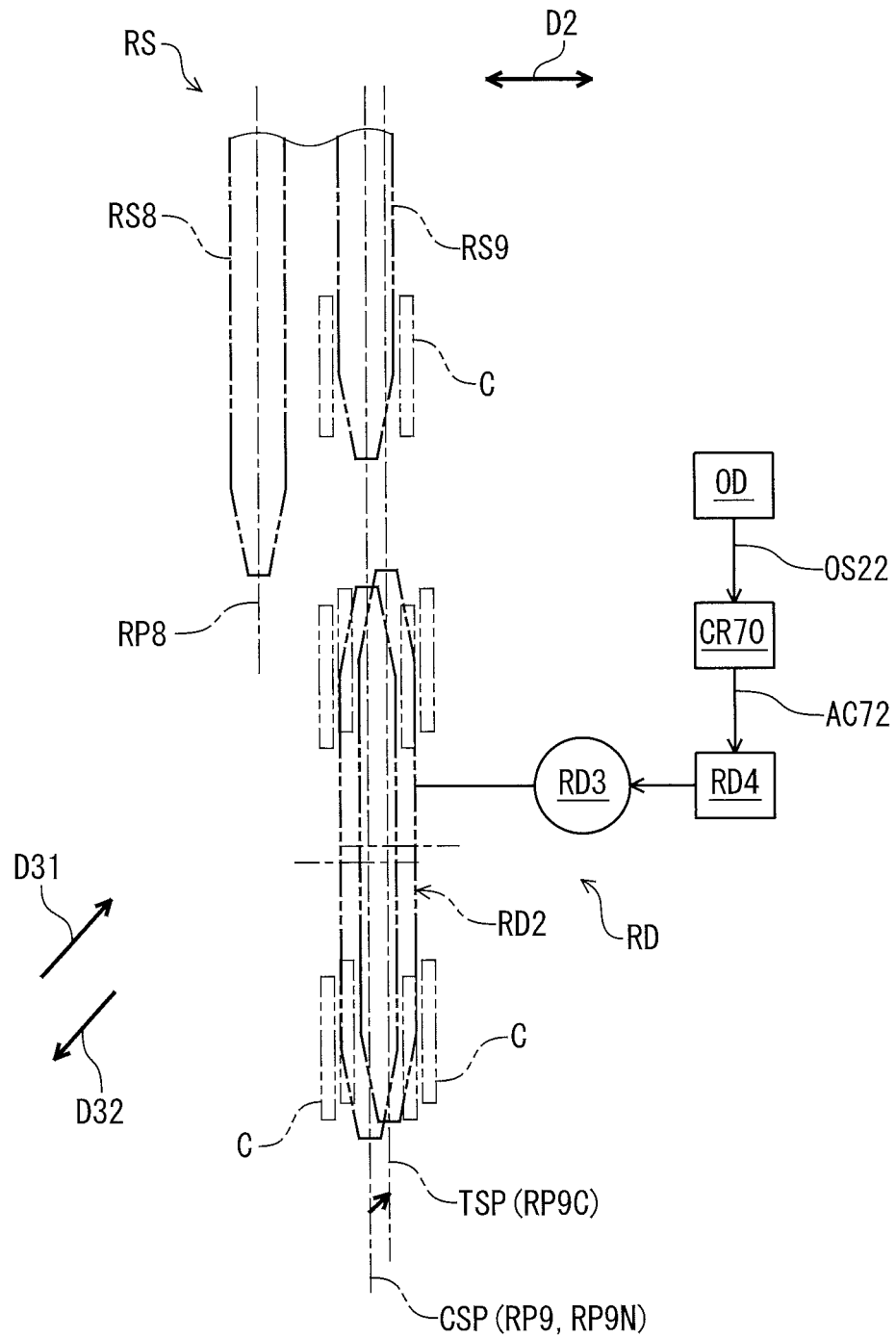

As seen in FIG. 58, the controller CR70 is configured to select the available rear shift position RP9C in response to the front upshift signal OS21 in a case where the controller CR70 concludes that the distance DT sensed by the chain-guide sensor RD9 is equal to or larger than the reference distance DT0 in a state where the current rear shift position CRP is the rear shift position RP9. The controller CR70 controls the motor driver RD4 to move the chain guide RD2 from the rear shift position RP9N to the available rear shift position RP9C.

Figure 59:
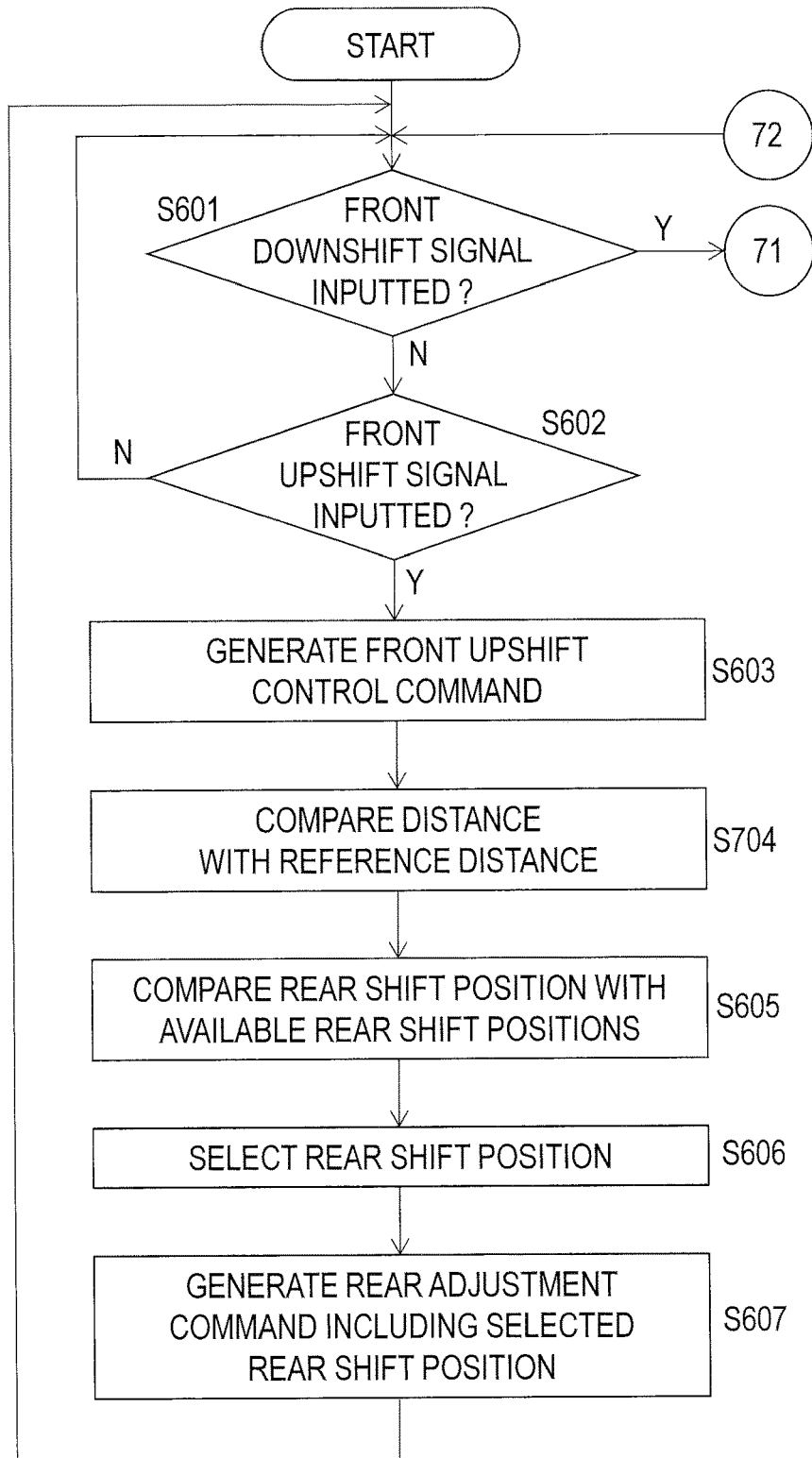
FIGS. 59 and 60 are flow charts showing an operation of the bicycle shifting control apparatus illustrated in FIG. 55.
Figure 60:
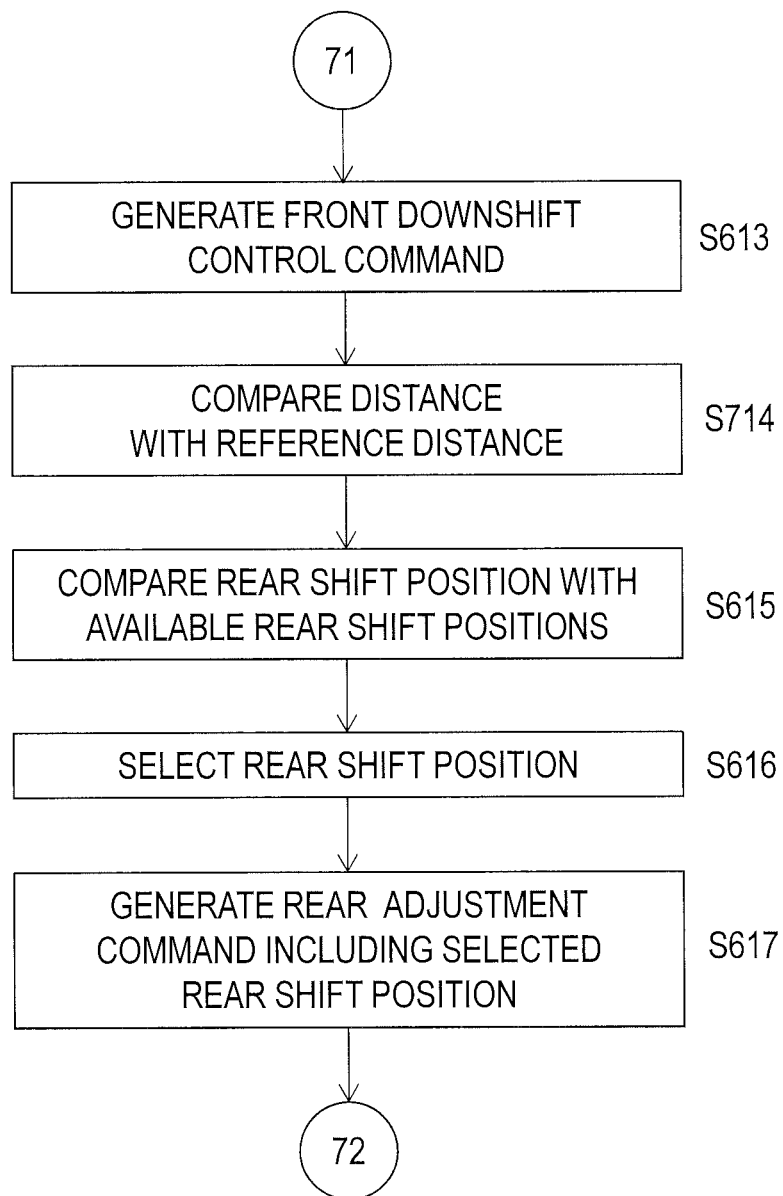

The operation of the bicycle shifting control apparatus 712 will be described below referring to FIGS. 59 and 60. The steps illustrated in FIGS. 59 and 60 are substantially the same as those of FIGS. 53 and 54 in the sixth embodiment except for steps S704 and S714. Thus, the same steps will not be described in detail here for the sake of brevity.

As seen in FIGS. 59 and 60, after the step S603 or S613, the controller CR70 compares the distance DT sensed by the chain-guide sensor RD9 with the reference distance DT0 (step S604 or S614). The controller CR70 compares the current rear shift position CRP with the plurality of available rear shift positions RP1 to RP11 in the table TB7 (step S605 or S615). The controller CR70 selects one position of the plurality of available rear shift positions RP1N to RP11C which corresponds to the front shift position CFP and the current rear shift position CRP (step S606 or S616). The controller CR70 generates a rear adjustment command including the available rear shift position selected by the controller CR70 (step S607 or S617).

As seen in FIG. 57, for example, when the controller CR70 selects the available rear shift position RP9N, the controller CR70 generates the rear adjustment command AC71 including the available rear shift position RP9N. The motor driver RD4 controls the actuator RD3 to move the chain guide RD2 from the rear shift position RP9C to the rear shift position RP9N based on the rear adjustment command AC71 including the available rear shift position RP9N.

As seen in FIG. 58, for example, when the controller CR70 selects the available rear shift position RP9C, the controller CR70 generates the rear adjustment command AC72 including the available rear shift position RP9C. The motor driver RD4 controls the actuator RD3 to move the chain guide RD2 from the rear shift position RP9N to the rear shift position RP9C based on the rear adjustment command AC72 including the available rear shift position RP9C.

It will be apparent to those skilled in the bicycle field from the present disclosure that the above embodiments can be at least partly combined with each other if necessary. For example, the first and second embodiments can be combined with each other. The fourth and fifth embodiments can be combined with each other. One of the first to fourth embodiments can be combined with the sixth embodiment. The first, second, and sixth embodiments can be combined with each other. The first, third, and sixth embodiments can be combined with each other. One of the fourth and fifth embodiments can be combined with the seventh embodiment. The fourth, fifth, and seventh embodiments can be combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear derailleur comprising:
    a base member;
    a chain guide movably coupled to the base member;
    an actuator operatively coupled to the chain guide to move the chain guide relative to the base member; and
    a controller electrically connected to the actuator to move the chain guide relative to the base member from a current stop position to a target-stop position which is adjacent to the current stop position without another stop position between the current stop position and the target-stop position, the controller being configured to change a location of, based on a front shift position of a front derailleur, at least one of the target-stop position and a temporary position
    in which the chain guide temporarily is in a shifting operation in which the chain guide moves from the current stop position to the target-stop position.

2. The bicycle rear derailleur according to claim 1, wherein
    the temporary position includes an intermediate position provided between the current stop position and the target-stop position.

3. The bicycle rear derailleur according to claim 1, wherein
    the temporary position includes an overstroke position, and
    the target-stop position is provided between the current stop position and the overstroke position.

4. The bicycle rear derailleur according to claim 1, wherein
    the controller includes a memory configured to store a plurality of available front shift positions of the front derailleur, and
    the controller is configured to compare the front shift position with the plurality of available front shift positions before changing the at least one of the target-stop position and the temporary position.

5. The bicycle rear derailleur according to claim 4, wherein
    the memory is configured to store a plurality of available target-stop positions of the chain guide.

6. The bicycle rear derailleur according to claim 5, wherein
    the controller is configured to select, as the target-stop position, one position of the plurality of available target-stop positions which corresponds to one position of the plurality of available front shift positions in a case where the controller concludes that the front shift position is the one position of the plurality of available front shift positions.

7. The bicycle rear derailleur according to claim 4, wherein
    the memory is configured to store a plurality of available temporary positions of the chain guide.

8. The bicycle rear derailleur according to claim 7, wherein
    the controller is configured to select, as the temporary position, one position of the plurality of available temporary positions which corresponds to one position of the plurality of available front shift positions in a case where the controller concludes that the front shift position is the one position of the plurality of available front shift positions.

9. The bicycle rear derailleur according to claim 1, wherein
the controller is configured to change the at least one of the target-stop position and the temporary position based on the front shift position and a current rear shift position corresponding to the current stop position.

10. The bicycle rear derailleur according to claim 9, wherein
the controller includes a memory configured to store
a plurality of available front shift positions of the front derailleur, and
a plurality of available rear shift positions of the bicycle rear derailleur, and
the controller is configured to compare the front shift position with the plurality of available front shift positions and compare the current rear shift position with the plurality of available rear shift positions before changing the at least one of the target-stop position and the temporary position.

11. The bicycle rear derailleur according to claim 10, wherein
the memory is configured to store a plurality of available target-stop positions of the chain guide.

12. The bicycle rear derailleur according to claim 11, wherein
the controller is configured to select, as the target-stop position, one position of the plurality of available target-stop positions which corresponds to one position of the plurality of available front shift positions and one position of the plurality of available rear shift positions in a case where the controller concludes that the front shift position is the one position of the plurality of available front shift positions and that the current rear shift position is the one position of the plurality of available rear shift positions.

13. The bicycle rear derailleur according to claim 10, wherein
the memory is configured to store a plurality of available temporary positions of the chain guide.

14. The bicycle rear derailleur according to claim 13, wherein
the controller is configured to select, as the temporary position, one position of the plurality of available temporary positions which corresponds to one position of the plurality of available front shift positions and one position of the plurality of available rear shift positions in a case where the controller concludes that the front shift position is the one position of the plurality of available front shift positions and that the current rear shift position is the one position of the plurality of available rear shift positions.

15. The bicycle rear derailleur according to claim 1, wherein
the chain guide includes a guide plate, a guide pulley, and a link structure,
the guide pulley is rotatably coupled to the guide plate about a rotational axis,
the link structure movably couples the guide plate to the base member,
the guide plate is pivotally coupled to the link structure about a pivot axis, and
the rotational axis of the guide pulley is offset from the pivot axis of the guide plate.

16. A bicycle shifting control apparatus for a bicycle rear derailleur including a base member, a chain guide movably coupled to the base member, and an actuator operatively coupled to the chain guide to move the chain guide relative to the base member, the bicycle shifting control apparatus comprising:
a controller electrically connected to the actuator to move the chain guide relative to the base member from a current stop position to a target-stop position,
the controller including a memory configured to store the target-stop position and a temporary position in which the chain guide temporarily is in a shifting operation in which the chain guide moves from the current stop position to the target-stop position which is adjacent to the current stop position without another stop position between the current stop position and the target-stop position, and
the controller being configured to change a location of at least one of the target-stop position and the temporary position based on a front shift position of a front derailleur.

17. A bicycle rear derailleur comprising:
a base member;
a chain guide movably coupled to the base member;
an actuator operatively coupled to the chain guide to move the chain guide relative to the base member; and
a controller electrically connected to the actuator to move the chain guide relative to the base member from a current stop position to a target-stop position which is adjacent to the current stop position without another stop position between the current stop position and the target-stop position, the controller being configured to change, based on a front shift position of a front derailleur, at least one of the target-stop position and a temporary position in which the chain guide temporarily is in a shifting operation in which the chain guide moves from the current stop position to the target-stop position, wherein
the controller includes a memory configured to store a plurality of available front shift positions of the front derailleur, and
the controller is configured to compare the front shift position with the plurality of available front shift positions before changing the at least one of the target-stop position and the temporary position.

18. The bicycle rear derailleur according to claim 17, wherein
the memory is configured to store a plurality of available target-stop positions of the chain guide.

19. The bicycle rear derailleur according to claim 18, wherein
the controller is configured to select, as the target-stop position, one position of the plurality of available target-stop positions which corresponds to one position of the plurality of available front shift positions in a case where the controller concludes that the front shift position is the one position of the plurality of available front shift positions.

20. A bicycle rear derailleur comprising:
a base member;
a chain guide movably coupled to the base member;
an actuator operatively coupled to the chain guide to move the chain guide relative to the base member; and
a controller electrically connected to the actuator to move the chain guide relative to the base member from a current stop position to a target-stop position which is adjacent to the current stop position without another stop position between the current stop position and the target-stop position, the controller being configured to change, based on a front shift position of a front derailleur, at least one of the target-stop position and a temporary position in which the chain guide temporarily is in a shifting operation in which the chain guide moves from the current stop position to the target-stop position, wherein the controller is configured to change the at least one of the target-stop position and the temporary position based on the front shift position and a current rear shift position corresponding to the current stop position.

* * * * *